(12) United States Patent
Taki et al.

(10) Patent No.: US 7,731,930 B2
(45) Date of Patent: Jun. 8, 2010

(54) CARBON NANOTUBE ASSEMBLY AND MANUFACTURING METHOD THEREOF

(75) Inventors: Yusuke Taki, Sagamihara (JP); Kiyoaki Shinohara, Sagamihara (JP)

(73) Assignee: Nikon Corporation, Tokyo (JP)

( * ) Notice: Subject to any disclaimer, the term of this patent is extended or adjusted under 35 U.S.C. 154(b) by 290 days.

(21) Appl. No.: 11/663,176

(22) PCT Filed: Nov. 10, 2005

(86) PCT No.: PCT/JP2005/021071

§ 371 (c)(1),
(2), (4) Date: Mar. 19, 2007

(87) PCT Pub. No.: WO2006/052009

PCT Pub. Date: May 18, 2006

(65) Prior Publication Data

US 2008/0031804 A1 Feb. 7, 2008

(30) Foreign Application Priority Data

Nov. 10, 2004 (JP) ............................. 2004-326593

(51) Int. Cl.
*D01F 9/12* (2006.01)
(52) U.S. Cl. .................. 423/447.3; 423/447.4
(58) Field of Classification Search .............. 423/447.3, 423/447.4
See application file for complete search history.

(56) References Cited

U.S. PATENT DOCUMENTS

| 6,716,409 B2 * | 4/2004 | Hafner et al. ............. 423/447.1 |
| 7,183,229 B2 * | 2/2007 | Yamanaka ................... 438/795 |
| 7,288,321 B2 * | 10/2007 | Liu et al. ..................... 428/408 |
| 2004/0105807 A1 | 6/2004 | Fan et al. |

FOREIGN PATENT DOCUMENTS

| JP | A-2004-074062 | 3/2004 |
| JP | A-2004-182581 | 7/2004 |

OTHER PUBLICATIONS

Zhi-hao Yuan et al., "Controlled Growth of Carbon Nanotubes in Diameter and Shape Using Template-Synthesis Method", Chemical Physics Letters 345 (2001), pp. 39-43.
Cheng C. Tang et al., "Synthesis of Carbon Nanotubes Using Supported Catalysts Modified by Lanthanum Species", Letters to the Editor, Carbon 40, (2002), pp. 2495-2505.
X. P. Gao et al., "Synthesis of Carbon Nanotubes by Catalytic Decomposition of Methane Using LaNis Hydrogen Storage Alloy as a Catalyst", Chemical Physics Letters 327 (2000), pp. 271-276.
Shoushan Fan et al., "Monitoring the Growth of Carbon Nanotubes by Carbon Isotope Labelling", Nanotechnology 14 (2003), pp. 1118-1123.
Shoushan Fan et al., "Carbon Nanotube Arrays on Silicon Substrates and Their Possible Application", Physics E 8 (2000), pp. 179-183.
Qun-qing Li et al., "Mosabauer Study of Catalytically Grown Carbon Nanotube", Chem. Phys. Lett., vol. 15, No. 1 (1998), pp. 68-69.
Liang Liu et al., "Isotope Labeling of Carbon Nanotubes and Formation of $^{12}$C-$^{13}$C Nanotube Junctions", J. Am. Chemical Society, (2001), 123, pp. 11502-11503.
Pavel Nikolaev et al., "Gas-phase catalytic growth of single-walled carbon nanotubes from carbon monoxide," *Chemical Physical Letters*, vol. 313, pp. 91-97 (1999).
Yoichi Murakami et al., "Growth of vertically aligned single-walled carbon nanotube films on quartz substrates and their optical anisotropy," Chemical Physical Letters, vol. 385, pp. 298-303 (2004).
Risa Taniguchi et al., "Syntheses of High Purity Double Wall Carbon Nanotubes by the CCVD Method using Zeolites," Conference Abstract Book of 26$^{th}$ Fullerene Nanotubes General Symposium, IP-44, p. 100, Jan. 7, 2004.

* cited by examiner

*Primary Examiner*—Timothy C Vanoy
*Assistant Examiner*—Michelle Hou
(74) *Attorney, Agent, or Firm*—Oliff & Berridge, PLC

(57) ABSTRACT

A method for manufacturing a carbon nanotube assembly including the steps of: forming metallic fine particles, having a predetermined particle diameter, on a substrate; heating the metallic fine particles to a predetermined temperature of 300° C. to 400° C. in a reducing atmosphere to cause reduction at surfaces thereof; heating the metallic fine particles to a predetermined reaction temperature in a reactor; and introducing an organic compound vapor into the reactor to grow carbon nanotubes on the metallic fine particles in such a way that a time during which the temperature of the metallic fine particles exceeds 450° C. is 600 seconds or fewer for the period of time before the growth of the carbon nanotubes is started after the heating of the metallic fine particles is started.

13 Claims, 41 Drawing Sheets

SEM images of catalysts on substrates

CARBON NANOTUBE ASSEMBLY AND MANUFACTURING METHOD THEREOF

TECHNICAL FIELD

The present invention relates to a carbon nanotube assembly formed by assembling carbon nanotubes each having the same number of graphene sheet layers and to a manufacturing method thereof.

BACKGROUND OF THE INVENTION

A carbon nanotube is a kind of fibrous carbon having a structure where graphene sheets are layered in an annual growth ring shape, and is a nanocarbon fiber having an extremely high aspect ratio where its diameter is 0.43 nm to several tens of nanometers, while its length reaches normally 100 nm to several hundreds of micrometers. The graphene sheet mentioned here indicates a layer where a carbon atom having an $sp^2$ hybridized orbital, which forms a crystal of graphite, is located at the apex of each hexagon.

A carbon nanotube formed of one graphene sheet is called a single-walled carbon nanotube (hereinafter abbreviated as SWCNT). A carbon nanotube formed of two graphene sheets is called a double-walled carbon nanotube (hereinafter abbreviated as DWCNT). A carbon nanotube formed of three graphene sheets is called a triple-walled carbon nanotube (hereinafter abbreviated as 3WCNT). A carbon nanotube formed of four graphene sheets is called a quad-walled carbon nanotube (hereinafter abbreviated as 4WCNT). A carbon nanotube formed of five graphene sheets is called quint-walled carbon nanotube (hereinafter abbreviated as 5WCNT). A carbon nanotube formed of six or more graphene sheets is often called, in sum, multi-walled carbon nanotube (hereinafter abbreviated as MWCNT). Hereinafter, for indicating the plural number of the carbon nanotube, it is expressed by adding "s" meaning the plural number as in SWCNTs.

On a cylindrical surface of the graphene sheet, a formation is shown in which a hexagonal mesh that is formed by carbon atoms is rolled up in a spiral form and the spiral state is called chirality. It is known that various kinds of physical properties of the carbon nanotube differ in response to the number of graphene sheet layers, diameter of tube, and chirality.

A carbon nanotube manufacturing method uses a CVD method using organic compound vapor as a raw material, an arc discharge method using a graphite electrode, a laser evaporation method, a liquid phase synthesis method, etc.

For example, in Nikolaev P and other six writers, "Gas-phase catalytic growth of single-walled carbon nanotubes from carbon monoxide," Chemical Physics Letters, vol. 313, pp. 91-97, 1999 (Document 1), there is described a method for manufacturing SWCNTs by disproportionation of carbon monoxide under a high pressure using iron particles as a catalyst, and only SWCNTs can be selectively manufactured according to this method.

Furthermore, in S. Maruyama and other six writers, "Growth of vertically aligned single-walled carbon nanotube films on quartz substrates and their optical anisotropy," Chemical Physics Letters, vol. 385, pp. 298-303, 2004 (Document 2), there is disclosed method for selectively forming only SWCNTs on a substrate by a CVD method using ethanol as a raw material.

On the other hand, as a method for manufacturing DWCNTs, in Hisanori Shinohara and other six writers, "Synthesis of high purity double wall carbon nanotubes by the CCVD method using zeolites," Conference Abstract Book of 26th Fullerene Nanotubes General Symposium, Fullerene and Nanotubes Research Society, p. 100, Jan. 7, 2004 (Document 3), there is disclosed a method for manufacturing a carbon nanotube mixture containing 50% to 60% DWCNTs by a CVD method using metallic fine particles as a catalyst carried in zeolites and using an alcohol as a raw material.

Additionally, as means for checking the number of graphene sheet layers of the carbon nanotubes which those skilled in the art normally use, there is generally used a method in which individual carbon nanotubes are observed by a transmission electron microscope to count, on observation images, the number of images of graphene sheet layers which appear on a wall surface of the carbon nanotube. Means for estimating a proportion of a carbon nanotube having a predetermined number of layers to an assembly of numerous carbon nanotubes is as follows. Specifically, the assembly is observed by the transmission electron microscope. Then, the number of layers of each of the numerous carbon nanotubes extracted at random is determined. The proportion is estimated as the number of carbon nanotubes having a predetermined number of layers with respect to the total number of carbon nanotubes thus extracted.

DISCLOSURE OF THE INVENTION

However, even if any of these conventionally known manufacturing methods is used, its product results in a mixture of carbon nanotubes having various structures. Success has not been attained up until now in manufacturing the assembly of carbon nanotubes each having mainly a certain single number of graphene sheet layer, except for SWCNTs. Impurities such as metallic fine particles and carbon particles contained in the product can be removed by oxidation processing and thermal oxidation processing. Meanwhile, the carbon nanotubes, which are different in the number of graphene sheet layers, tube diameter, and chirality, have extremely similar crystal structure, chemical properties and geometrical features to each other. Thus, it is considerably difficult to selectively extract only a specific carbon nanotube from the mixture.

On the other hand, in the case of actively using physical properties relating to the number of graphene sheet layers of the carbon nanotubes to apply as a carbon material having a new property, the number of graphene sheet layers of the carbon nanotubes contained in the carbon material should be desirably single. Accordingly, it has been expected to develop a technique of selectively manufacturing carbon nanotubes having a certain desired number of layers.

The present invention aims to solve the aforementioned problem, and provides a carbon nanotube assembly being formed of carbon nanotubes having mainly a certain desired number of graphene sheet layers and being available as various kinds of carbon materials for an electron source or the like.

The present invention provides a method that is capable of selectively manufacturing carbon nanotubes formed of graphene sheets whose number of layers is n (hereinafter referred to as n-walled carbon nanotubes).

The method of manufacturing n-walled carbon nanotubes according to the present invention is one type of the CVD methods using metallic fine particles as a catalyst. In the CVD method using metallic fine particles as a catalyst, reduction is caused at the surfaces of metallic fine particles, and a catalytic activity is provided thereto. Then the resultant is heated to a predetermined carbon nanotube growth temperature to bring organic compound vapor to be served as a raw material in contact therewith, so that carbon nanotubes are grown on the metallic fine particle surfaces. The present inventors have made studies on the reason why only the desired n-walled carbon nanotube were not able to be selectively manufactured but a mixture of many types was obtained in the conventional carbon nanotube manufacturing method. The present inventors have found out that the cause lay in heating conditions of the metallic fine particles in the metallic fine particle reduction step or carbon nanotube growth step.

Specifically, according to the fact found out by the present inventors, heating time and heating temperature of the metallic fine particles in each of the aforementioned steps as well as introduction timing of organic compound vapor in the carbon nanotube growth step are particularly important to selectively manufacture n-walled carbon nanotubes. Furthermore, in addition to these conditions, the particle diameters of the metallic fine particles are adjusted to a predetermined value according to a certain desired number of n, whereby only desired n-walled carbon nanotubes can be selectively manufactured.

The reason can be roughly understood as follows. Specifically, when heating is carried out under a reducing atmosphere to provide a catalytic activity to the metallic fine particles, aggregation among the metallic fine particles is started under some heating conditions. The particle diameters deviate toward an expanding direction from a desired value. Consequently, desired n-walled carbon nanotubes cannot be manufactured. Moreover, if original variations in particle diameters of the metallic fine particles are large, variations will occur in the number of layers of carbon nanotubes accordingly.

Accordingly, the present inventors have repeatedly made studies on manufacturing conditions under which the original particle diameters can be maintained without aggregation among the metallic fine particles for the period of time before the growth of the carbon nanotubes on the metallic fine particles is started. The studies result in the present invention.

Specifically, a carbon nanotube assembly manufacturing method of the present invention includes the steps of:

forming metallic fine particles, having a predetermined particle diameter, on a substrate;

heating the metallic fine particles to a predetermined temperature of 300° C. to 400° C. in a reducing atmosphere to cause reduction at surfaces thereof;

heating the metallic fine particles to a predetermined reaction temperature in a reactor; and introducing an organic compound vapor into the reactor to grow carbon nanotubes on the metallic fine particles in such a way that a time during which the temperature of the metallic fine particles exceeds 450° C. is 600 seconds or fewer for the period of time before the growth of the carbon nanotubes is started after the heating of the metallic fine particles is started.

In the manufacturing method of the carbon nanotube assembly using the metallic fine particles as a catalyst, it is required that the metallic fine particles be heated in the steps of the reduction of the metallic fine particles and of the growth of the carbon nanotubes. In this case, although the aggregation of metallic fine particles is remarkable when a temperature exceeds 450° C., it can be considered that when the growth of the carbon nanotubes on the metallic fine particles is started, the aggregation among metallic fine particles is prevented by carbon adhered onto the metallic fine particles, and the aggregation does not progress any more. Accordingly, in order to maintain the particle diameters of the metallic fine particles at a predetermined value and to selectively grow n-walled carbon nanotubes, the time during which the temperature of the metallic fine particles exceeds 450° C. may be within a predetermined time for the period of time before the growth of the carbon nanotubes is started after the heating of the metallic fine particles is started. According to the fact found out by the present inventors, the upper limit time is 600 seconds, and 300 seconds or fewer are more preferable.

Moreover, in the carbon nanotube assembly manufacturing method of the present invention, the time during which the temperature of the metallic fine particles exceeds 450° C. is preferably 600 seconds or fewer for the period of time before the organic compound vapor is introduced into the reactor at the reaction temperature after the heating of the metallic fine particles is started.

When the growth of carbon nanotubes on the metallic fine particles is started, the aggregation among the metallic fine particles is prevented as described above. Herein, there is considered a case where the growth start time of carbon nanotubes cannot be directly judged from the outside. Hence, in the present invention, as a reference for the time during which the temperature of the metallic fine particles exceeds 450° C., it is possible to use a time when the metallic fine particles reach a predetermined reaction temperature and the organic compound vapor as a raw material is introduced into the reactor, instead of the growth start time of carbon nanotubes. For the period of time before the organic compound vapor is introduced into the reactor at the reaction temperature after the heating of the metallic fine particles is started, the time during which the temperature of the metallic fine particles exceeds 450° C. is 600 seconds or fewer, more preferably 300 seconds or fewer, whereby the aggregation of metallic fine particles is suppressed and the particle diameters are maintained. Consequently, only desired n-walled carbon nanotubes can be selectively manufactured.

Additionally, the predetermined reaction temperature means a temperature at which it is obvious beforehand that the carbon nanotubes are grown on the metallic fine particles, and a temperature at which the growth of carbon nanotubes is started immediately when the organic compound vapor is introduced into the reactor.

Furthermore, in the carbon nanotube assembly manufacturing method of the present invention, there is included the step of heating the metallic fine particles to a predetermined temperature between 300° C. and 400° C. inclusive in a reducing atmosphere to cause reduction at their surfaces before the step of heating the metallic fine particles to the predetermined reaction temperature.

Although the feature of the present invention lies in reducing a time during which the metallic fine particles are heated to a temperature exceeding 450° C., there is a case in which reduction cannot be caused at the surfaces of metallic fine particles satisfactorily in this conditional range. Consequently, a catalytic activity is insufficient, and an irregularity in the catalytic activity occurs, thereby making it difficult to selectively manufacture only desired n-walled carbon nanotubes. Accordingly, in the present invention, before the metallic fine particles are heated to the predetermined reaction temperature, reductive reaction is satisfactorily caused at a temperature between 300° C. and 400° C. inclusive to provide a necessary catalytic activity. When the heating temperature is lower than 300° C., reductive reaction is not satisfactorily progressed. When the heating temperature exceeds 400° C., the aggregation of metallic fine particles may be started. Thus, the temperature for the reductive reaction needs to be between 300° C. and 400° C. inclusive, and its holding time is preferably 480 seconds or more, and 600 seconds or more is particularly preferable.

Moreover, in the carbon nanotube assembly manufacturing method of the present invention, the predetermined reaction temperature is preferably 500° C. or higher. When the reaction temperature is 500° C. or lower, there is a tendency that the growth of amorphous carbon has priority thereby decreasing the yield of the carbon nanotubes extremely. Accordingly, the reaction temperature is desirably 500° C. or higher. Meanwhile, in the case of setting the reaction temperature to a temperature higher than 1300° C., a material that can withstand a high temperature as a construction material for the substrate and the reactor must be used, resulting in an increase in restriction on the apparatus. Thus, the reaction temperature is preferably 1300° C. or lower.

In order that the time during which the temperature of the metallic fine particles exceeds 450° C. is set to be within the predetermined range, it is required that a rate of temperature rise of the metallic fine particles in a range where a temperature exceeds 450° C. be increased to some degree. For this reason, it may be better to use a radiation heater, which serves as a heating source for the metallic fine particles, and which has a peak of energy spectral distribution in a range of wavelength of 1.0 μm to 1.7 μm. Accordingly, in the carbon nanotube assembly manufacturing method of the present invention, it is preferable that the heating of the metallic fine particles be performed by the radiation heater having a peak of energy spectral distribution in a range of wavelength of 1.0 μm to 1.7 μm.

As a metal that makes up metallic fine particles, it is preferable to use one that acts as a catalyst for carbon nanotube growth reaction, namely, at least one metal selected from the group consisting of cobalt, molybdenum, nickel, and iron or alloys of these metals. Furthermore, as the forming method, it is preferable to use a dipping method using a solution (preferably, ethanol solution) containing ions of these metals or a sputtering method using these metals or alloys of these metals as a target.

Furthermore, as an organic compound serving as a raw material for the carbon nanotube, it is preferable to use at least one compound selected from the group of methane, ethane, propane, butane, ethylene and acetylene, at least one compound selected from the group of methanol, ethanol and propanol, or at least one compound selected from the group of benzene, naphthalene, anthracene, and derivatives of these.

In the carbon nanotube assembly manufacturing method of the present invention having the aforementioned features, in order to adjust the number of graphene sheet layers n of the manufactured carbon nanotubes to a desired value, it is required that the particle diameters of the metallic fine particles be adjusted to be within a predetermined range according to n. As a result of researches independently made by the present inventors, it has been revealed that a mean particle diameter of the metallic fine particles might be set to the following range according to n in order to selectively manufacture n-walled carbon nanotubes.

Specifically, in order to selectively manufacture single-walled (one-walled) carbon nanotubes, the particle diameters of metallic fine particles formed on the substrate are 8 nm or less.

In order to selectively manufacture double-walled carbon nanotubes, the particle diameters of metallic fine particles formed on the substrate are 8 nm to 11 nm.

In order to selectively manufacture triple-walled carbon nanotubes, the particle diameters of metallic fine particles formed on the substrate are 11 nm to 15 nm.

In order to selectively manufacture quad-walled carbon nanotubes, the particle diameters of metallic fine particles formed on the substrate are 15 nm to 18 nm.

In order to selectively manufacture quint-walled carbon nanotubes, the particle diameters of metallic fine particles formed on the substrate are 18 nm to 21 nm.

In addition, the particle diameters of the metallic fine particles according to the present invention are values measured by the following way. Specifically, just before the growth of carbon nanotubes started after the metallic fine particles formed on the substrate were heated to end the reduction step and heating reached a predetermined reaction temperature, the substrate was quenched to room temperature without introducing organic compound vapor and the metallic fine particles on the substrate were observed by a high resolution Scanning Electron Microscope (hereinafter referred to as high resolution SEM). Specifically, the observation was made of the diameters of the metallic fine particles just before the growth of carbon nanotubes started after the end of the reduction step. Then, the measurement was made of the particle diameter of each of the reduced metallic fine particles seen in white color in the SEM images using a ruler. Furthermore, the particle diameter of the metallic fine particle mentioned here indicates a value of a short diameter in a case where the outer shape of the metallic fine particle is not a perfectly spherical shape.

By the development of the aforementioned manufacturing method, the present inventors have succeeded in manufacturing a carbon nanotube assembly having an extremely high wall number purity (proportion of n-walled carbon nanotubes to the entire carbon nanotube assembly), which has not been manufactured so far, as an assembly having a size that can be used as various kinds of carbon materials for an electron source or the like.

Specifically, the carbon nanotube assembly of the present invention is described as the following (i) to (iv).

(i) A carbon nanotube assembly, which is an assembly of carbon nanotubes directly grown on a substrate, and in which a proportion of double-walled carbon nanotubes to carbon nanotubes contained in the assembly is 70% or more.

(ii) A carbon nanotube assembly, which is an assembly of carbon nanotubes directly grown on a substrate, and in which a proportion of triple-walled carbon nanotubes to carbon nanotubes contained in the assembly is 50% or more.

(iii) A carbon nanotube assembly, which is an assembly of carbon nanotubes directly grown on a substrate, and in which a proportion of quad-walled carbon nanotubes to carbon nanotubes contained in the assembly is 50% or more.

(iv) A carbon nanotube assembly, which is an assembly of carbon nanotubes directly grown on a substrate, and in which a proportion of quint-walled carbon nanotubes to carbon nanotubes contained in the assembly is 50% or more.

Moreover, in the present invention, by increasing deposition density of the metallic fine particles on the substrate, it is possible to appropriately obtain the carbon nanotube assemblies described in the above (i) to (iv) in which the growth directions of carbon nanotubes are oriented uniformly along a normal line direction with respect to the surface of the substrate.

Furthermore, a field emission display of the present invention is characterized by using the carbon nanotube assembly of the present invention as an electron source.

According to the manufacturing method of the carbon nanotube assembly of the present invention, it is possible to selectively manufacture specific n-walled carbon nanotubes in a range of n=1 to 5 as an assembly having a size that can be used as various kinds of carbon materials for an electron source or the like. According to this manufacturing method, it is possible to manufacture the assembly, which is originally formed of mainly n-walled carbon nanotubes. Thus, there is no need to select a specific n-walled carbon nanotube from a mixture of many types of carbon nanotubes, and it is possible to manufacture an assembly of carbon nanotubes having the same characteristic and to facilitate uses to various types of devices.

Furthermore, the carbon nanotube assembly of the present invention, since the carbon nanotubes on the surface have the same number of graphene sheet layers, can be easily used to devices such as a field emission display device, and also can improve various kinds of characteristics relating to physical properties depending on the number of graphene sheet layers.

DETAILED DESCRIPTION OF THE PREFERRED EMBODIMENTS

Figure 1:
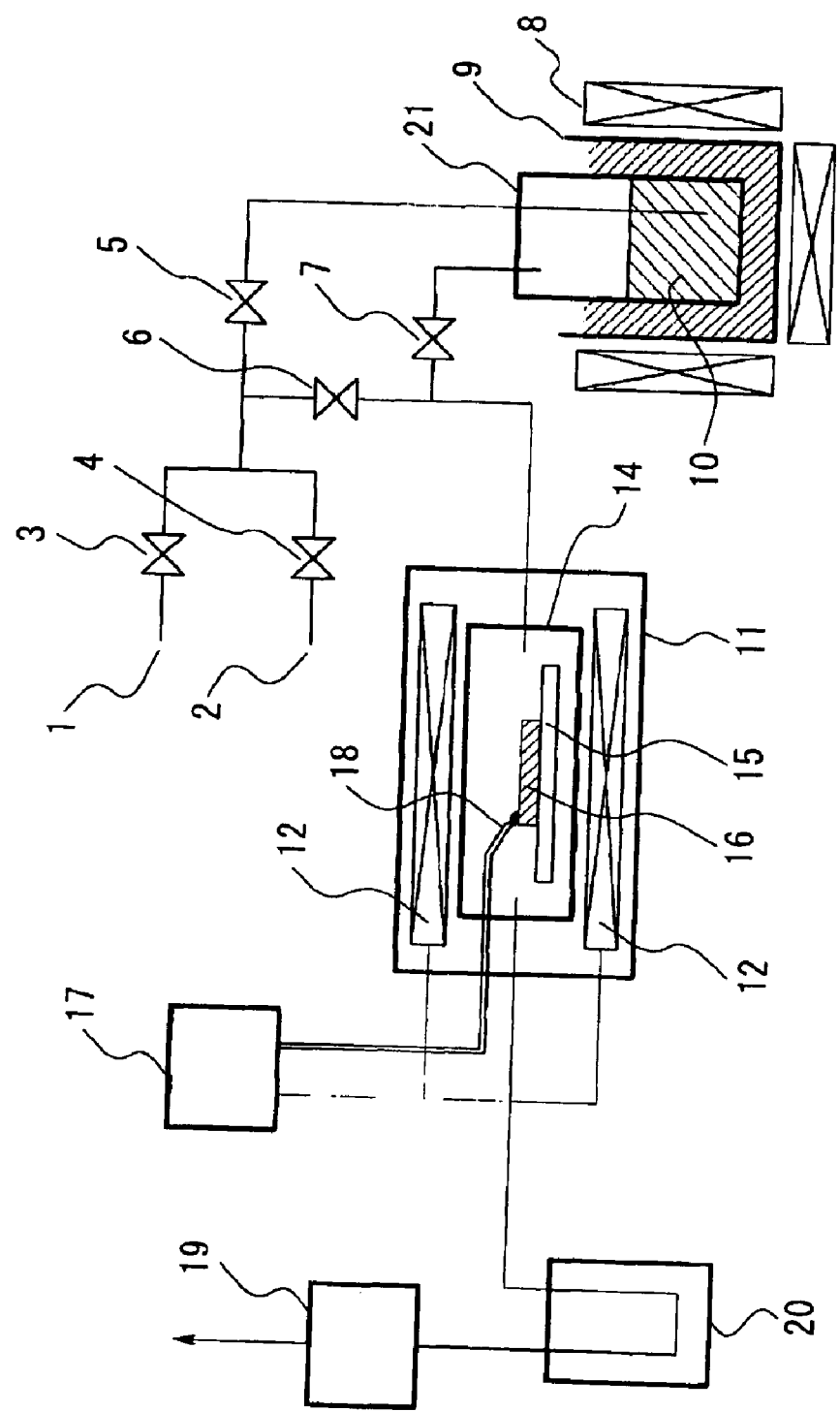
FIG. 1 is a schematic view illustrating one example of a carbon nanotube manufacturing apparatus.

A carbon nanotube assembly manufacturing method of the present invention includes a metallic fine particle forming step, a reduction step, and a CVD step. The metallic fine particle forming step is a step of forming metallic fine particles on a substrate. The reduction step is a step of causing reduction at a metallic fine particle surface to provide a catalytic activity. The CVD step is a step of growing carbon nanotubes using the metallic fine particle as a catalyst. The following will explain a preferred embodiment of the carbon nanotube manufacturing method according to the present invention for each step.

[Metallic Fine Particle Forming Step]

First, a substrate is prepared. As a substrate material, it is possible to use silica glass, a silicon single crystal, various kinds of ceramics, and metals. Furthermore, the surface quality of the substrate must be smoothly polished to form metallic fine particles with a desired particle diameter, and a surface roughness (RMS) is set to preferably several nm or less. Although any size and thickness of the substrate may be used, an increase in heat capacity of the substrate tends to make it technically difficult to rapidly heat the metallic fine particles in the reduction step and afterward. Thus, the thickness of the substrate may be about 5 mm or less.

After being prepared, the substrate is desirably subjected to precision cleaning, as pretreatment, with a detergent, water, an alcoholic solvent, etc., under supersonic vibration in order to uniformly form metallic fine particles with a desired particle diameter.

As a metal that makes up metallic fine particles, a metal that acts as a catalyst for carbon nanotube growth is used. Specifically, it may be better to use at least one metal selected from the group consisting of cobalt, molybdenum, nickel and iron or an alloy of these metals.

The particle diameters of the metallic fine particles are adjusted according to the number of graphene sheet layers of the carbon nanotubes to be manufactured. Specifically, in the case of manufacturing single-walled carbon nanotubes, a metallic fine particle group having a particle diameter of 8 nm or less is formed on the substrate.

In addition, in the case of manufacturing double-walled carbon nanotubes, a metallic fine particle group having a particle diameter between 8 nm and 11 nm inclusive (preferably, between over 8 nm and 11 nm or less) is formed on the substrate.

Furthermore, in the case of manufacturing triple-walled carbon nanotubes, a metallic fine particle group having a particle diameter between 11 nm and 15 nm inclusive (preferably, between over 11 nm and 15 nm or less) is formed on the substrate.

Moreover, in the case of manufacturing quad-walled carbon nanotubes, a metallic fine particle group having a particle diameter between 15 nm and 18 nm inclusive (preferably, between over 15 nm and 18 nm or less) is formed on the substrate.

Still moreover, in the case of manufacturing quint-walled carbon nanotubes, a metallic fine particle group having a particle diameter between 18 nm and 21 nm inclusive (preferably, between over 18 nm and 21 nm or less) is formed on the substrate.

In addition, when the outer shape of metallic fine particle deviates from a spherical shape, particle diameter control is performed, such that the shortest diameter is regarded as a particle diameter.

A first method of forming metallic fine particles having a desired particle diameter on the substrate is a magnetron sputtering method. The substrate is stored in a film-forming chamber of a magnetron sputtering apparatus to evacuate up to a high vacuum. Next, a noble gas such as argon gas is introduced to the film-forming chamber to adjust the pressure to about 0.1 Pa or 3 Pa. As a target, one that is made of each of the aforementioned metal is used, and a negative high voltage is applied to the target to perform sputtering. Single atoms emitted from the target surface by sputtering or metallic fine particles with cluster size are adhered onto the substrate placed at a position opposite to the target.

The particle diameters of the metallic fine particles are adjustable according to the sputtering condition. The particle diameters can be reduced, as power to be input to the target is small and as a discharge time is shortened. Specifically, a power density may be adjusted to about 0.2 to 1 W/cm$^2$, and a discharge time may be adjusted in the range of several seconds or several ten seconds.

Furthermore, variations in particle diameters of metallic fine particles (standard deviation) can be controlled by adjusting a discharge time. Since the shorter the discharge time is, the smaller the variations in particle diameters are, a selection of appropriate discharge time allows the variations in particle diameter to be shortened to a predetermined value or less as required.

A second method of forming metallic fine particles having a desired particle diameter on the substrate is a dip-coat method. The dip-coat method is a method in which the substrate is dipped in a solution containing a metal ion and withdrawn therefrom, in which a solvent thereof is removed, and in which metallic fine particles are deposited on the substrate.

As a solution used in the dip-coat method, it is possible to use a solution that is obtained by dissolving metallic salts such as acetate, nitrate, and chloride, whose metal is to be deposited, in a solvent such as ethanol, acetone, water, etc.

In the case of forming the metallic fine particles on the substrate using the dip-coat method, the particle diameters of the metallic fine particles can be controlled by metal ion concentration in the solution. The lower the metal ion concentration is, the smaller the particle diameters of the metallic fine particles are. Conversely, the higher the metal ion concentration is, the larger the particle diameters are. Moreover, the particle diameter can be controlled by adjusting substrate withdrawal speed other than the metal ion concentration.

The substrate withdrawal speed affects the variations in particle diameter. In order to reduce the variations in particle diameter, it is useful to reduce the substrate withdrawal speed. Accordingly, the substrate withdrawal speed may be adjusted in such a way that the particle diameter and the variations in particle diameter as required reach a predetermined value.

Other than the magnetron sputtering method and dip-coat method, it is possible to form the metallic fine particles having a desired particle diameter by shortening a deposition time in a vacuum film-forming process such as vacuum deposition, etc., thereby making.

[Reduction Step]

The surfaces of the metallic fine particles formed on the substrate are often oxidized, and the carbon nanotubes are difficult to be uniformly grown if left unprocessed. For this reason, reduction is caused at the metallic fine particle surfaces before the carbon nanotubes are grown.

The substrate on which the metallic fine particles are formed is stored in a reactor, and the interior of the reactor is kept in a reducing atmosphere, and the metallic fine particles are heated to a predetermined reductive reaction temperature, whereby reduction is caused at the metallic fine particle surfaces. In order to make the interior of the reactor in a reducing atmosphere, a reducing gas such as a hydrogen gas, a diluted hydrogen gas and a carbon monoxide gas is introduced into the reactor. Moreover, in the case of a reducing atmosphere containing a hydrogen gas, a hydrogen concentration is preferably 1 volume percentage or more. Furthermore, a pressure in the reactor is not particularly limited, and a pressure ranging from 0.1 Pa to $10^5$ Pa is preferable.

If a temperature for the reductive reaction is 300° C. or higher, the reduction can be caused at the metallic fine particle surfaces. Furthermore, in the present invention, as described later, it is required that a time during which the temperature of the metallic fine particles exceeds 450° C. be 600 seconds or fewer before the growth of the carbon nanotubes is started. It is difficult to sufficiently progress a reductive reaction under such a condition. Thus, reduction must be caused at the surfaces of the metallic fine particles beforehand at 400° C. or lower at which the metallic fine particles are not aggregated. In other words, if the temperature for the reductive reaction is between 300° C. and 400° C. inclusive, the reductive reaction can be sufficiently progressed without aggregating the metallic fine particles. As a result, it is possible to manufacture carbon nanotubes with a high wall number purity. Moreover, a holding time at the above-mentioned temperature for the reductive reaction is preferably 480 seconds or more, and 600 seconds or more are particularly preferable. When the holding time is below the above-mentioned lower limit, reduction is not sufficiently caused at the surfaces of the metallic fine particles. As a result, the carbon nanotubes tend to be insufficiently grown.

[Manufacturing Apparatus of Carbon Nanotube Assembly]

FIG. 1 is an example of a manufacturing apparatus that can implement a carbon nanotube assembly manufacturing method according to the present invention.

At the center of a reactor 11, there is placed a furnace tube 14 that allows evacuation and gas replacement. At the outside of the furnace tube 14, there is provided with a radiation heater (favorably an infrared ray furnace) 12 having a peak of energy spectral distribution in the range of wavelength of 1.0 μm to 1.7 μm, and a substrate 16 on a substrate holder 15 placed in the interior of the furnace tube 14 can be uniformly and rapidly heated. The temperature of the substrate 15 is measured by a thermometer 18. A power supply to the heater 12 is controlled by a control device 17 in such a way to be a predetermined temperature programmed beforehand.

At the outside of the reactor 11, a reducing gas supply line 1 and an inert gas supply line 2 are provided. These gases are supplied to the manufacturing apparatus through a valve 3 and a valve 4. Each gas flow can be controlled to a constant value by a flow control mechanism (not shown) such as a mass flow controller, etc.

The reducing gas and the inert gas are supplied to the interior of a raw material vessel 21 through a valve 5. The raw material vessel 21 is structured to be heatable to a predetermined temperature by a heater 8 and a water bath 9, so that vapor of a raw material 10 filled in the interior can be generated at a constant vapor pressure. The raw material vapor generated in the interior of the raw material vessel 21 is supplied to the furnace tube 14 in the reactor 11 through the valve 7 independently or together with the reducing gas or inert gas, which is supplied through the value 5. At this time, the opening of a valve 6 is appropriately adjusted, thereby making it possible to control each supply rate of the reducing gas, the inert gas and the organic compound vapor independently.

Each of the above gases supplied to the furnace tube 14 is used in the reductive reaction of the metallic fine particles on the substrate placed in the furnace tube or the carbon nanotube growth reaction on the metallic fine particles. An evacuation gas containing a by-product and the like is evacuated to the outside of the system through a removal device 20 such as a cold trap and an evacuation device 19 such as an oil rotary pump.

Additionally, the manufacturing apparatus having the structure shown in FIG. 1 can be used in not only the reduction step but also a next CVD step.

[CVD Step]

After reduction is caused at the surfaces of the metallic fine particles in the reduction step, these are used as a catalyst to grow the carbon nanotubes. In addition, it is desirable that the reduction step and the carbon nanotube growth step be continuously carried out by the same apparatus. This is because when the metallic fine particles with reduced surfaces are exposed to an oxidizing atmosphere such as atmospheric air, the fine particle surfaces are oxidized again, and a catalytic activity is decreased to make it difficult to grow desired carbon nanotubes.

In order to grow the carbon nanotubes on the metallic fine particles, the metallic fine particles are heated to a predetermined reaction temperature to come in contact with the organic compound vapor. The following will explain the procedure in the case where the apparatus in FIG. 1 is used as an example of the CVD step.

After the reduction is caused at the surfaces of the metallic fine particles on the substrate 16 in the previous step, the metallic fine particles are heated up to the predetermined reaction temperature. Although the reaction temperature differs according to kinds of catalytic metals and kinds of organic compounds to be used as a raw material, about 600° C. to 1000° C. is favorable in the case of using, for example, ethanol as the raw material, and about 700° C. to 1200° C. is favorable in the case of using methane as the raw material.

In this respect, when the reaction temperature is lower than 500° C., a drawback arises that the growth of amorphous carbon has priority to reduce a yield of the carbon nanotubes. Meanwhile, in the case of setting the reaction temperature to a temperature higher than 1300° C., a material that can withstand a high temperature as a construction material for the substrate and the reactor must be used, resulting in an increase in restriction on the apparatus. Accordingly, the reaction temperature is preferably 500° C. or higher, and 1300° C. or lower is more preferable.

An atmosphere during the temperature elevation may be maintained as a reducing atmosphere, or may be substituted by an inert gas atmosphere such as a noble gas. What is important is that a time during which the temperature of the metallic fine particles exceeds 450° C. should be 600 seconds or fewer, more preferably 300 seconds or fewer for the period of time before the growth of the carbon nanotubes is started. This upper limit time includes the time during which the temperature exceeds 450° C. in the previous step. The reason is that when the temperature of the metallic fine particles exceeds 450° C., the metallic fine particles start to be aggregated regardless of the atmosphere unless the growth of the carbon nanotubes is started.

In order to increase the temperature of metallic fine particles to the predetermined reaction temperature and start the growth of carbon nanotubes within the aforementioned limit time, a rapid rise in temperature of the metallic fine particles is required. As means for obtaining a necessary rate of temperature rise, the radiation heater 12 having a peak of energy spectral distribution in the range of wavelength of 1.0 μm to 1.7 μm is provided in the manufacturing apparatus shown in FIG. 1. Using such the heater 12 makes it possible to rapidly heat the metallic fine particles to be heated and the substrate 16 on which the metallic fine particles are formed.

Since the particle diameters of the metallic fine particles are extremely small, it is difficult to perform control in a way that the temperature is directly measured to obtain a desired rate of temperature rise. Accordingly, the temperature of the surface of the substrate 16 on which the metallic fine particles are formed (surface having metallic fine particles) is measured by the thermometer 18 such as a thermocouple, whereby the heater 12 is controlled by the control device 17 in such a way to obtain a predetermined rate of temperature rise. Since the metallic fine particles have extremely small heat capacity and high thermal conductivity because the particles are metal, the temperature of metallic fine particles can be regarded as being substantially the same as the temperature of the substrate surface. Thus, the temperature of metallic fine particles can be controlled by the aforementioned control method.

Additionally, even if the metallic fine particles are formed on both surfaces of the substrate, measurement of one surface of the substrate is sufficient when the substrate 16 is thin enough and when the temperatures of both surfaces are substantially equal.

When the aforementioned heating means is used to heat the metallic fine particles up to the predetermined reaction temperature, organic compound vapor serving as a raw material for the carbon nanotube is introduced into the furnace tube 14 in the reactor 11.

As an organic compound serving as a raw material for the carbon nanotube, it is possible to use at least one compound selected from the group of straight-chain hydrocarbons such as methane, ethane, propane, butane, ethylene and acetylene, or at least one compound selected from the group of straight-chain monohydric alcohols such as methanol, ethanol and propanol, or at least one compound selected from the group of aromatic hydrocarbons such as benzene, naphthalene, anthracene, and derivatives of these. Moreover, other than these compounds, it is possible to use an organic compound as a raw material from which carbon nanotubes can be generated on the metallic fine particles.

When the organic compound vapor is introduced into the reactor and if the temperature of the metallic fine particles reaches the predetermined reaction temperature, the growth of carbon nanotubes is started immediately. The metallic fine particle surfaces are covered with the raw material compound, carbon, intermediate product and the like after the growth of carbon nanotubes is started, and therefore, even if the reaction temperature exceeds 450° C., the aggregation of the metallic fine particles does not progress any more, and the same particle diameter as that obtained at the growth start time is maintained, and the carbon nanotubes, having the number of graphene sheet layers according to the particle diameter, grow continuously.

Accordingly, in order to suppress the aggregation of metallic fine particles and selectively manufacture only carbon nanotubes having a certain desired number of graphene sheet layers, the time during which the temperature of the metallic fine particles exceeds 450° C. may be within a predetermined time for the period of time before the growth of the carbon nanotubes is started after the heating of the metallic fine particles is started. Thus, the time when the growth of carbon nanotubes is started can be regarded as the time when the metallic fine particles reach the predetermined reaction temperature and the organic compound vapor as the raw material is introduced into the reactor. Herein, it is required that the time during which the temperature of the metallic fine particles exceeds 450° C. be 600 seconds or fewer, and 300 seconds or fewer is more preferable. This is because the 450° C., the more the degree of aggregation of the metallic fine particles can be reduced, resulting in improvement of the wall number purity of carbon nanotubes.

According to the aforementioned procedure, after the carbon nanotubes having a desired length are grown on the metallic fine particles, the supply of organic compound vapor is stopped, the interior of the reactor 11 is returned to the normal temperature to take out the substrate having a surface on which the carbon nanotubes are formed. The substrate having the surface on which the carbon nanotubes are formed can be used as a carbon nanotube assembly directly depending on the application use. Alternatively, the carbon nanotubes are separated from the substrate by appropriate means and subjected to acid processing and oxidization processing as required to be refined, and thereafter the carbon nanotubes can be used as a carbon material made of powdered carbon nanotube assembly.

EXAMPLES

Although the following will more specifically explain the present invention based on Examples and Comparative Example, the present invention is not limited to the following Examples.

Example 1

In Example 1, a substrate of silica glass was used to manufacture single-walled carbon nanotubes using cobalt-molybdenum as a catalyst.

First, an ethanol solution containing cobalt-molybdenum was prepared. A predetermined amount of cobalt acetate-4 hydrate (purity of 99% or more) and that of molybdenum acetate (dimer, purity of 99% or more) were weighted and dissolved in ethanol (purity of 99.5% or more), whereby a solution having a cobalt concentration of 0.01 mass % and a molybdenum concentration of 0.01 mass % was prepared. Additionally, the cobalt and molybdenum concentrations are metal reduced values.

Next, two types of silica glass substrates with optically polished surfaces of 20 mm×20 mm×0.5 mm and φ 30 mm×3 mm were prepared and dipped in the cobalt-molybdenum solution for 10 seconds, and thereafter were withdrawn at a rate of 8 mm/sec. The withdrawing was carried out in the atmosphere. The substrate withdrawn from the solution was heated in the atmosphere, whereby the alcohol as a solvent was removed, and cobalt-molybdenum fine particles were formed on the substrate.

The substrate having the surface on which cobalt-molybdenum fine particles with a predetermined particle diameter were formed by the aforementioned step were stored in the furnace tube 14 of the manufacturing apparatus having the structure shown in FIG. 1. At this time, the thermometer 18 was brought in contact with the surface of the substrate to measure the temperature of the substrate.

Next, the reactor was sealed, and the interior was evacuated to 0.4 Pa. Thereafter the valve 3 and valve 6 were opened to supply a hydrogen gas, and an internal pressure of the furnace tube 14 was set to 70 kPa. An electric conduction to the heater 12 was started while the internal pressure of the furnace tube 14 was maintained. Power supply to the heater (infrared ray furnace made by ULVAC-RIKO. Inc., RHL-P610) 12 was controlled by the control device 17 in such a way that the substrate temperature was increased at 5° C./sec.

When the substrate temperature reached 400° C., the state was maintained for 30 minutes to sufficiently cause reduction at the surfaces of the cobalt-molybdenum fine particles and to provide a catalytic activity for carbon nanotube growth.

The above reduction step ended, and heating was subsequently carried out up to 800° C. that was set as the reaction temperature at a rate of temperature rise of 1.3° C./sec. When reaching 800° C., the valve 5 and valve 7 were opened immediately, and ethanol vapor was introduced into the reactor from the raw material vessel 21 filled with ethanol to start the growth of carbon nanotubes. At this time, time Δt passed before the growth of the carbon nanotubes started after the substrate temperature exceeded 450° C. was about 270 seconds.

Figure 2:
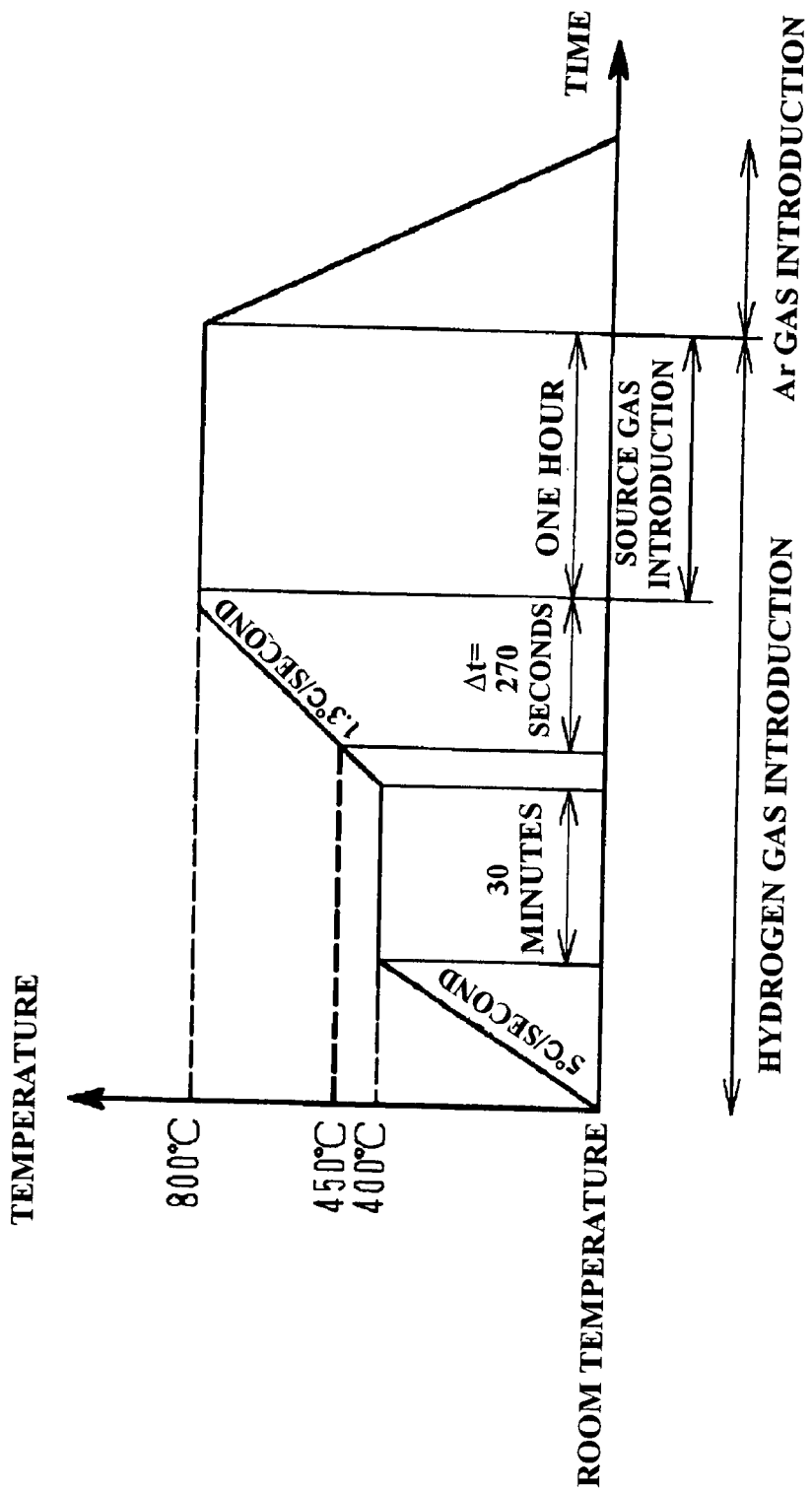
FIG. 2 is a temperature profile showing a manufacturing condition in Examples.

During the growth of carbon nanotubes, the temperature of substrate 16 and the internal pressure of the furnace tube 14 were maintained at 800° C. and at 1 kPa, respectively, and held for one hour. Thereafter introduction of a hydrogen gas and ethanol vapor was stopped. The substrate 16 was cooled up to room temperature while the valve 4 was opened to pass an Ar gas into the furnace tube 14. FIG. 2 is a temperature profile of the entire step.

Figure 3:
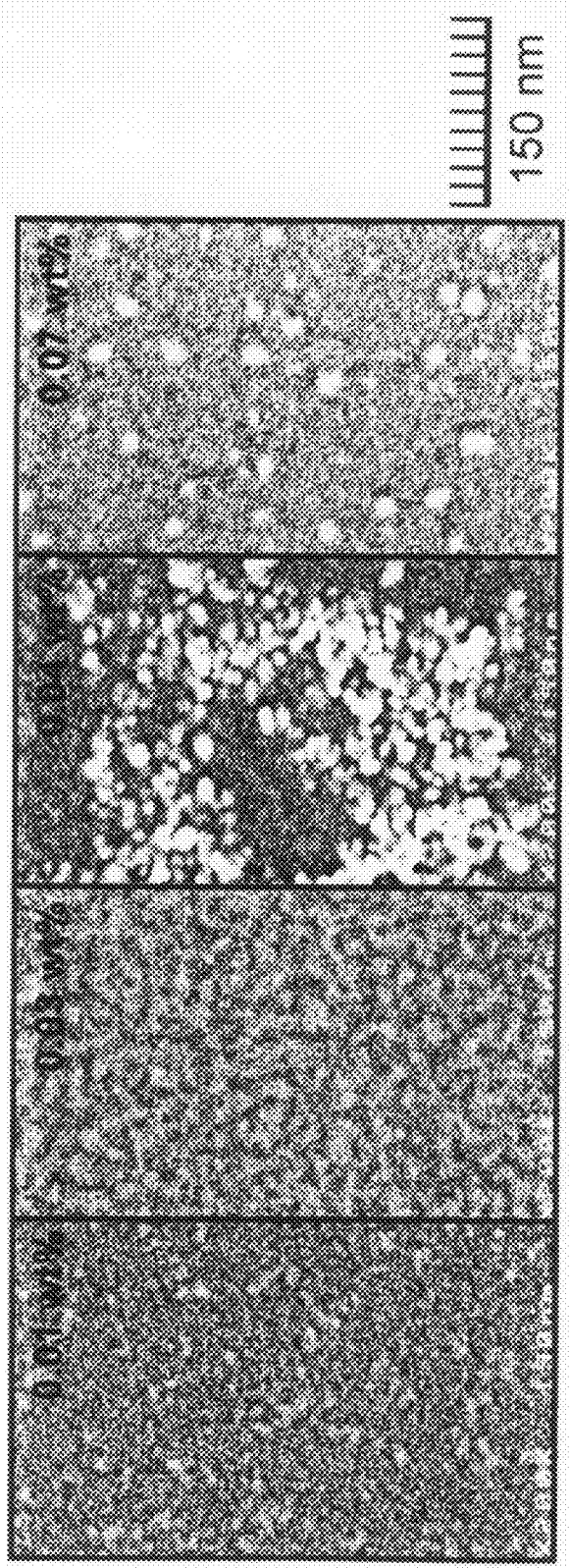
FIG. 3 is an SEM image of metallic fine particles on a substrate obtained in Examples 1, 3, 5 and 7.
Figure 4:
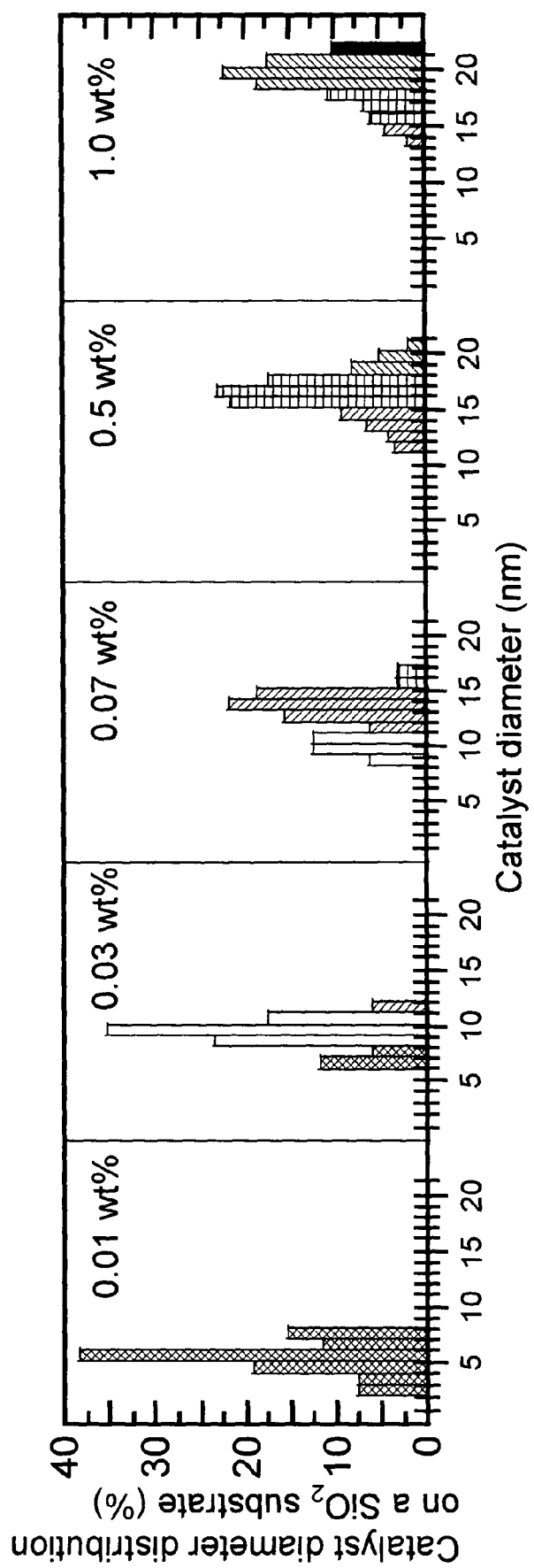
FIG. 4 is a graph showing particle diameter distributions of metallic fine particles on a substrate obtained in Examples 1, 3, 7, 9 and 10.

Moreover, measurement was made of the particle diameters of the metallic fine particles just before the growth of the carbon nanotubes started as follows. Specifically, just before the growth of the carbon nanotubes started after the above reduction process ended and subsequently heating reached 800° C. that was set as the reaction temperature, the substrate was quenched to room temperature without introducing ethanol vapor. Then, the metallic fine particles on the substrate were observed by a high resolution SEM (Scanning Electron Microscope). FIG. 3 shows an SEM image of the metallic fine particles on the substrate obtained in Example 1. In connection with each of the reduced metallic fine particles seen in white color in SEM images shown in FIG. 3, the particle diameter was measured using a ruler. As a result, it was recognized that a particle diameter distribution (range of catalyst diameter: 2.1 to 8.0 nm, mean value: 5.6 nm, and standard deviation: 1.29) shown in FIG. 4 was given.

Next, in order to check the number of graphene sheet layers and an outer diameter in connection with each of carbon nanotubes that form the carbon nanotube assembly, carbon nanotubes were mechanically picked up from an area of 10 mm×10 mm on the substrate and placed on a copper mesh for observation to conduct observation by a transmission electron microscope (hereinafter referred to as TEM). The TEM used in observation was HF-2000 made by Hitachi Ltd., and acceleration voltage was 200 kV. FIGS. 5 to 16 are TEM images of the carbon nanotubes manufactured in this Example.

Figure 5:
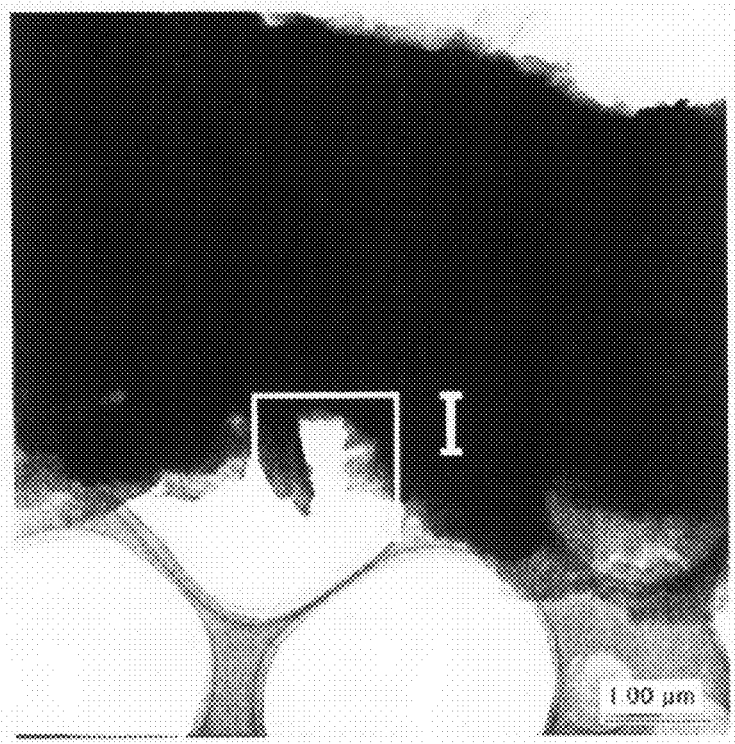
FIG. 5 is a TEM image of the carbon nanotubes manufactured in Example 1.
Figure 6:
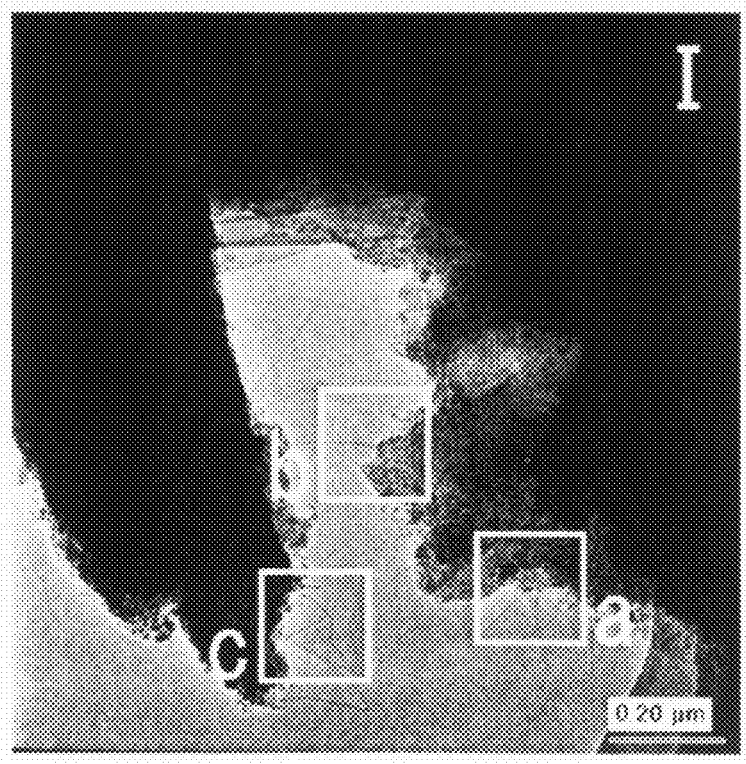
FIG. 6 is a TEM image of the carbon nanotubes manufactured in Example 1.
Figure 10:
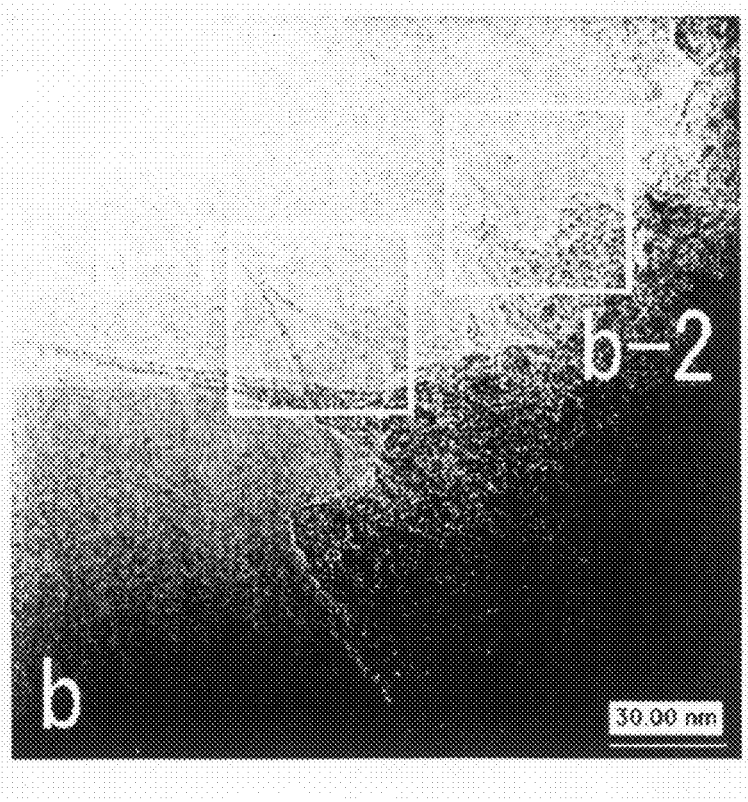
FIG. 10 is a TEM image of the carbon nanotubes manufactured in Example 1.
Figure 13:
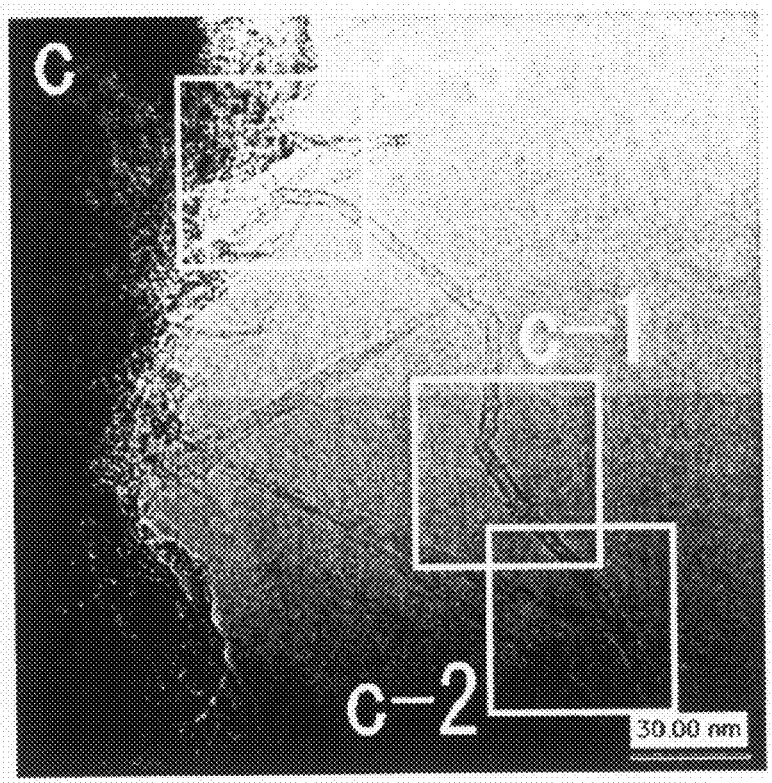
FIG. 13 is a TEM image of the carbon nanotubes manufactured in Example 1.

FIG. 5 shows a case where the observation was made at the lowest magnification, and FIG. 6 shows an observed enlarged area I. Moreover, FIGS. 7, 10, and 13 show enlarged areas a, b, and c of FIG. 6, respectively.

Figure 7:
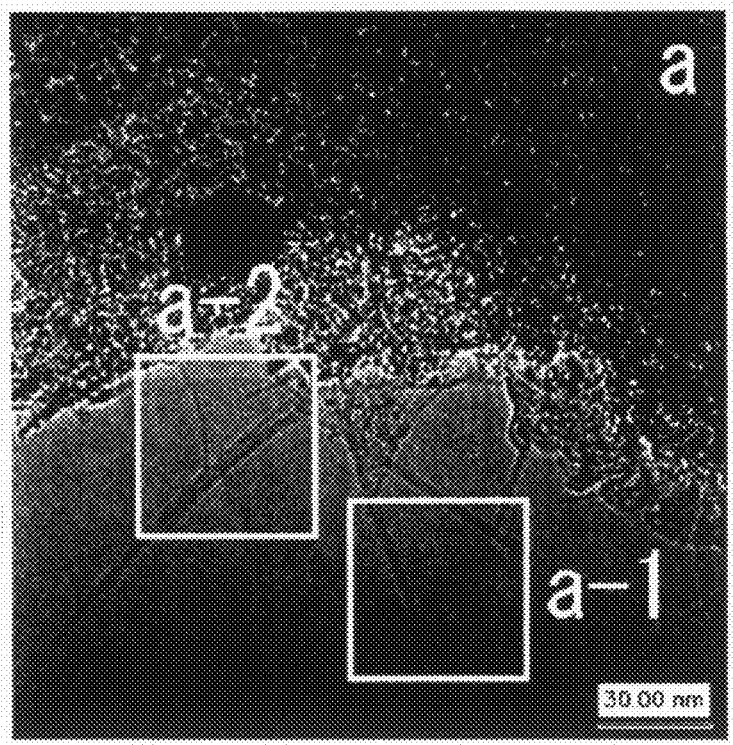
FIG. 7 is a TEM image of the carbon nanotubes manufactured in Example 1.
Figure 8:
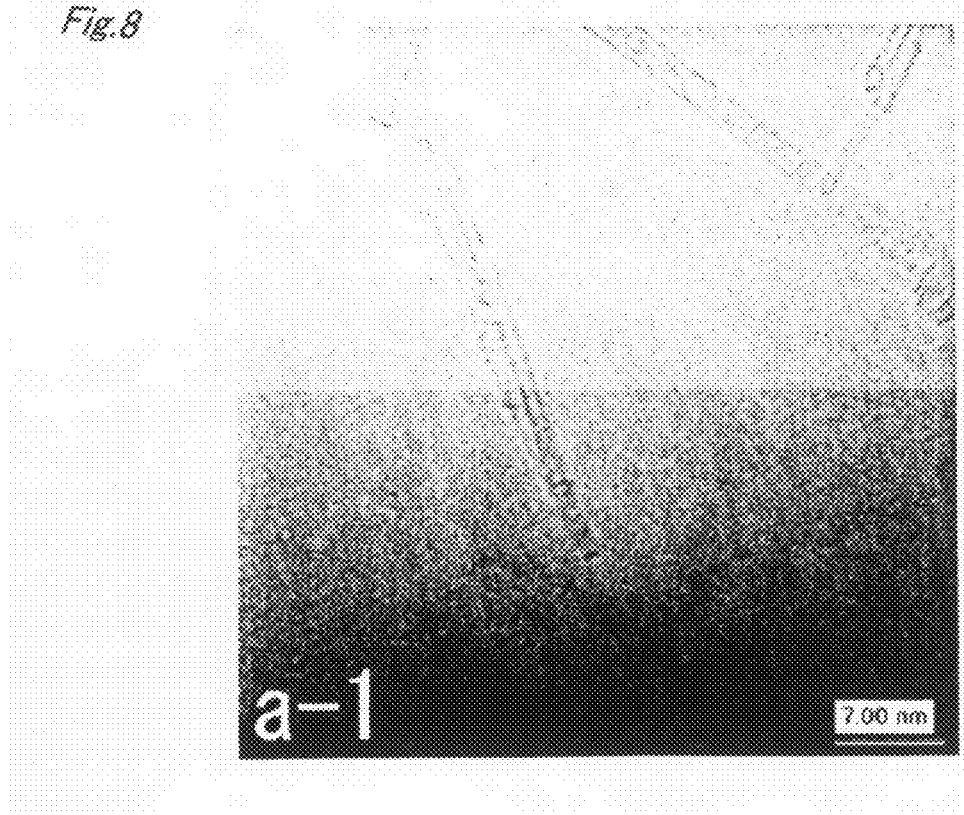
FIG. 8 is a TEM image of the carbon nanotubes manufactured in Example 1.
Figure 9:
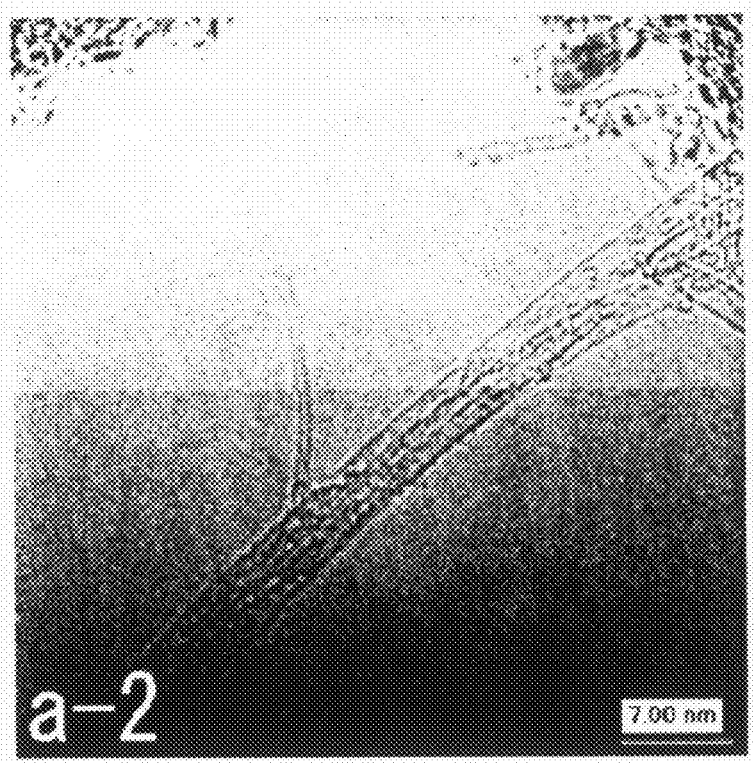
FIG. 9 is a TEM image of the carbon nanotubes manufactured in Example 1.
Figure 11:
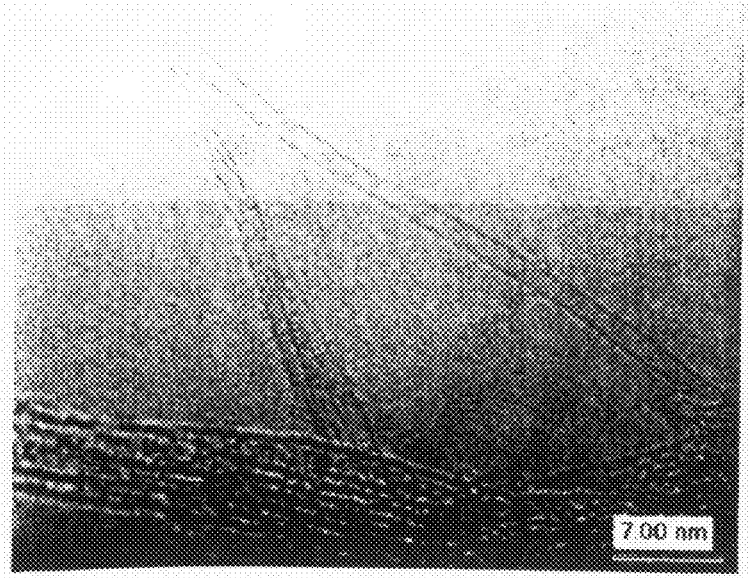
FIG. 11 is a TEM image of the carbon nanotubes manufactured in Example 1.
Figure 12:
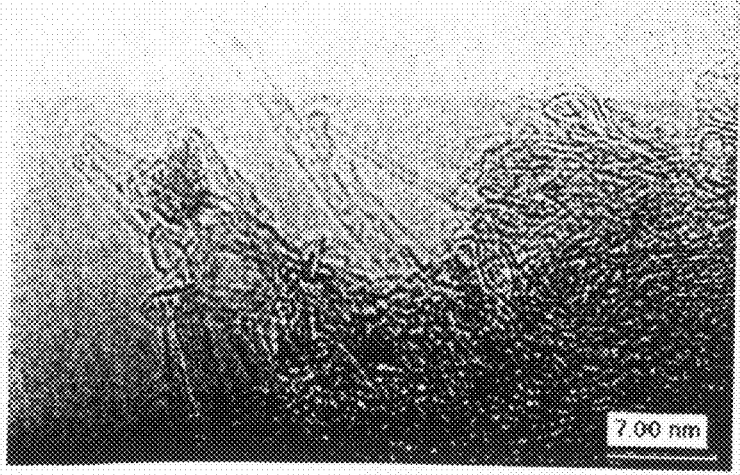
FIG. 12 is a TEM image of the carbon nanotubes manufactured in Example 1.
Figure 14:
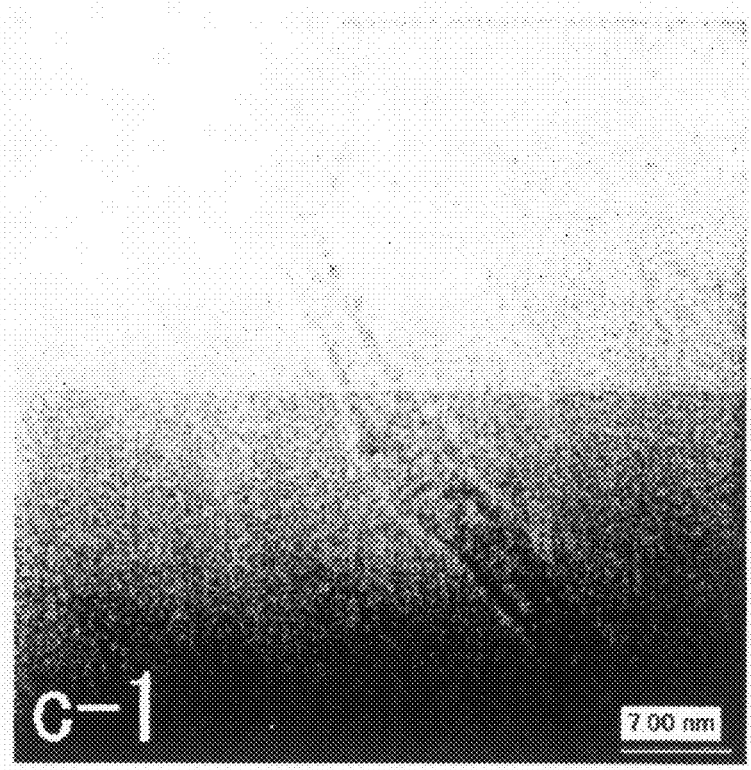
FIG. 14 is a TEM image of the carbon nanotubes manufactured in Example 1.
Figure 15:
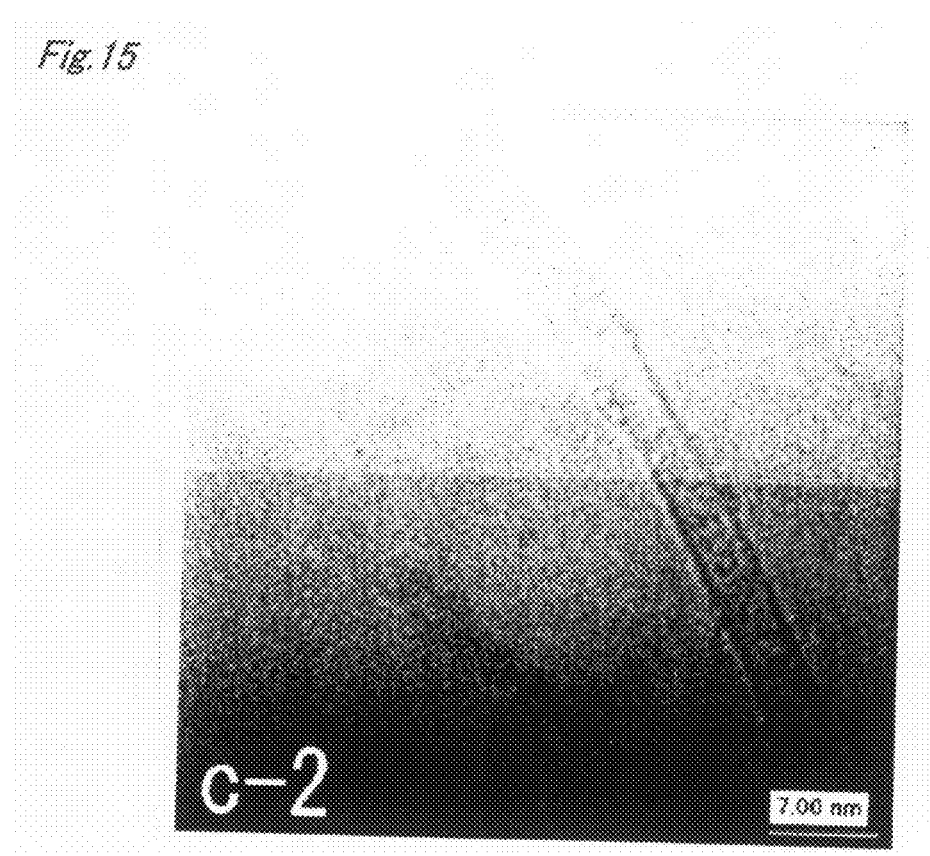
FIG. 15 is a TEM image of the carbon nanotubes manufactured in Example 1.
Figure 16:
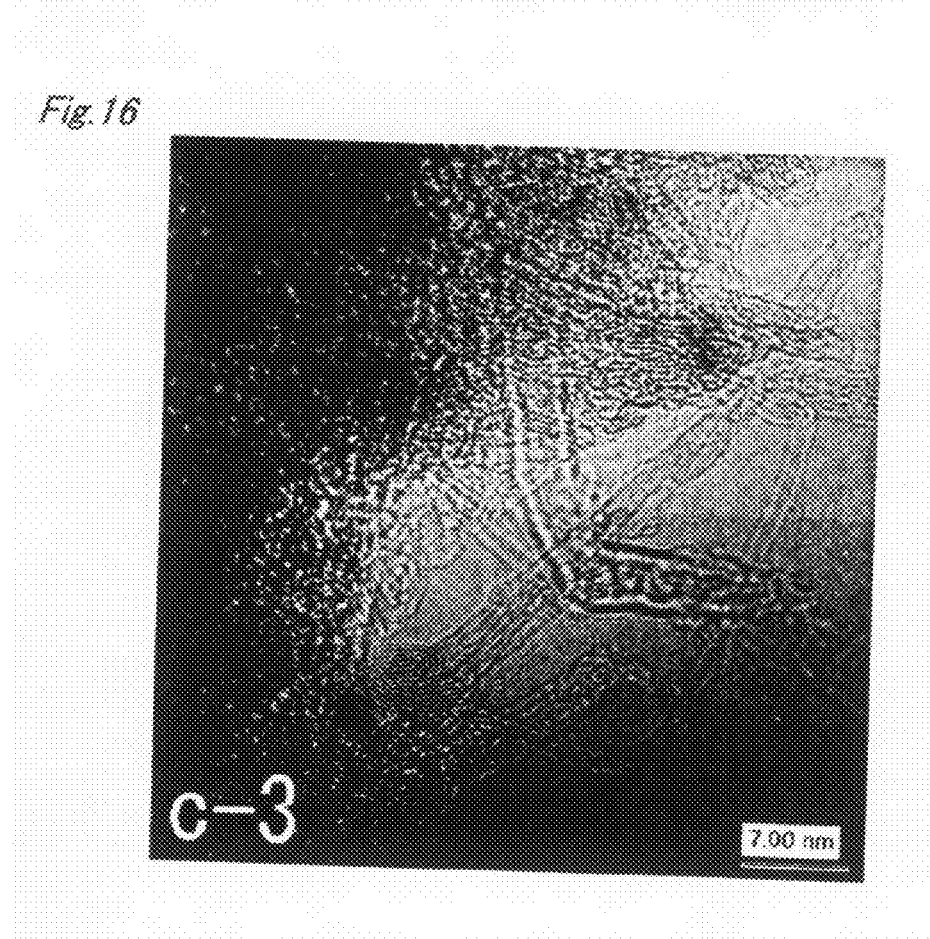
FIG. 16 is a TEM image of the carbon nanotubes manufactured in Example 1.

FIG. 8 shows an enlarged image of an area a-1 in FIG. 7. The graphene sheet that forms a wall surface of the carbon nanotube is observed as a dark line in the TEM image of the carbon nanotube. Only one layer is recognized on the carbon nanotube wall surface in FIG. 8. Thus, this can be judged as a single-walled carbon nanotube. Similarly, in FIG. 9 showing an enlarged image of an area a-2 in FIG. 7, only one graphene sheet layer is recognized on the wall surface in the image of the observed carbon nanotube, and thus this can be judged as a single-walled carbon nanotube. Likewise, it is obvious that any of carbon nanotubes, observed in FIGS. 11 and 12 showing enlarged images of areas b-1 and b-2 in FIG. 10, and observed in FIGS. 14, 15, and 16 showing enlarged images of areas c-1, c-2 and c-3 in FIG. 13, respectively, is a single-walled carbon nanotube.

Figure 56:
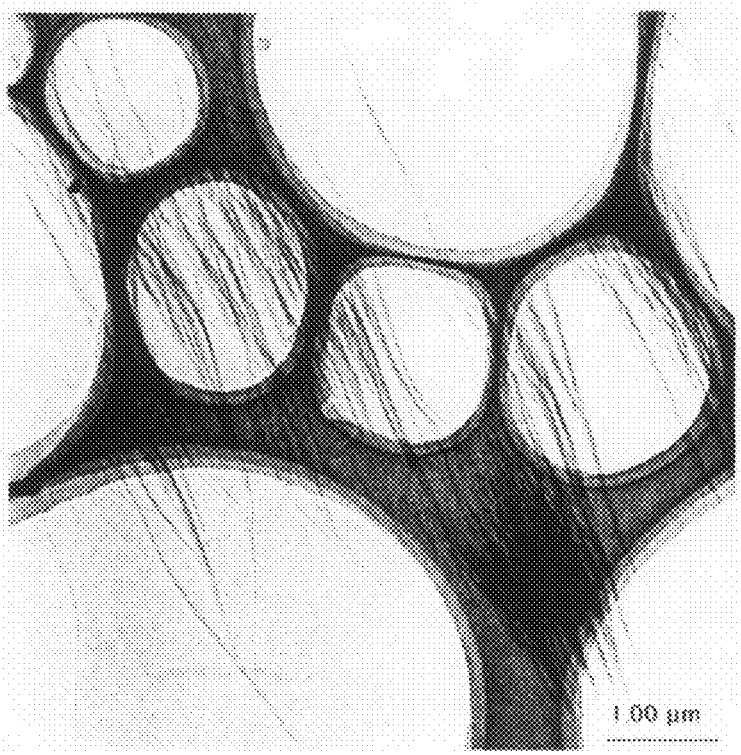
FIG. 56 is a TEM image of the carbon nanotubes manufactured in Example 1.
Figure 57:
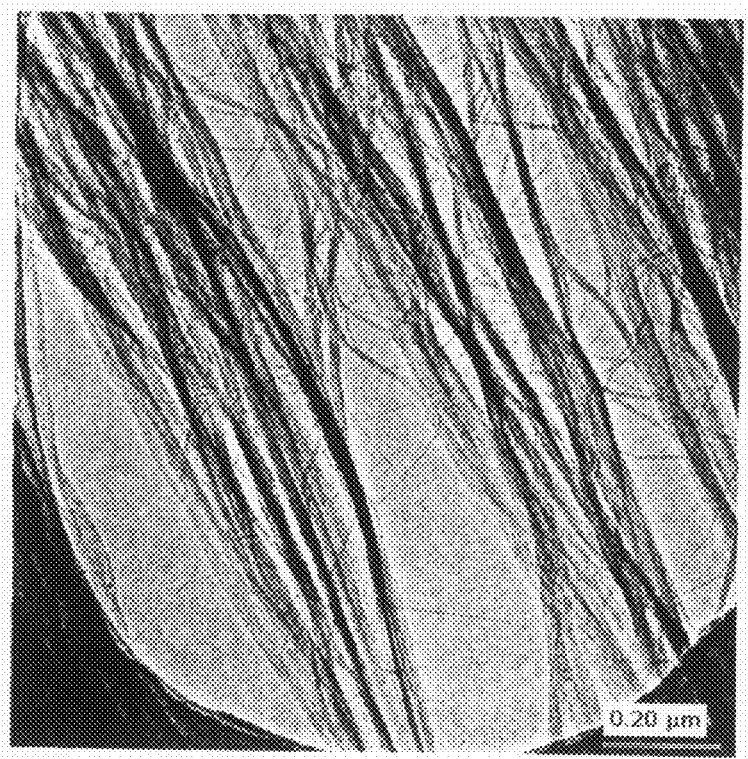
FIG. 57 is a TEM image of the carbon nanotubes manufactured in Example 1.
Figure 58:
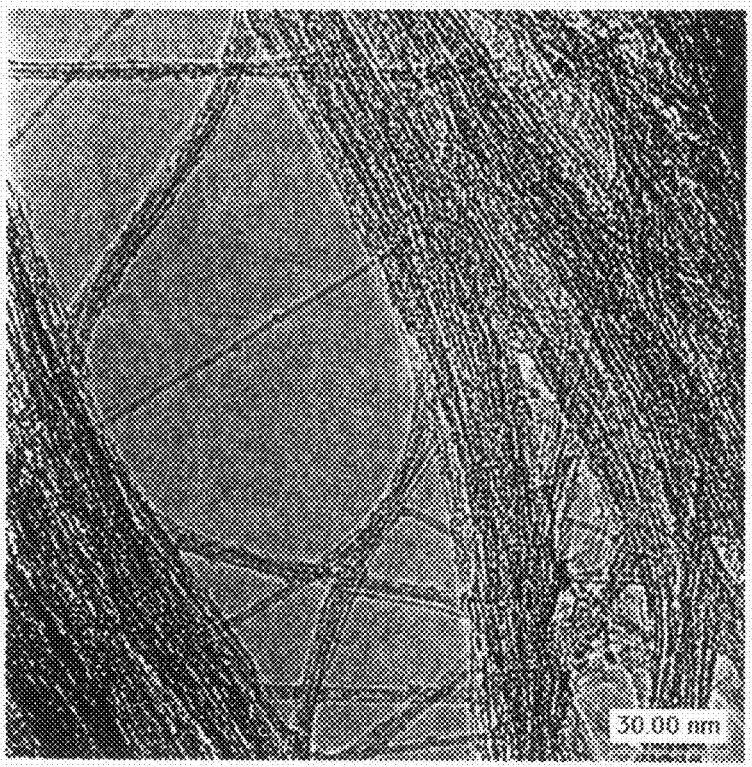
FIG. 58 is a TEM image of the carbon nanotubes manufactured in Example 1.
Figure 59:
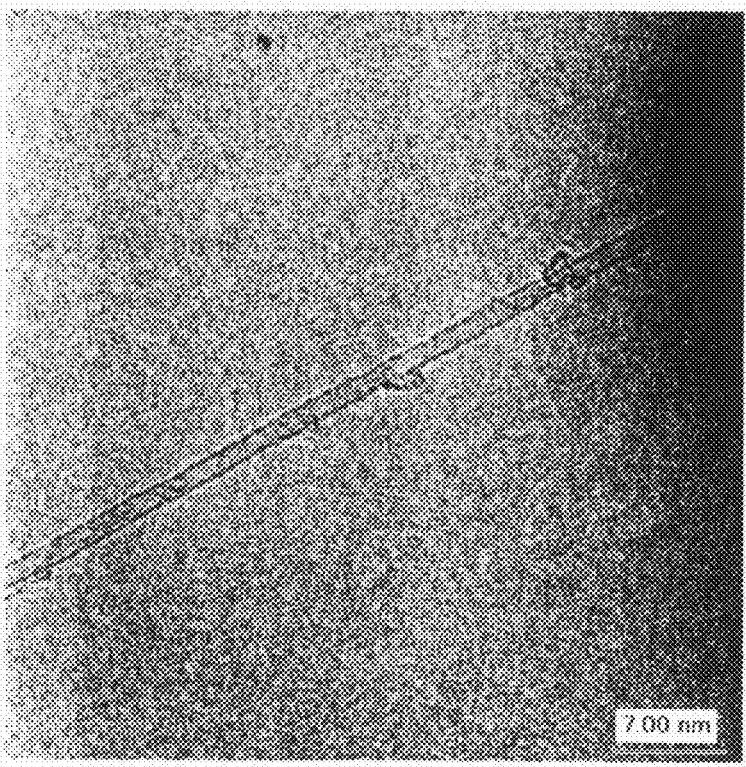
FIG. 59 is a TEM image of the carbon nanotubes manufactured in Example 1.
Figure 60:
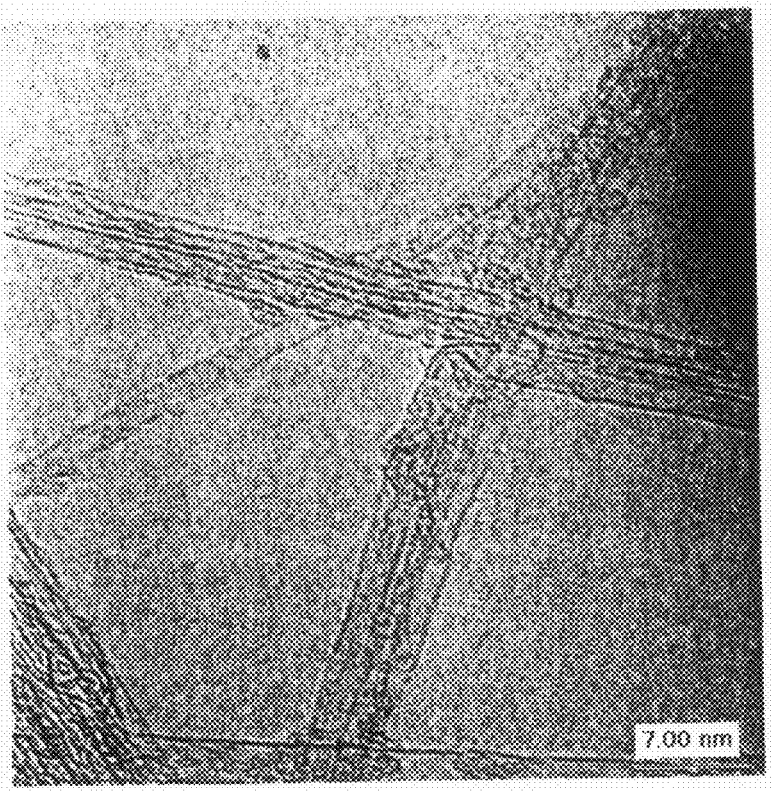
FIG. 60 is a TEM image of the carbon nanotubes manufactured in Example 1.
Figure 61:
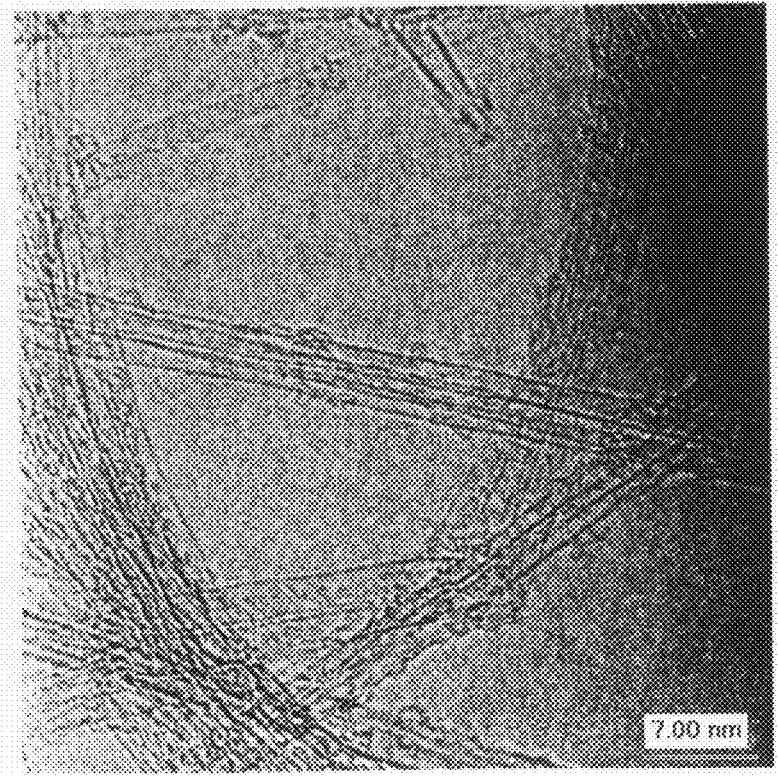
FIG. 61 is a TEM image of the carbon nanotubes manufactured in Example 1.

Moreover, another part on the copper mesh was observed. FIG. 56 shows a low magnified TEM image which illustrates fibrous materials. It is shown from FIG. 57 corresponding to the enlarged FIG. 56 that the fibrous materials are twisted to one another like vine. It is shown from FIG. 58 corresponding to the enlarged FIG. 57 that many carbon nanotubes form bundles with one another, but some portions are isolated therefrom. It is recognized from FIGS. 59, 60, and 61 corresponding to the further enlarged FIG. 58 that all the carbon nanotubes are signal-walled carbon nanotubes formed of only one graphene sheet layer.

Figure 17:
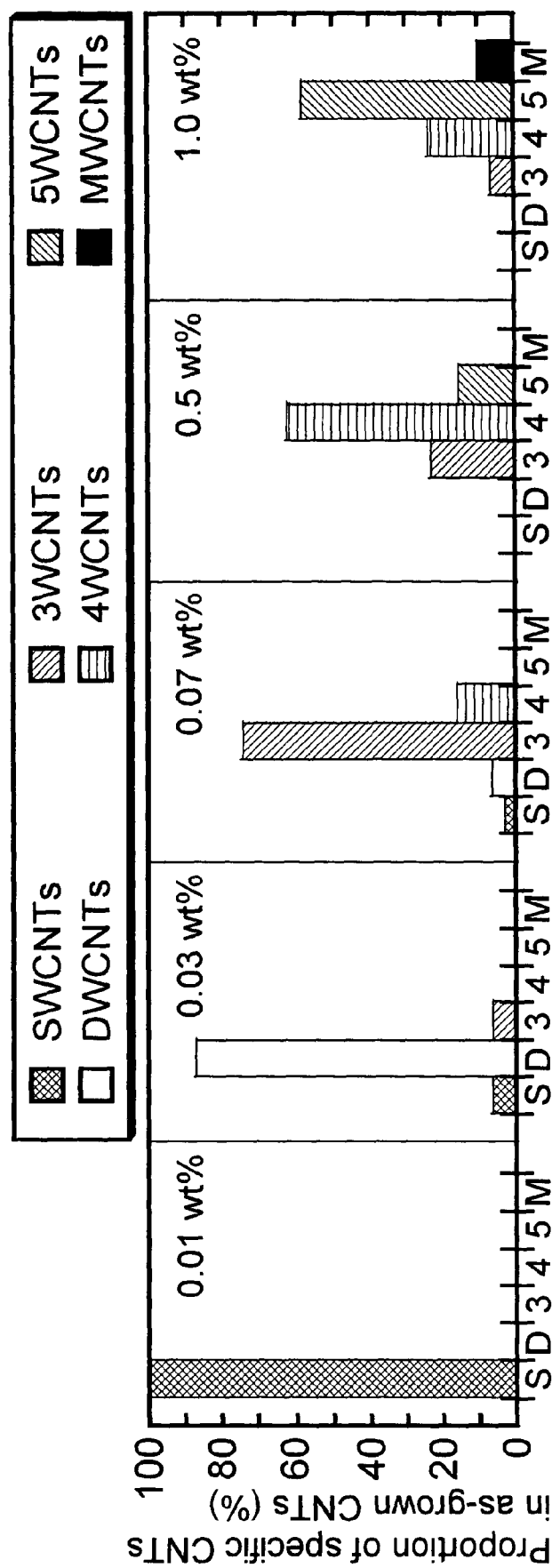
FIG. 17 is a graph showing estimated results of the number of graphene sheet layers of carbon nanotubes manufactured in Examples 1, 3, 7, 9 and 10.
Figure 18:
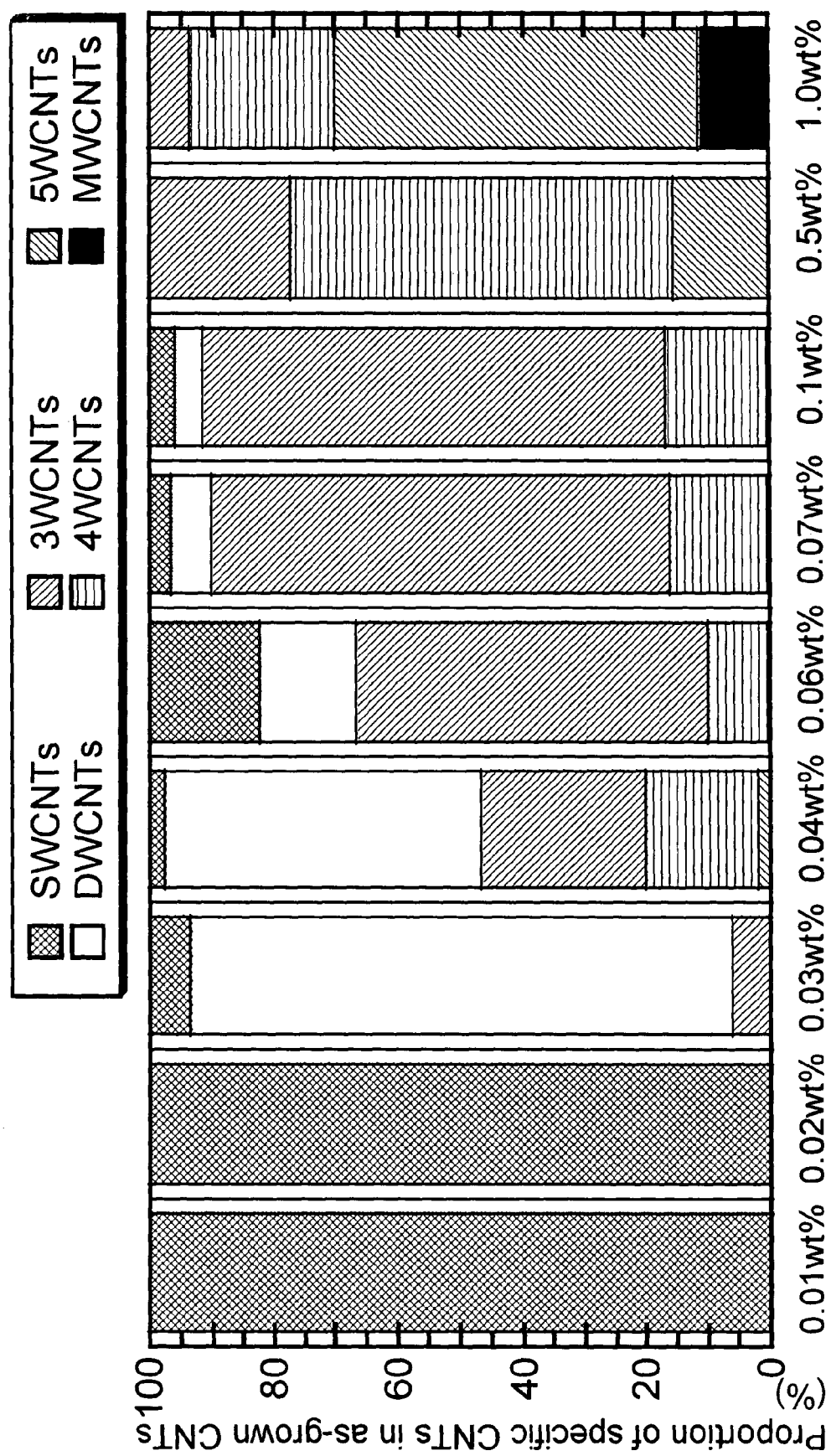
FIG. 18 is a graph showing estimated results of the number of graphene sheet layers of carbon nanotubes manufactured in Examples 1 to 3 and 5 to 10.
Figure 19:
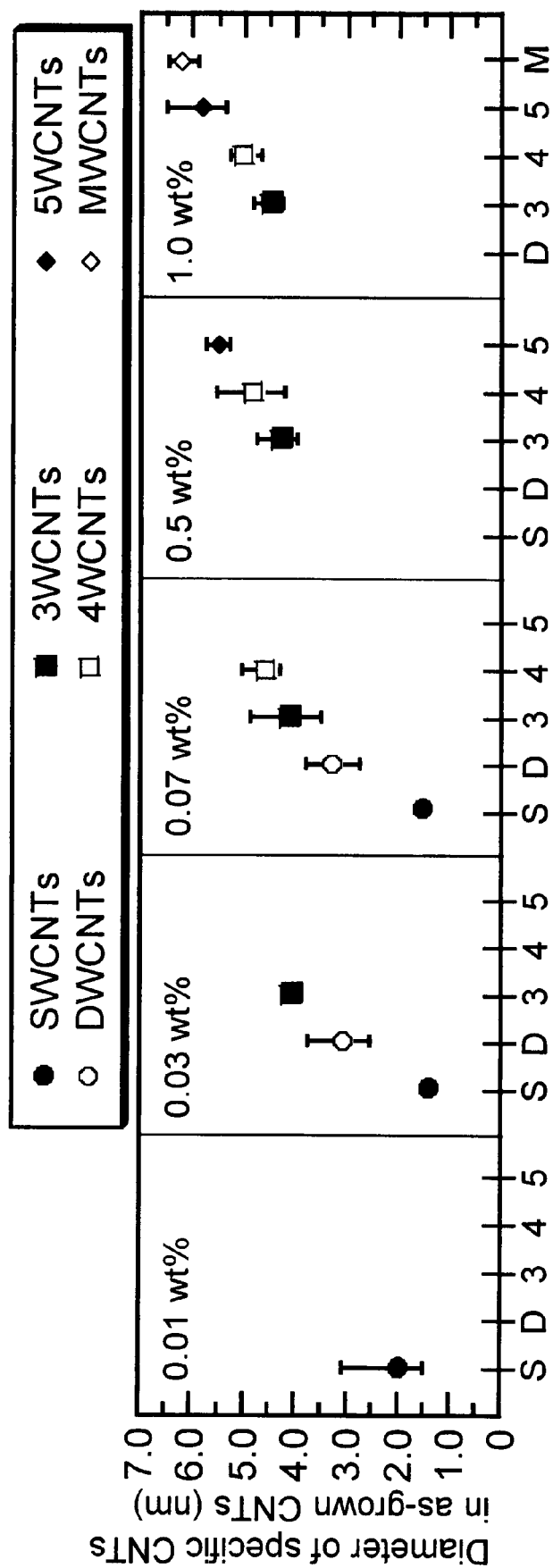
FIG. 19 is a graph showing diameter distributions of carbon nanotubes manufactured in Examples 1, 3, 7, 9 and 10.

As a result of evaluating the number of graphene sheet layers of the carbon nanotubes manufactured in this Example based on the aforementioned observation, all of 100 carbon nanotubes extracted at random in total were single-walled carbon nanotubes (SWCNTs: 100%) as illustrated in FIG. 17 and FIG. 18. Moreover, regarding the diameters of the carbon nanotubes manufactured in this Example, a diameter range of the SWCNTs was 1.5 to 3.1 nm, and a mean value was 2.0 nm as shown in FIG. 19.

Figure 20:
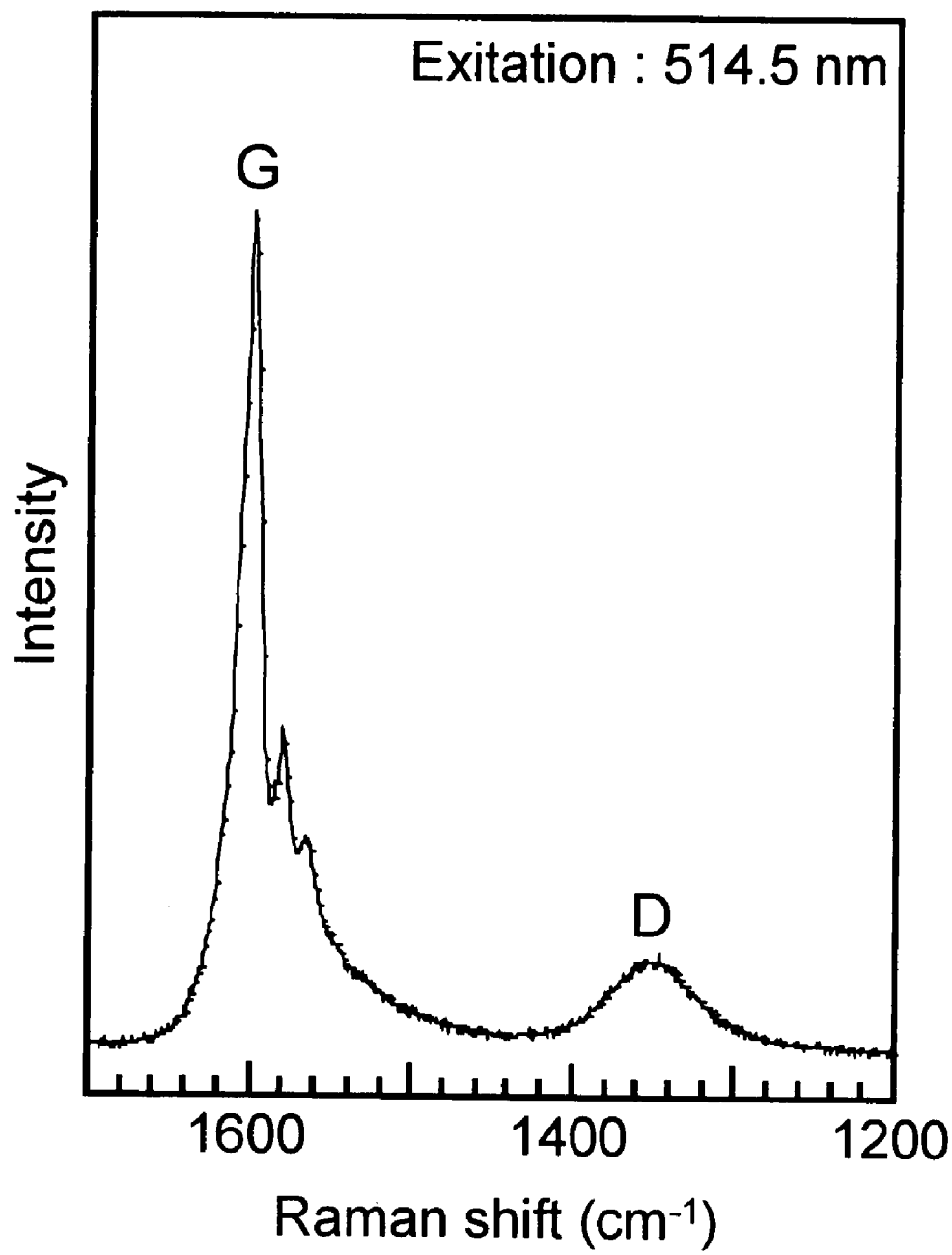
FIG. 20 is a graph showing a Raman spectrum of the carbon nanotubes manufactured in Example 1.
Figure 21:
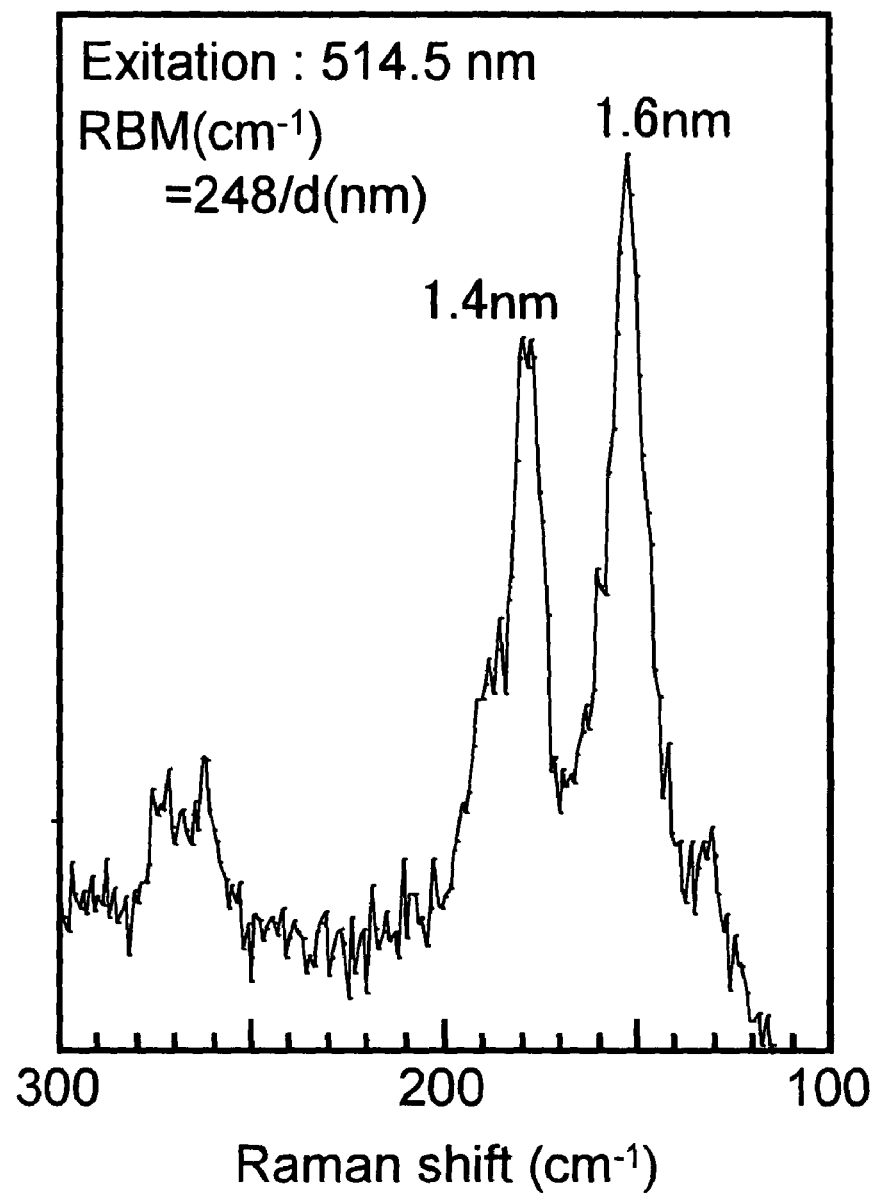
FIG. 21 is a graph showing a Raman spectrum of the carbon nanotubes manufactured in Example 1.

Furthermore, as a result of measuring Raman spectrum of the carbon nanotubes manufactured in this Example, an observed G band presented positions and shapes unique to SWCNTs as shown in FIG. 20 and FIG. 21. Moreover, since relative intensity of a D band caused by crystalline disorder was low, it was recognized that SWCNTs with a good quality were produced. In addition, since RBM (Radial Breathing Mode) caused by stretching-contracting vibration of SWCNTs cross sections was observed, it was recognized that SWCNTs were produced. Furthermore, as illustrated in FIG. 21, it was possible to estimate the diameter of the tube that resonated with an excitation wavelength using an approximate expression. Additionally, an $Ar^+$ ion laser (514.5 nm) was used as an excitation light source for Raman spectroscopy.

Furthermore, in this example, no difference in product property due to the substrate shape was recognized, and this was the same in the following Examples and Comparative Example.

Example 2

In Example 2, a carbon nanotube assembly was manufactured on a substrate of silica glass using cobalt-molybdenum fine particles as a catalyst in the same way as Example 1 except using a solution having cobalt of 0.02 mass % and molybdenum of 0.02 mass % for forming the cobalt-molybdenum fine particles.

As a result of evaluating the number of graphene sheet layers of the carbon nanotubes manufactured in this Example, all of 100 carbon nanotubes extracted at random in total were single-walled carbon nanotubes (SWCNTs: 100%) as illustrated in FIG. 18.

Example 3

In Example 3, a carbon nanotube assembly was manufactured on a substrate of silica glass using cobalt-molybdenum fine particles as a catalyst in the same way as Example 1 except using a solution having cobalt of 0.03 mass % and molybdenum of 0.03 mass % for forming the cobalt-molybdenum fine particles.

Moreover, by a high resolution SEM, observation was made of the metallic fine particles just before the growth of carbon nanotubes started in this Example, similar to Example 1. FIG. 3 shows an SEM image of the metallic fine particles on the substrate obtained in Example 3. In connection with each of the reduced metallic fine particles seen in white color in SEM images shown in FIG. 3, the particle diameter was measured using a ruler. As a result, it was recognized that a particle diameter distribution (range of catalyst diameter: 6.1 to 12.0 nm, mean value: 9.4 nm, and standard deviation: 1.32) shown in FIG. 4 was given.

Figure 22:
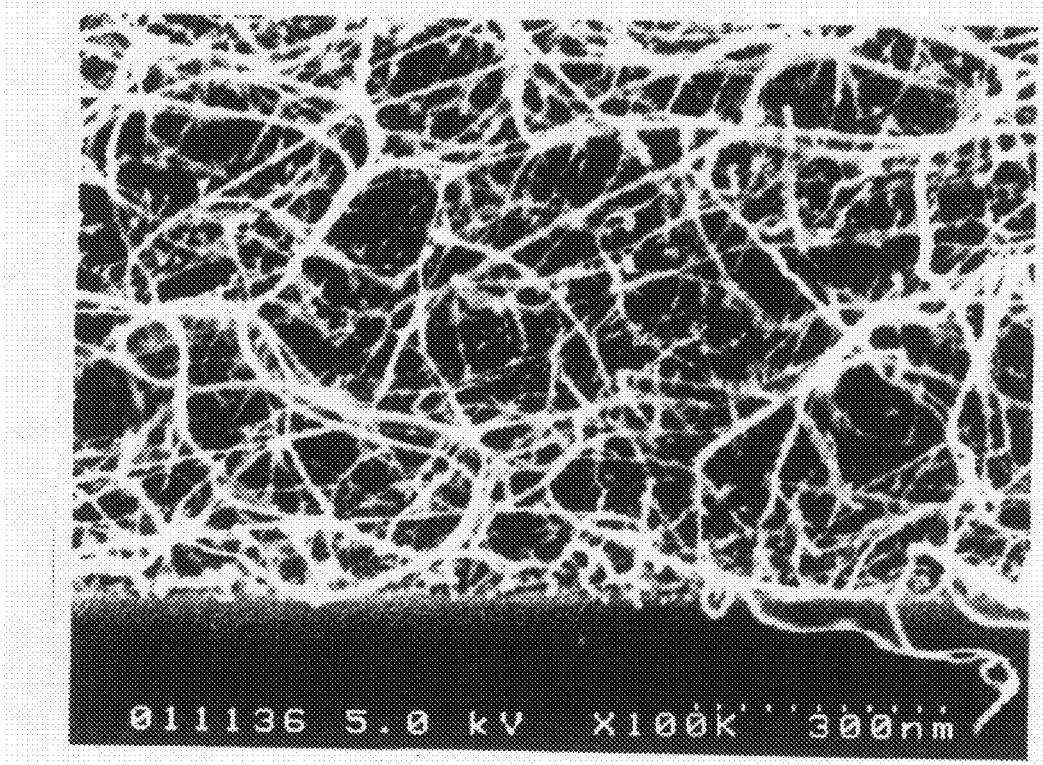
FIG. 22 is an SEM image of a carbon nanotube assembly manufactured in Example 3.

FIG. 22 is a Scanning Electron Microscope (hereinafter referred to as SEM) image taken in the vicinity of the substrate surface of the carbon nanotube assembly manufactured in this Example. The SEM used in observation was S-5000H made by Hitachi Ltd., and acceleration voltage was 5 kV. It was recognized from FIG. 22 that the carbon nanotubes were uniformly grown on the substrate surface with high density.

Next, TEM observation was conducted in the same way as Example 1 in order to check the number of graphene sheet layers of each of the carbon nanotubes that form the carbon nanotube assembly. FIGS. 23 to 38 are TEM images of the carbon nanotubes manufactured in this Example.

Figure 23:
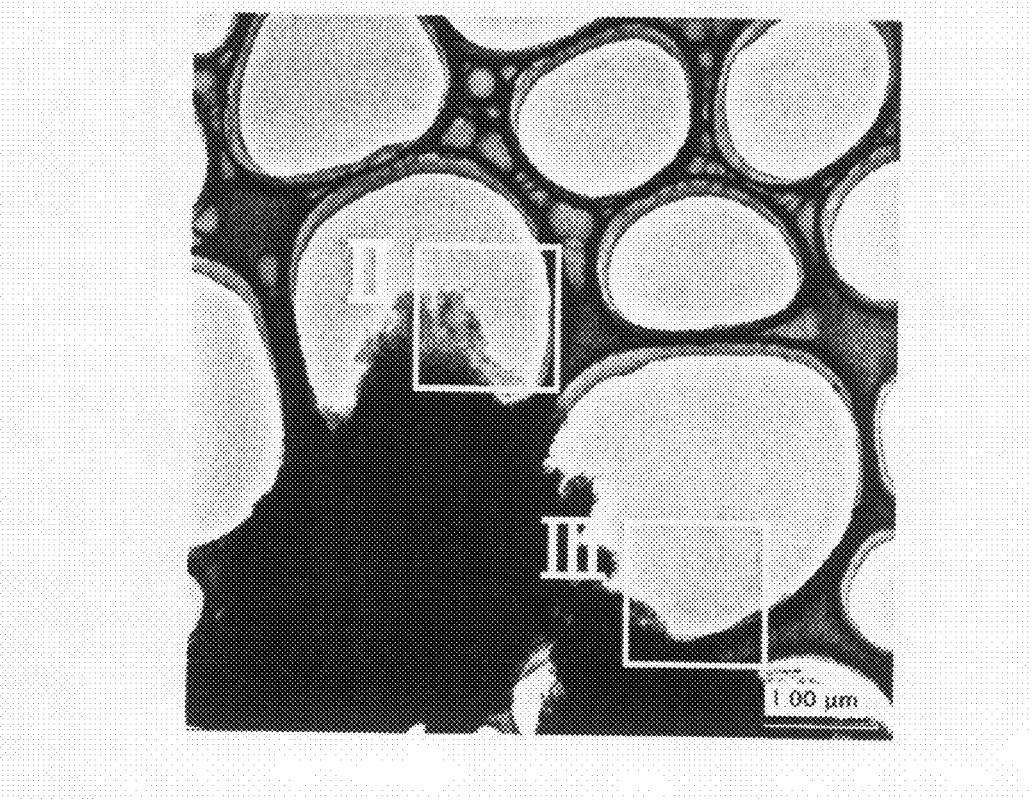
FIG. 23 is a TEM image of the carbon nanotubes manufactured in Example 3.
Figure 24:
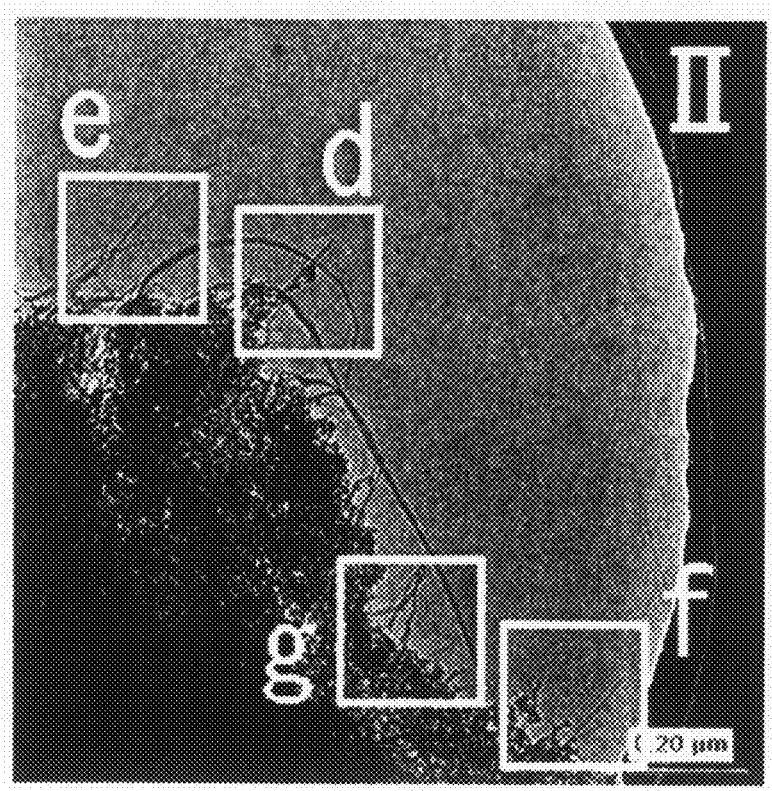
FIG. 24 is a TEM image of the carbon nanotubes manufactured in Example 3.
Figure 36:
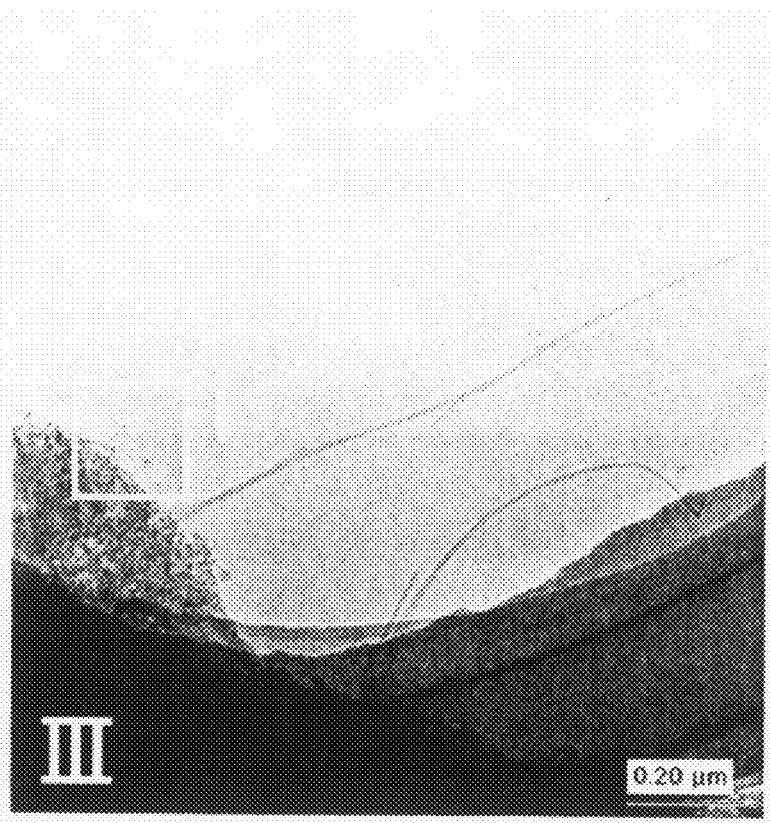
FIG. 36 is a TEM image of the carbon nanotubes manufactured in Example 3.
Figure 37:
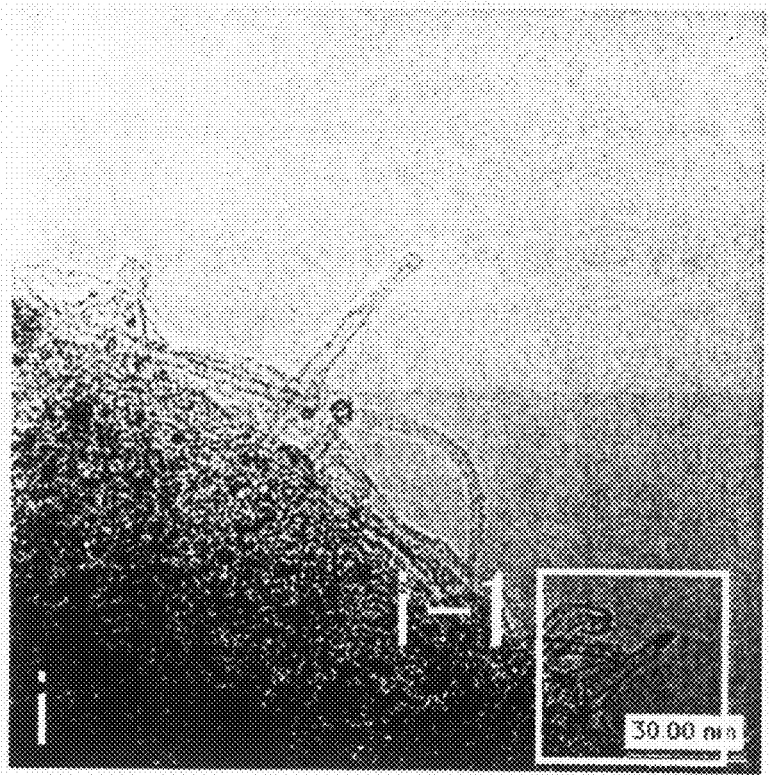
FIG. 37 is a TEM image of the carbon nanotubes manufactured in Example 3.
Figure 38:
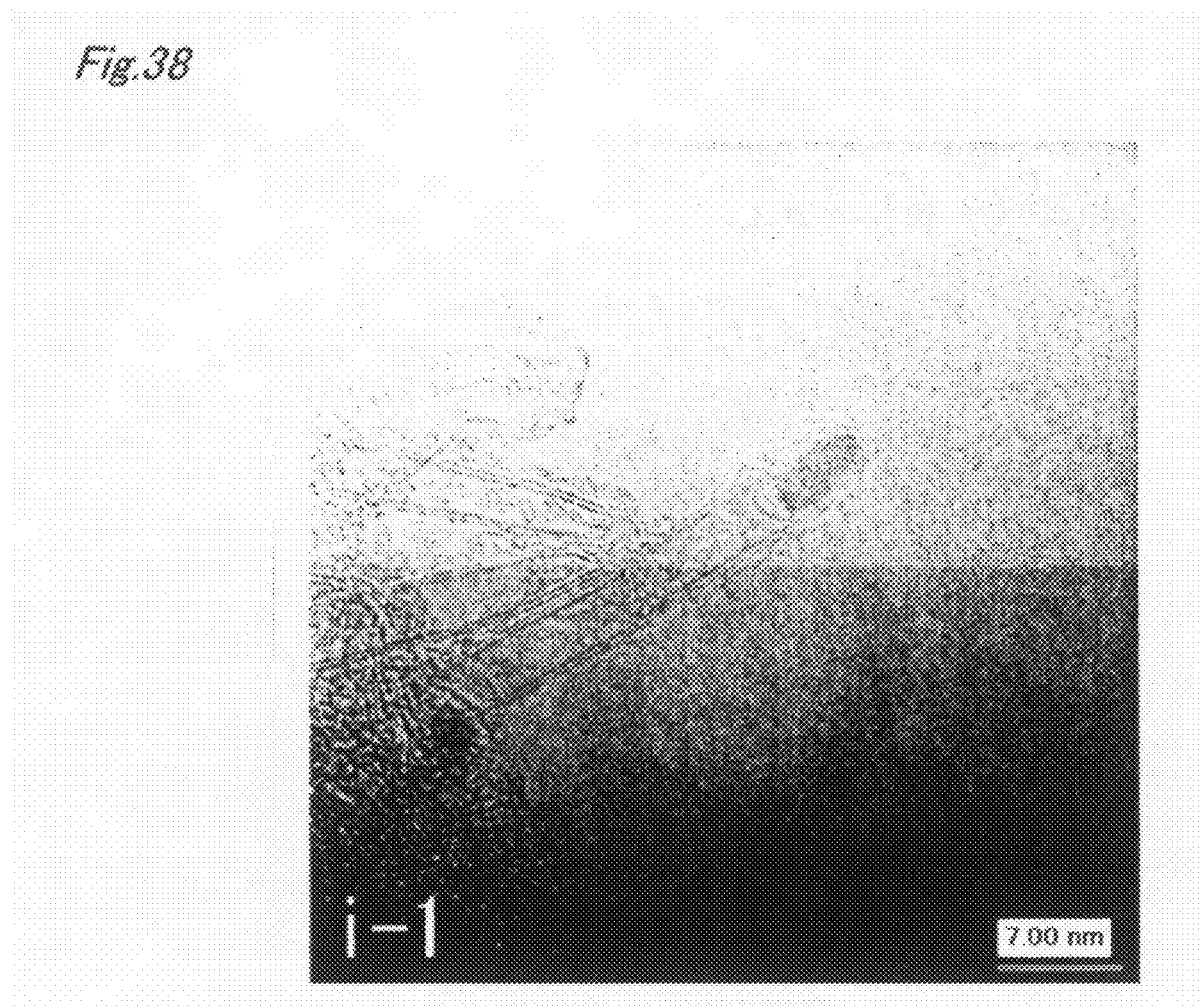
FIG. 38 is a TEM image of the carbon nanotubes manufactured in Example 3.

FIG. 23 shows a case where the observation was performed at the lowest magnification, and FIG. 24 shows an observed enlarged area II. Moreover, FIG. 36 shows an observed enlarged area III. Furthermore, FIGS. 25, 30, 32, and 34 show enlarged areas d, e, f, and g observed from the area II, respectively. FIG. 37 shows an enlarged area i observed from the area III.

Figure 25:
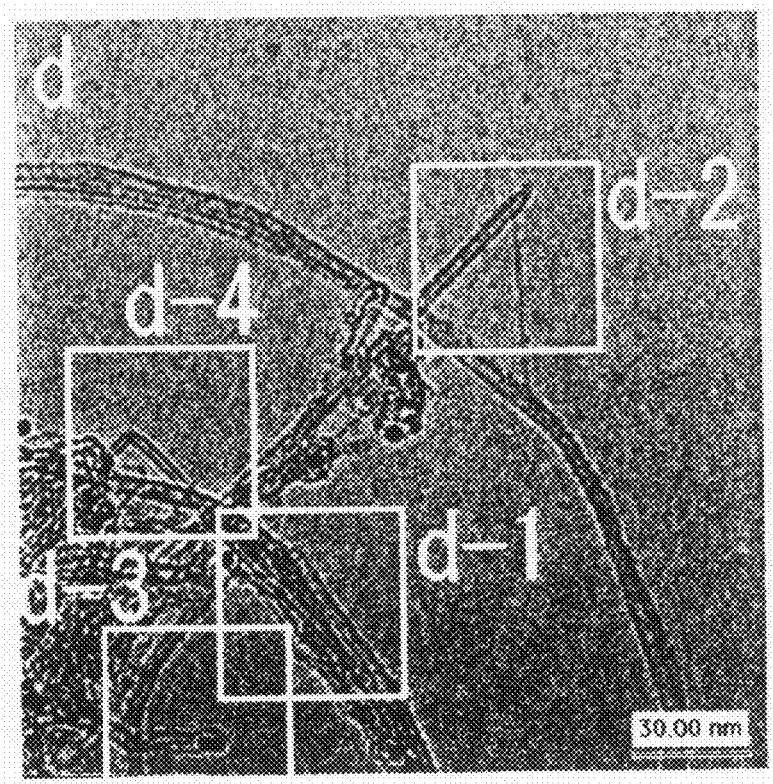
FIG. 25 is a TEM image of the carbon nanotubes manufactured in Example 3.
Figure 26:
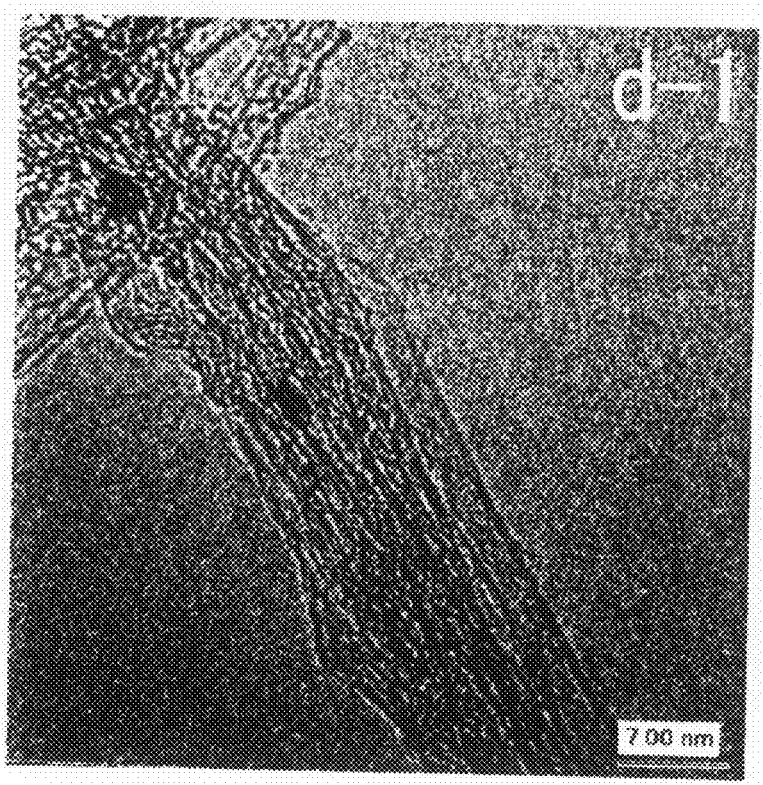
FIG. 26 is a TEM image of the carbon nanotubes manufactured in Example 3.
Figure 27:
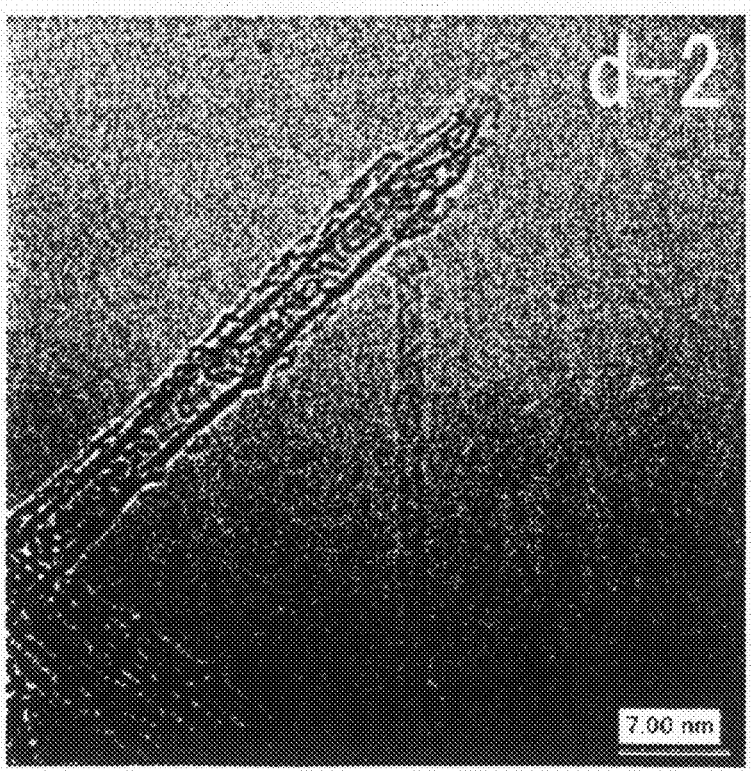
FIG. 27 is a TEM image of the carbon nanotubes manufactured in Example 3.
Figure 28:
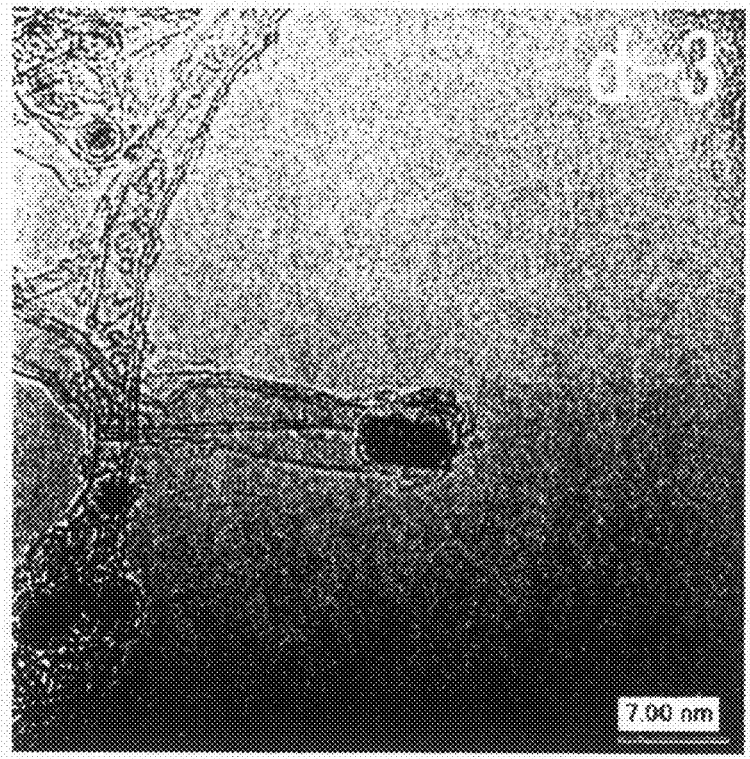
FIG. 28 is a TEM image of the carbon nanotubes manufactured in Example 3.
Figure 29:
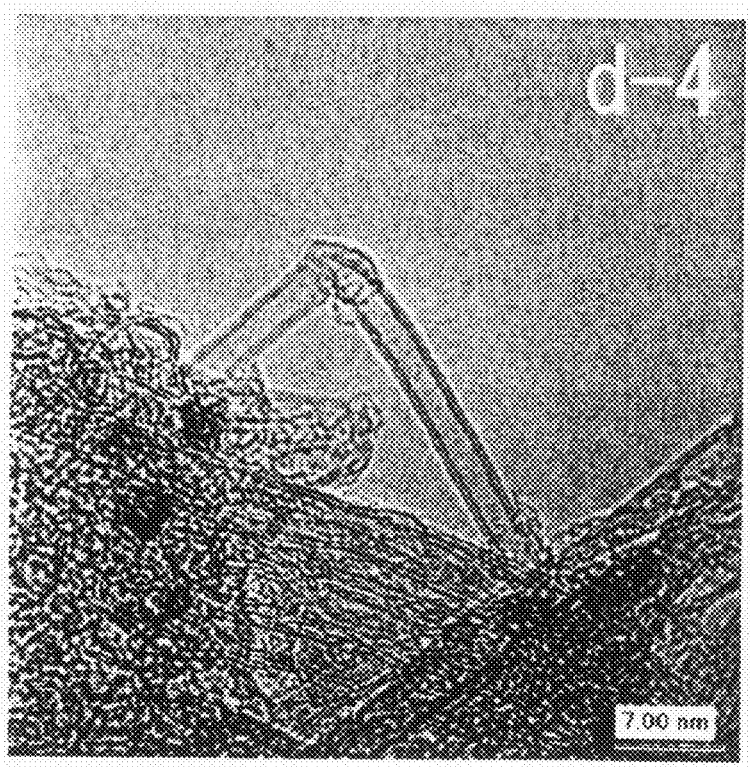
FIG. 29 is a TEM image of the carbon nanotubes manufactured in Example 3.
Figure 30:
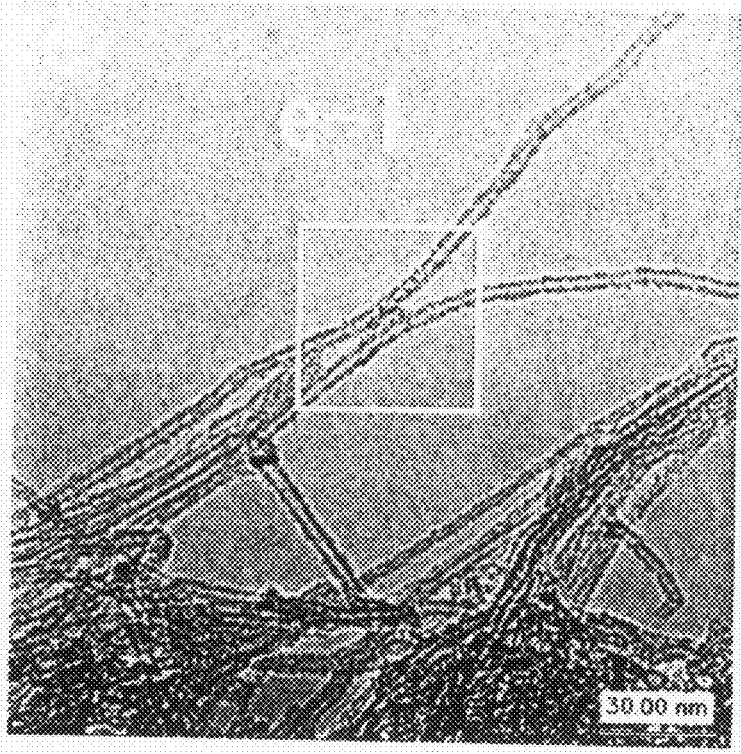
FIG. 30 is a TEM image of the carbon nanotubes manufactured in Example 3.
Figure 31:
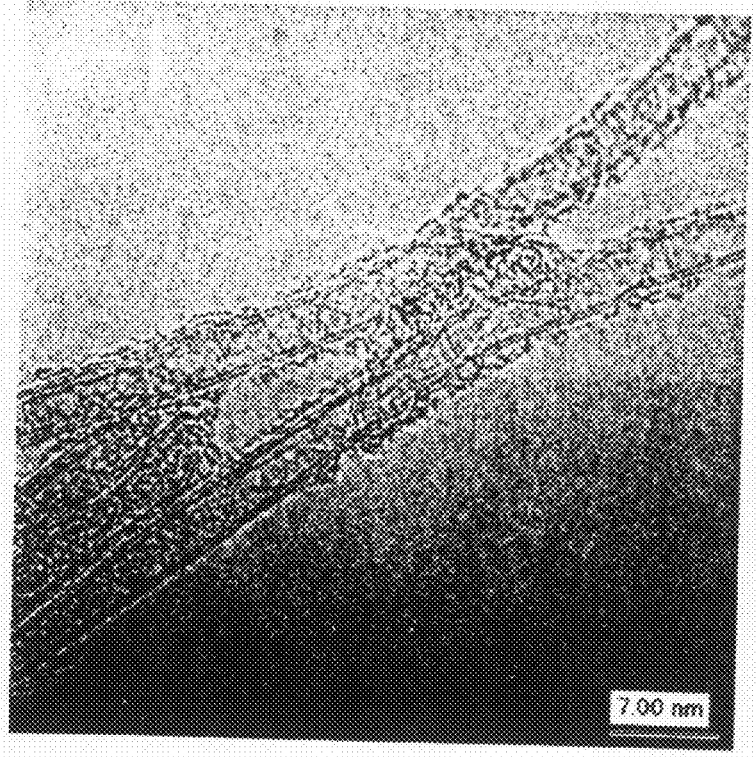
FIG. 31 is a TEM image of the carbon nanotubes manufactured in Example 3.
Figure 32:
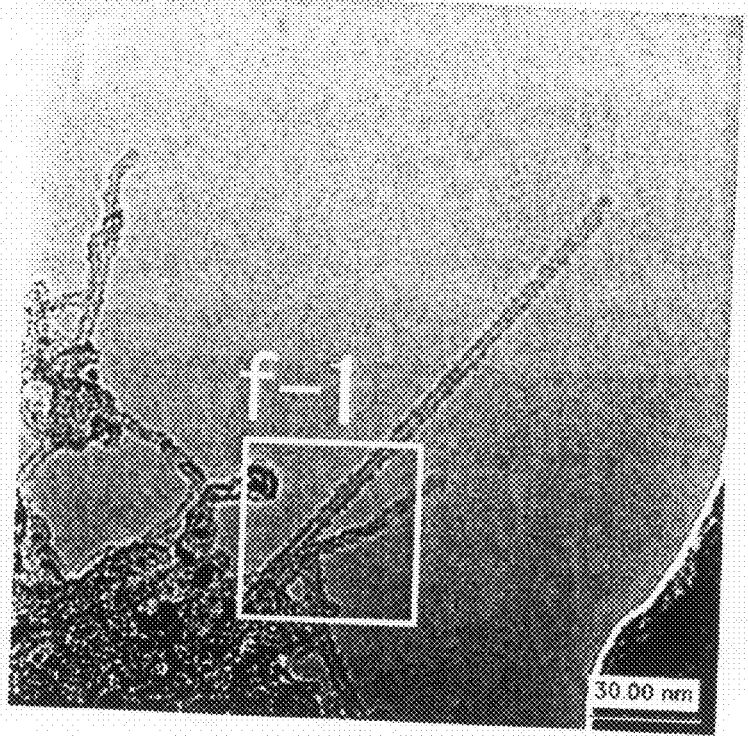
FIG. 32 is a TEM image of the carbon nanotubes manufactured in Example 3.
Figure 33:
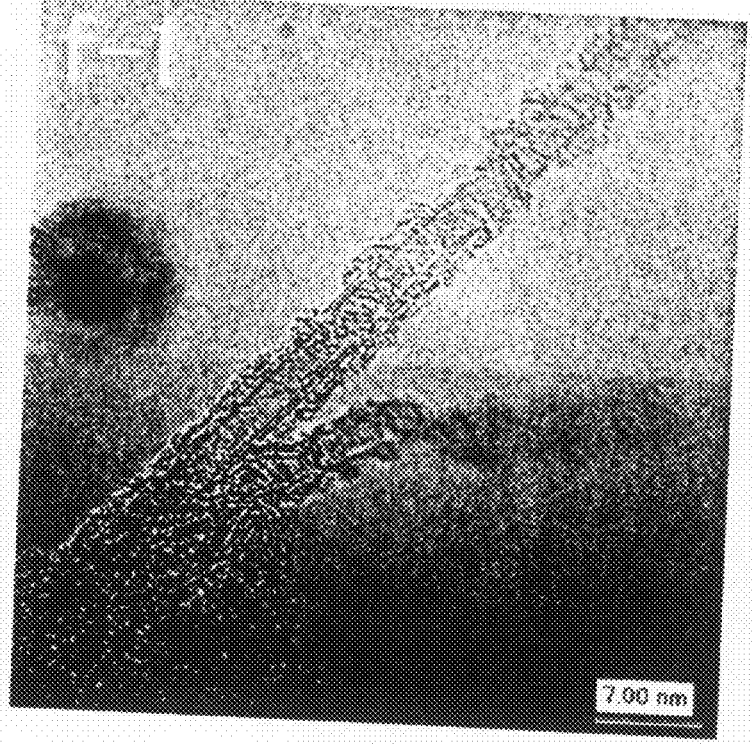
FIG. 33 is a TEM image of the carbon nanotubes manufactured in Example 3.
Figure 34:
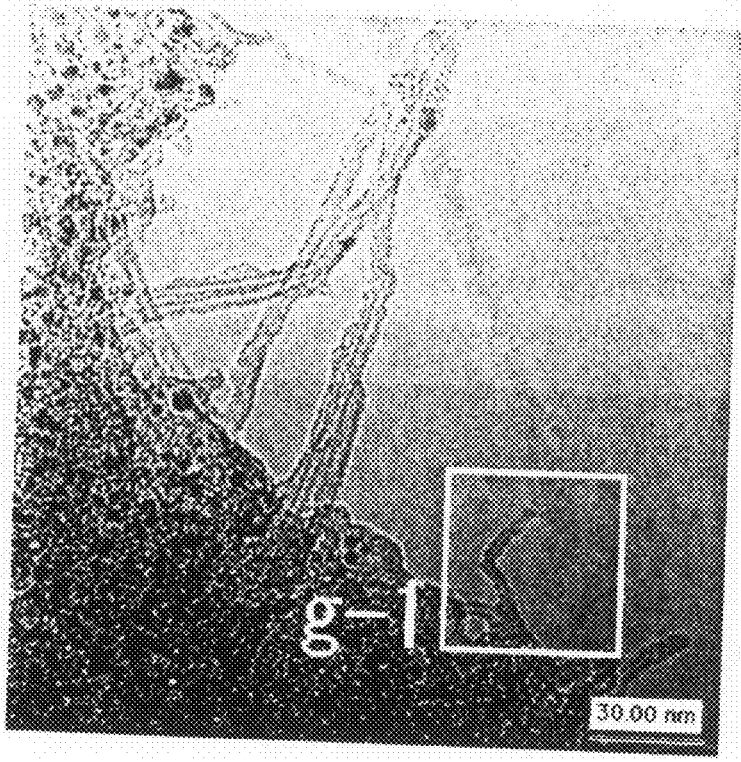
FIG. 34 is a TEM image of the carbon nanotubes manufactured in Example 3.
Figure 35:
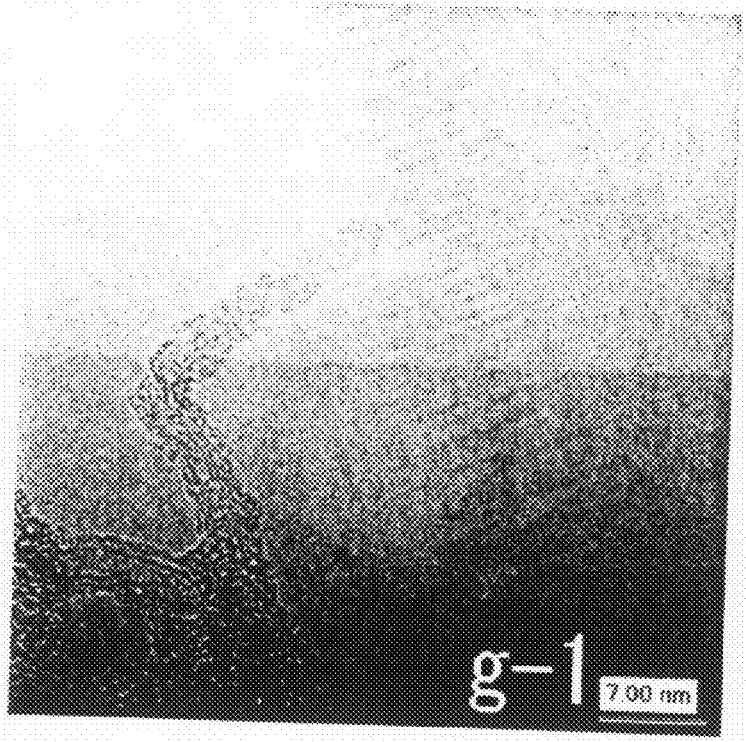
FIG. 35 is a TEM image of the carbon nanotubes manufactured in Example 3.

FIG. 26 shows an enlarged image of d-1 in FIG. 25. Two graphene sheet layers are recognized on a wall surface in the image of the carbon nanotube observed in FIG. 26. Thus, this can be judged as a double-walled carbon nanotube. Similarly, carbon nanotubes observed in FIGS. 27 to 29, which show enlarged images of d-2 to d-4, respectively, are also double-walled carbon nanotubes. Likewise, it is recognized that carbon nanotubes observed in an area e-1 in FIG. 30 (FIG. 31), an area f-1 in FIG. 32 (FIG. 33), an area g-1 in FIG. 34 (FIG. 35) and an area i-1 in FIG. 37 (FIG. 38) are mainly double-walled carbon nanotubes.

Figure 62:
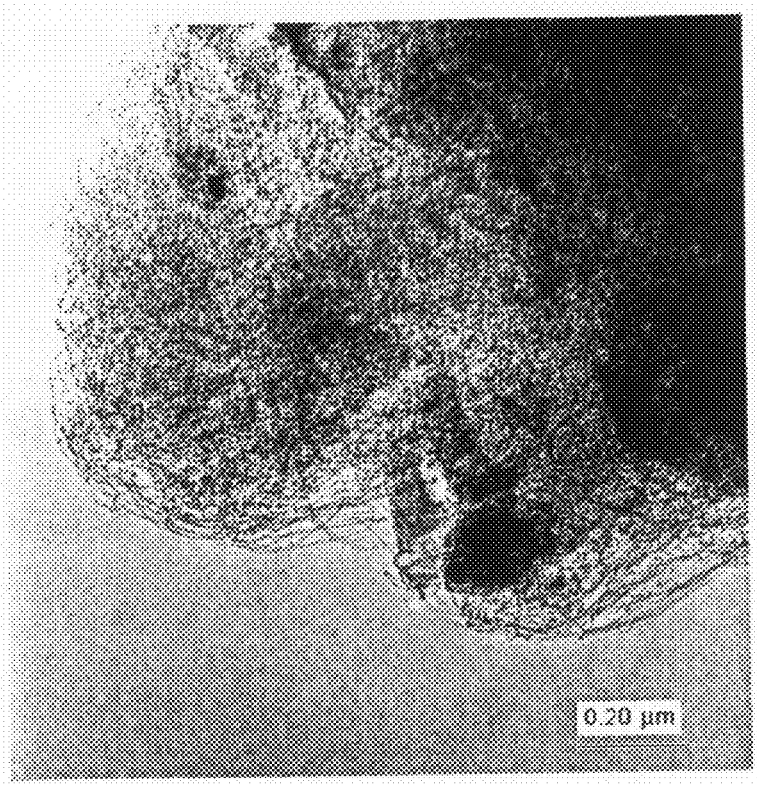
FIG. 62 is a TEM image of the carbon nanotubes manufactured in Example 3.
Figure 63:
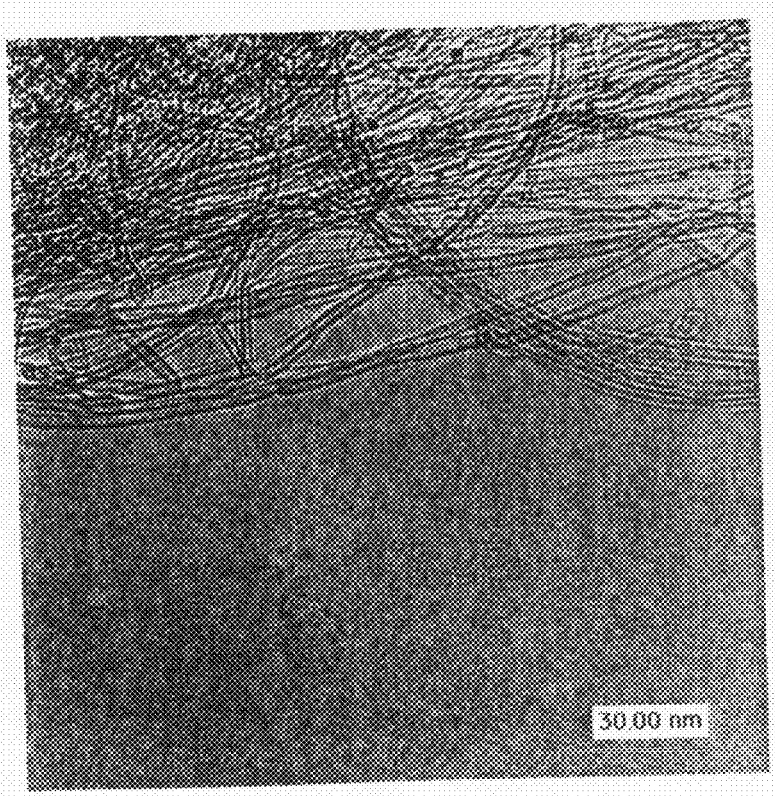
FIG. 63 is a TEM image of the carbon nanotubes manufactured in Example 3.
Figure 64:
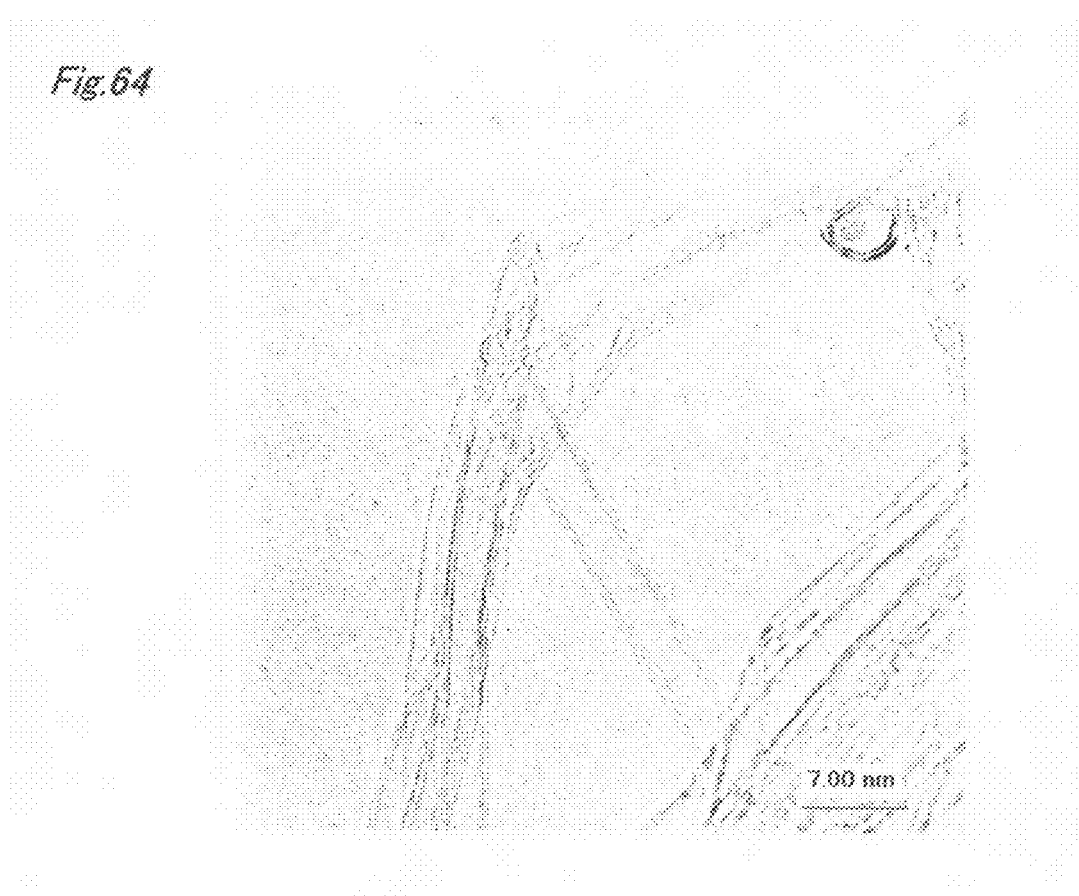
FIG. 64 is a TEM image of the carbon nanotubes manufactured in Example 3.
Figure 65:
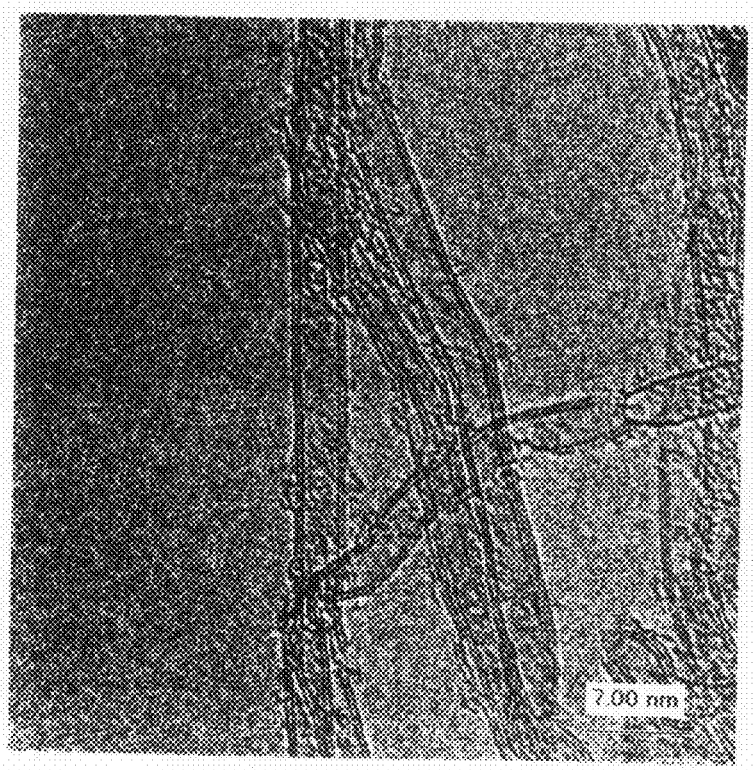
FIG. 65 is a TEM image of the carbon nanotubes manufactured in Example 3.

Moreover, another part on the copper mesh was observed. FIG. 62 shows a low magnified TEM image which illustrates that fibrous materials are curled up like a fluff ball. It is shown from FIG. 63 corresponding to the enlarged FIG. 62 that the fibrous materials are isolated from one another and that no bundle is formed unlike the single-walled carbon nanotubes in Example 1. It is recognized from FIGS. 64 and 65 each corresponding to the enlarged FIG. 63 that almost all the carbon nanotubes observed are double-walled carbon nanotubes each having two graphene sheet layers.

As a result of evaluating the number of graphene sheet layers of the carbon nanotubes manufactured in this Example based on the aforementioned observation, SWCNTs was 6.3%, DWCNTs was 87.5% and 3WCNTs was 6.2% among 100 carbon nanotubes extracted at random in total as illustrated in FIG. 17 and FIG. 18. Furthermore, as shown in FIG. 19, the diameters of carbon nanotubes manufactured in this Example were as follows.

Diameter range of SWCNTs: 1.4 nm
Mean value of diameter of SWCNTs: 1.4 nm
Diameter range of DWCNTs: 2.5 to 3.7 nm
Mean value of diameter of DWCNTs: 3.1 nm
Diameter range of 3WCNTs: 3.9 to 4.2 nm
Mean value of diameter of 3WCNTs: 4.1 nm.

Figure 39:
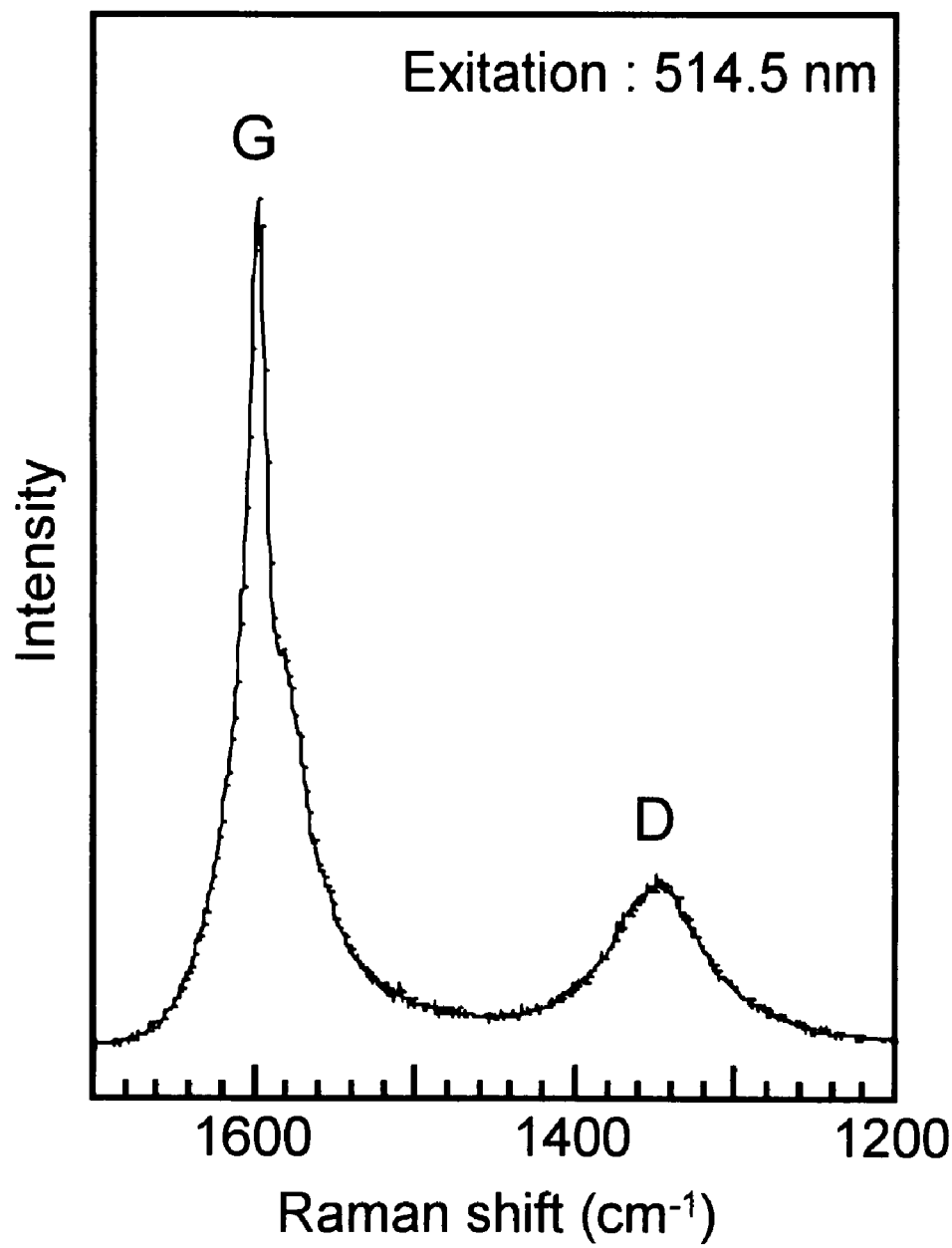
FIG. 39 is a graph showing a Raman spectrum of the carbon nanotubes manufactured in Example 3.

Furthermore, as a result of measuring Raman spectrum of the carbon nanotubes manufactured in this Example, an observed G band presented positions and shapes unique to DWCNTs as shown in FIG. 39. Moreover, since relative intensity of a D band caused by crystalline disorder was low, it was recognized that DWCNTs with a good quality were produced. Additionally, an $Ar^+$ ion laser (514.5 nm) was used as an excitation light source for Raman spectroscopy.

Example 4

In Example 4, a carbon nanotube assembly was manufactured on a substrate of silica glass using cobalt-molybdenum fine particles as a catalyst in the same way as Example 3 except that holding time was set to 600 seconds (10 minutes) at 400° C. in a reducing atmosphere.

Figure 40:
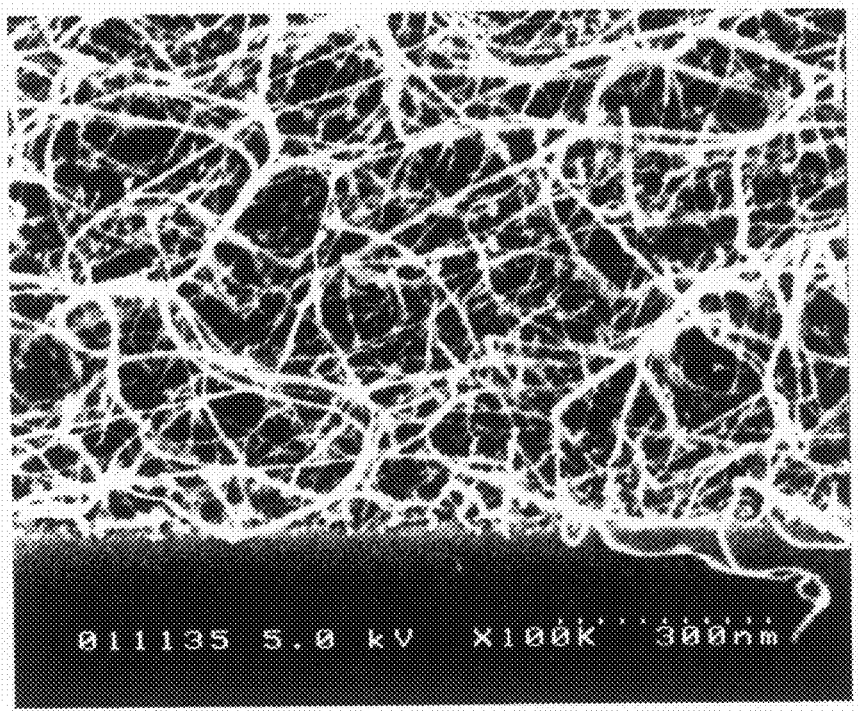
FIG. 40 is an SEM image of a carbon nanotube assembly manufactured in Example 4.

FIG. 40 is an SEM image taken in the vicinity of the substrate surface of the carbon nanotube assembly manufactured in this Example. It was recognized from FIG. 40 that the carbon nanotubes were uniformly grown on the substrate surface with high density.

Reference Example 1

In Reference Example 1, a carbon nanotube assembly was manufactured on a substrate of silica glass using cobalt-molybdenum fine particles as a catalyst in the same way as Example 3 except that holding time was set to 300 seconds (five minutes) at 400° C. in a reducing atmosphere.

Figure 41:
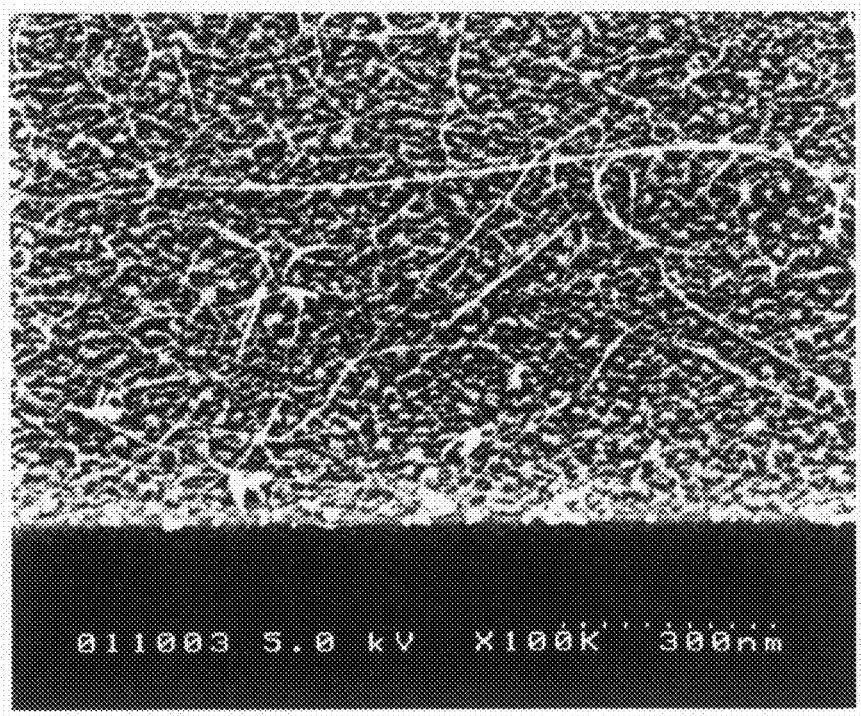
FIG. 41 is an SEM image of a carbon nanotube assembly manufactured in Reference Example 1.

FIG. 41 is an SEM image taken in the vicinity of the substrate surface of the carbon nanotube assembly manufactured in this Reference Example. It was recognized from FIG. 41 that reductive reaction of the metallic fine particles on the substrate was insufficient, that most of the particles were metal oxide particles and that the carbon nanotubes were not sufficiently grown.

Example 5

In Example 5, a carbon nanotube assembly was manufactured on a substrate of silica glass using cobalt-molybdenum fine particles as a catalyst in the same way as Example 1 except using a solution having cobalt of 0.04 mass % and molybdenum of 0.04 mass % for forming the cobalt-molybdenum fine particles.

Moreover, by a high resolution SEM, observation was made of the metallic fine particles just before the growth of carbon nanotubes started in this Example, similar to Example 1. FIG. 3 shows SEM images of the metallic fine particles on the substrate obtained in Example 5.

As a result of evaluating the number of graphene sheet layers of the carbon nanotubes manufactured in this Example, SWCNTs was 2.2%, DWCNTs was 51.1%, 3WCNTs was 26.7%, 4WCNTs was 17.8% and 5WCNTs was 2.2% among 100 carbon nanotubes extracted at random in total as illustrated in FIG. 18.

Example 6

In Example 6, a carbon nanotube assembly was manufactured on a substrate of silica glass using cobalt-molybdenum fine particles as a catalyst in the same way as Example 1 except using a solution having cobalt of 0.06 mass % and molybdenum of 0.06 mass % for forming the cobalt-molybdenum fine particles.

Figure 42:
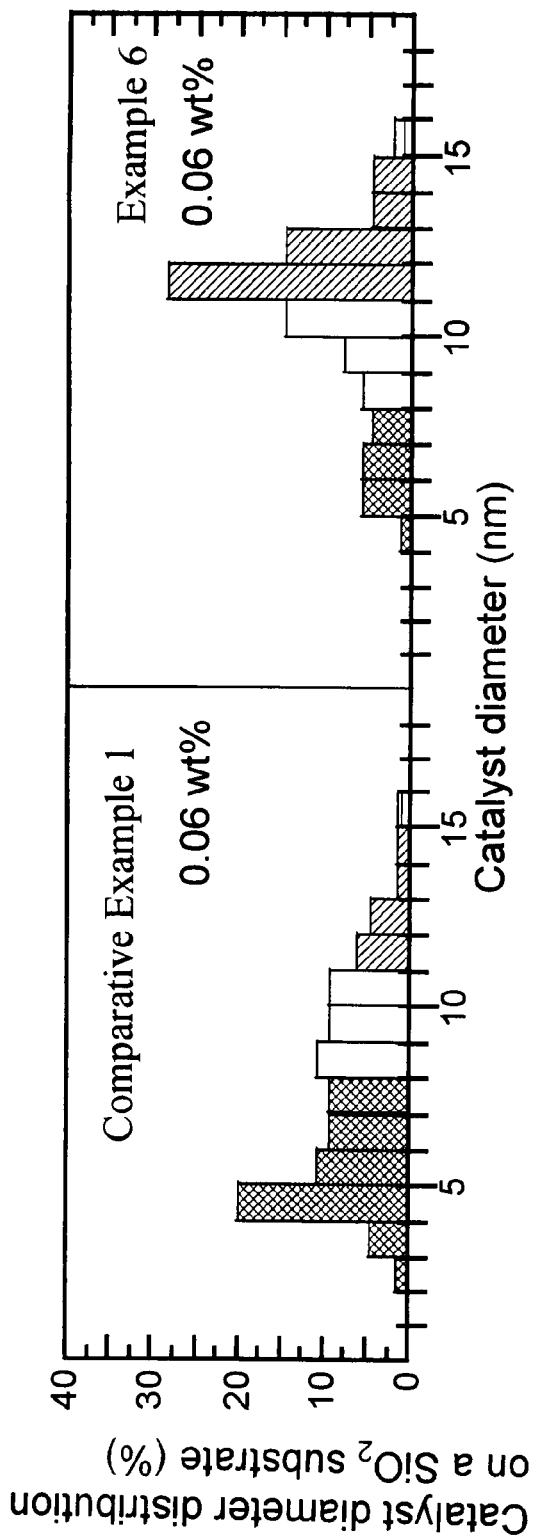
FIG. 42 is a graph showing particle diameter distributions of metallic fine particles on a substrate obtained in Example 6 and Comparative Example 1.

Moreover, by a high resolution SEM, observation was made of the metallic fine particles just before the growth of carbon nanotubes started in this Example, similar to Example 1. As a result, it was recognized that a particle diameter distribution (range of catalyst diameter: 4.0 to 16.0 nm, mean value: 10.8 nm, and standard deviation: 2.31) shown in FIG. 42 was given.

Figure 43:
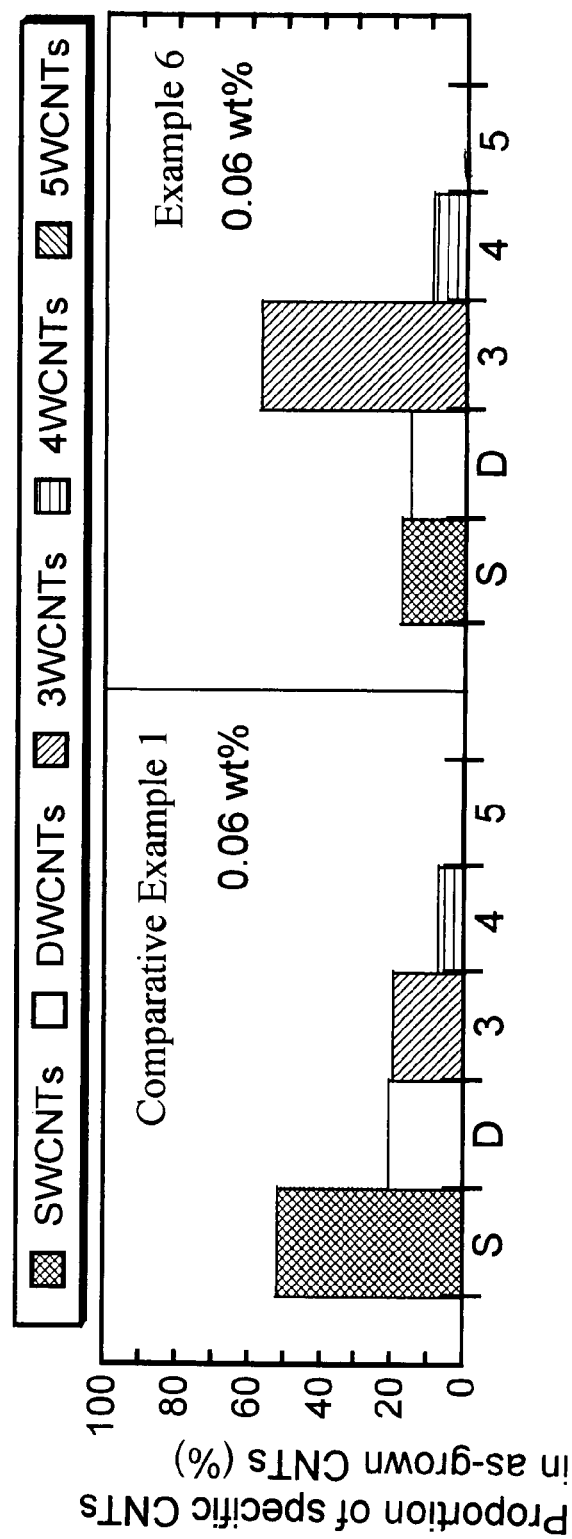
FIG. 43 is a graph showing estimated results of the number of graphene sheet layers of the carbon nanotubes manufactured in Example 6 and Comparative Example 1.

Furthermore, as a result of evaluating the number of graphene sheet layers of the carbon nanotubes manufactured in this Example, SWCNTs was 17.6%, DWCNTs was 15.7%, 3WCNTs was 56.9% and 4WCNTs was 9.8% among 100 carbon nanotubes extracted at random in total as illustrated in FIG. 43.

Figure 44:
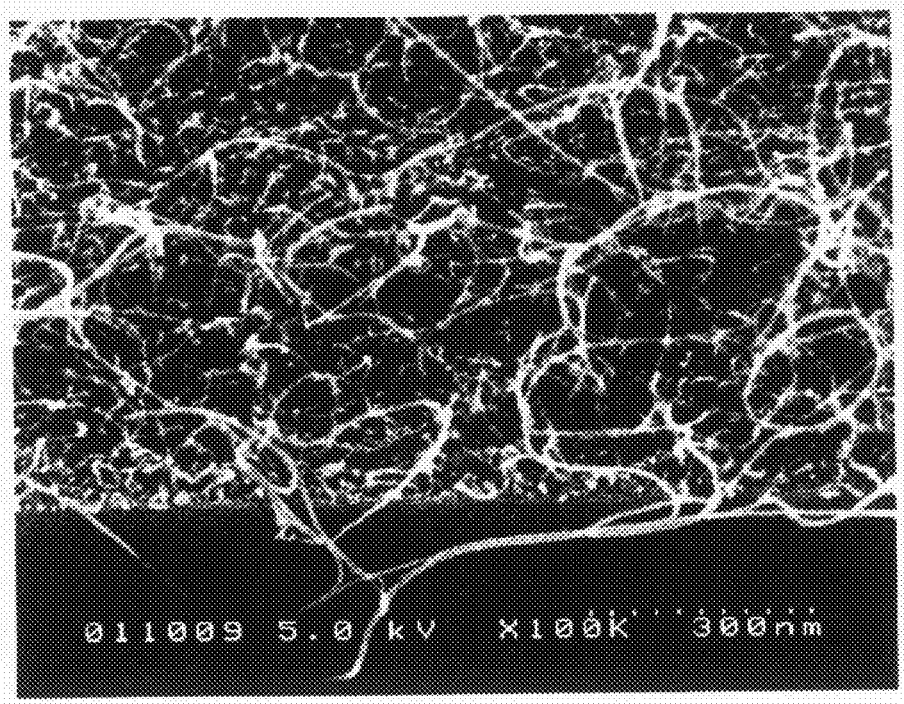
FIG. 44 is an SEM image of a carbon nanotube assembly manufactured in Example 6.

FIG. 44 is an SEM image taken in the vicinity of the substrate surface of the carbon nanotube assembly manufactured in this Example. It was recognized from FIG. 44 that the carbon nanotubes were uniformly grown on the substrate surface with high density.

Comparative Example 1

In Comparative Example 1, first, cobalt-molybdenum fine particles were formed on the substrate, similar to Example 6.

Next, this substrate was stored in the furnace tube 14 of the manufacturing apparatus having the structure shown in FIG. 1. Subsequently, the reactor was sealed, and the interior was evacuated up to 0.4 Pa. Thereafter the valve 3 and valve 6 were opened to supply a hydrogen gas, and an internal pressure of the furnace tube 14 was set to 70 kPa. An electric conduction to the heater 12 was started while the internal pressure of the furnace tube 14 was maintained. Power supply to the heater was controlled by the control device 17 in such a way that the substrate temperature was increased at 0.5° C./sec. In Comparative Example 1, reductive reaction was conducted at the same time as the temperature was being continuously increased up to 800° C. that was set as the reaction temperature without holding the temperature at midpoint. When the substrate temperature reached 800° C., the valve 5 and valve 7 were opened immediately to introduce ethanol vapor into the furnace tube 14 in addition to a hydrogen gas, and then the growth of carbon nanotubes started. At this time, time Δt passed before the growth of the carbon nanotubes started after the substrate temperature exceeded 450° C. was about 700 seconds.

Figure 45:
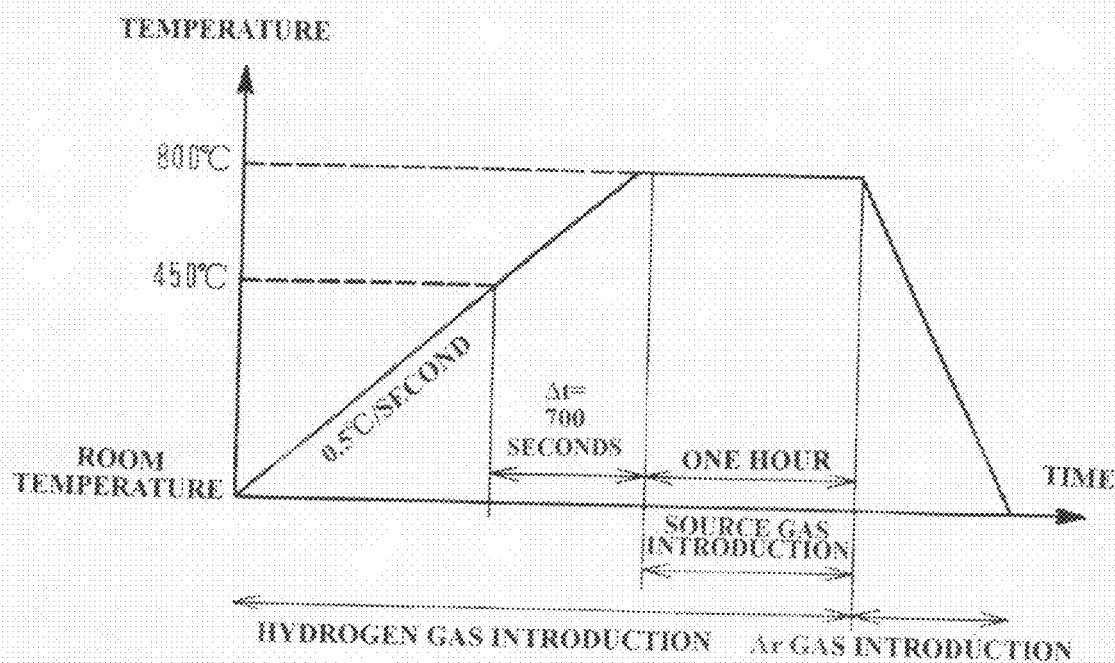
FIG. 45 is a temperature profile showing a manufacturing condition in Comparative Example 1.
Figure 46:
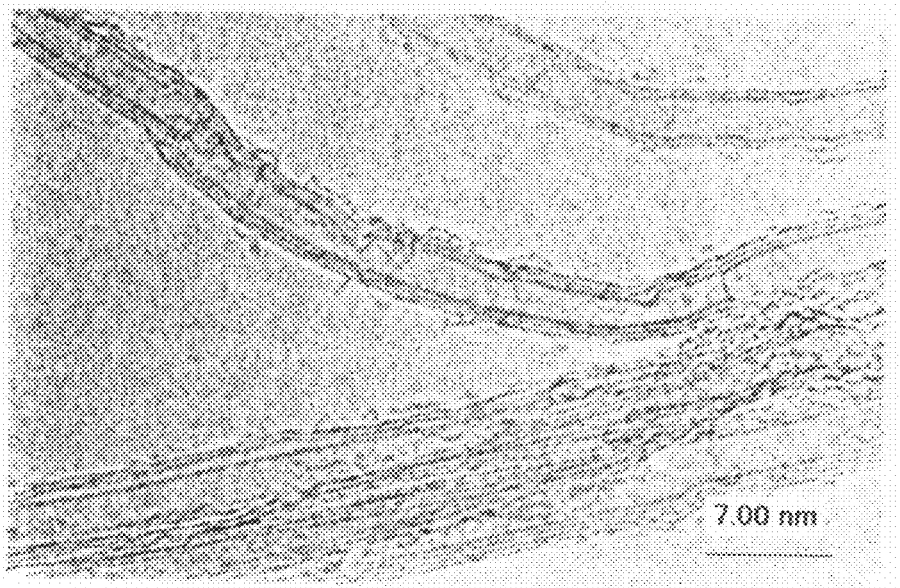
FIG. 46 is a TEM image of the carbon nanotubes manufactured in Example 7.
Figure 47:
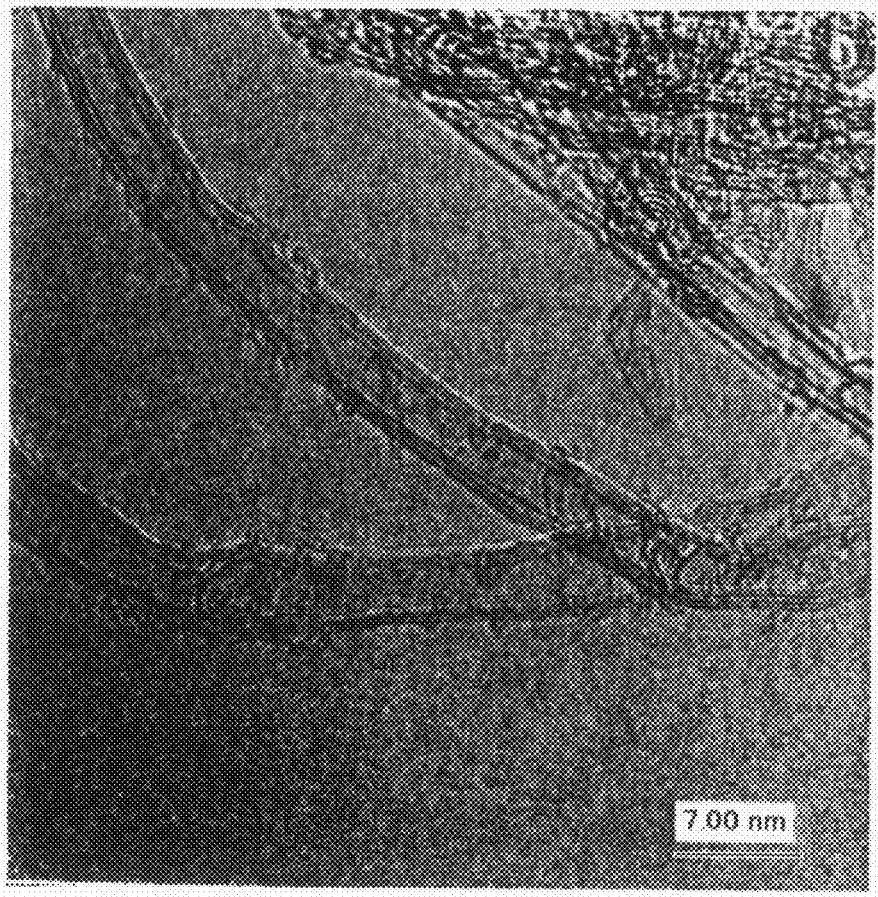
FIG. 47 is a TEM image of the carbon nanotubes manufactured in Example 7.
Figure 48:
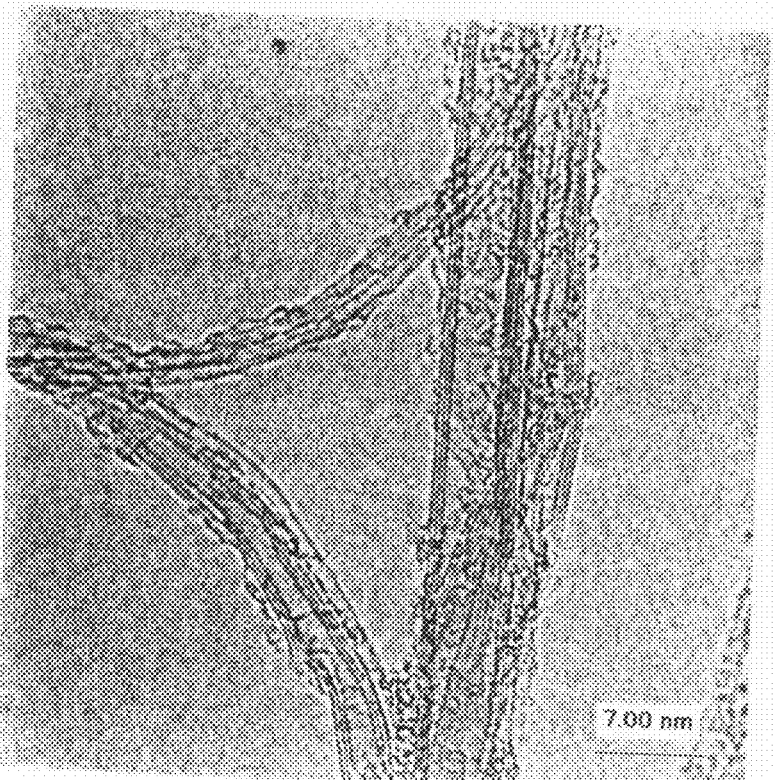
FIG. 48 is a TEM image of the carbon nanotubes manufactured in Example 7.
Figure 49:
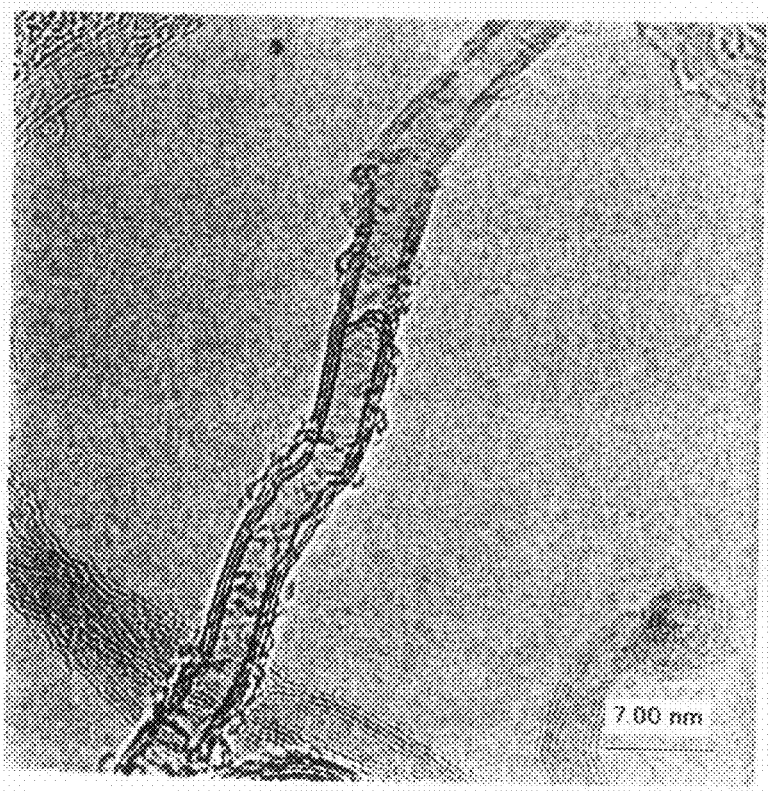
FIG. 49 is a TEM image of the carbon nanotubes manufactured in Example 7.
Figure 50:
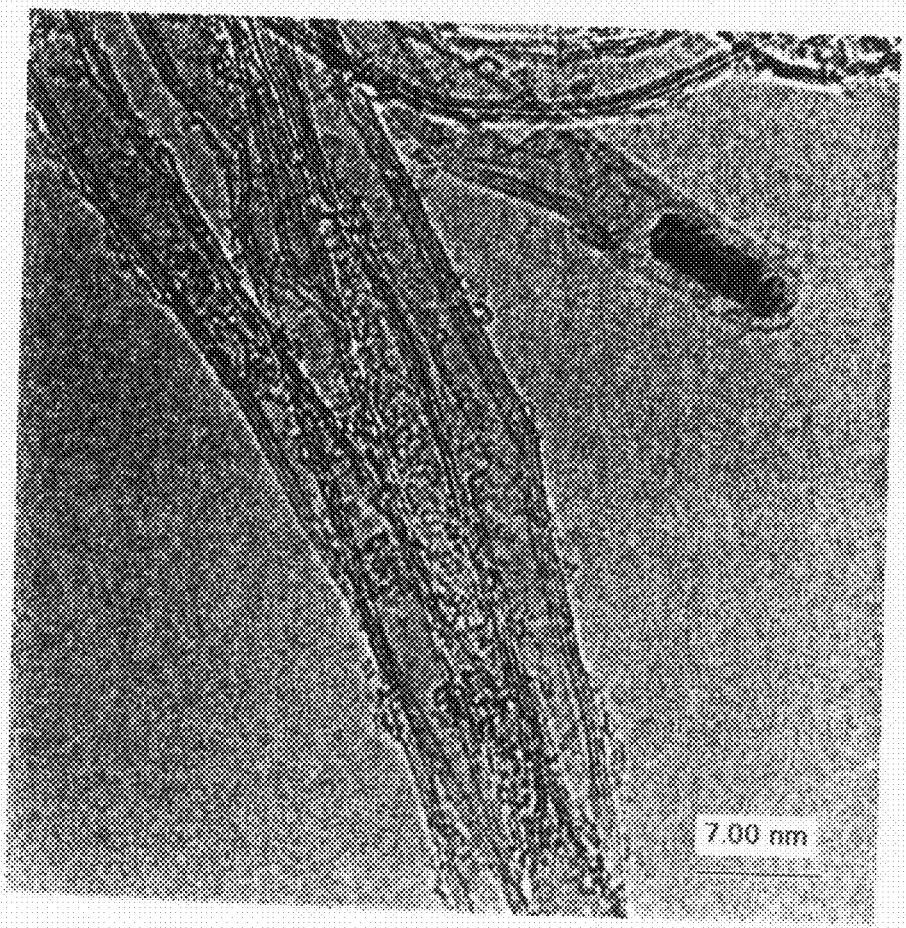
FIG. 50 is a TEM image of the carbon nanotubes manufactured in Example 7.

During the growth of carbon nanotube, the temperature of the substrate 16 and the internal pressure of the furnace tube 14 were maintained at 800° C. and at 1 kPa, respectively, and held for one hour. Thereafter introduction of a hydrogen gas and ethanol vapor was stopped. The substrate 16 was cooled up to room temperature while an Ar gas is passed into the furnace tube 14. FIG. 45 is a temperature profile of the entire step.

Moreover, by a high resolution SEM, observation was made of the metallic fine particles just before the growth of carbon nanotubes started in this Comparative Example, similar to Example 1. As a result, it was recognized that a particle diameter distribution (range of a catalyst diameter: 2.0 to 16.0 nm, mean value: 8.0 nm, and standard deviation: 3.01) shown in FIG. 42 was given.

Furthermore, as a result of evaluating the number of graphene sheet layers of the carbon nanotubes manufactured in this Comparative Example, SWCNTs was 51.5%, DWCNTs was 20.6%, 3WCNTs was 19.9%, 4WCNTs was 7.3%, and 5WCNTs was 0.7% among 100 carbon nanotubes extracted at random in total as illustrated in FIG. 43. Even in the case of SWCNTs having the highest proportion, the proportion was no more than 51.5%.

Example 7

In Example 7, a carbon nanotube assembly was manufactured on a substrate of silica glass using cobalt-molybdenum fine particles as a catalyst in the same way as Example 1 except using a solution having cobalt of 0.07 mass % and molybdenum of 0.07 mass % for forming the cobalt-molybdenum fine particles.

Moreover, by a high resolution SEM, observation was made of the metallic fine particles just before the growth of carbon nanotubes started in this Example, similar to Example 1. FIG. 3 shows an SEM image of the metallic fine particles on the substrate obtained in Example 3. In connection with each of the reduced metallic fine particles seen in white color in SEM images shown in FIG. 3, the particle diameter was measured using a ruler. As a result, it was recognized that a particle diameter distribution (range of catalyst diameter: 8.1 to 17.0 nm, mean value: 12.7 nm, and standard deviation: 2.07) shown in FIG. 4 was given.

Next, in order to check the number of graphene sheet layers in connection with each of carbon nanotubes that form the carbon nanotube assembly, TEM observation was conducted, similar to Example 1. FIGS. 46 to 50 are TEM images of the carbon nanotubes manufactured in this Example. Three graphene sheet layers are recognized on a wall surface in an image of carbon nanotube observed in each of FIGS. 46 to 50. Thus this can be judged as a triple-walled carbon nanotube.

As a result of evaluating the number of graphene sheet layers of the carbon nanotubes manufactured in this Example based on the aforementioned observation, SWCNTs was 3.2%, DWCNTs was 6.5%, 3WCNTs was 74.2% and 4WCNTs was 16.1% among 100 carbon nanotubes extracted at random in total as illustrated in FIG. 17 and FIG. 18. Furthermore, as shown in FIG. 19 also, the diameters of the carbon nanotubes manufactured in this Example were as follows.

Diameter range of SWCNTs: 1.5 nm
Mean value of diameter of SWCNTs: 1.5 nm
Diameter range of DWCNTs: 2.5 to 4.0 nm
Mean value of diameter of DWCNTs: 3.3 nm
Diameter range of 3WCNTs: 3.5 to 4.9 nm
Mean value of diameter of 3WCNTs: 4.1 nm
Diameter range of 4WCNTs: 4.2 to 5.0 nm
Mean value of diameter of 4WCNTs: 4.6 nm.

Figure 51:
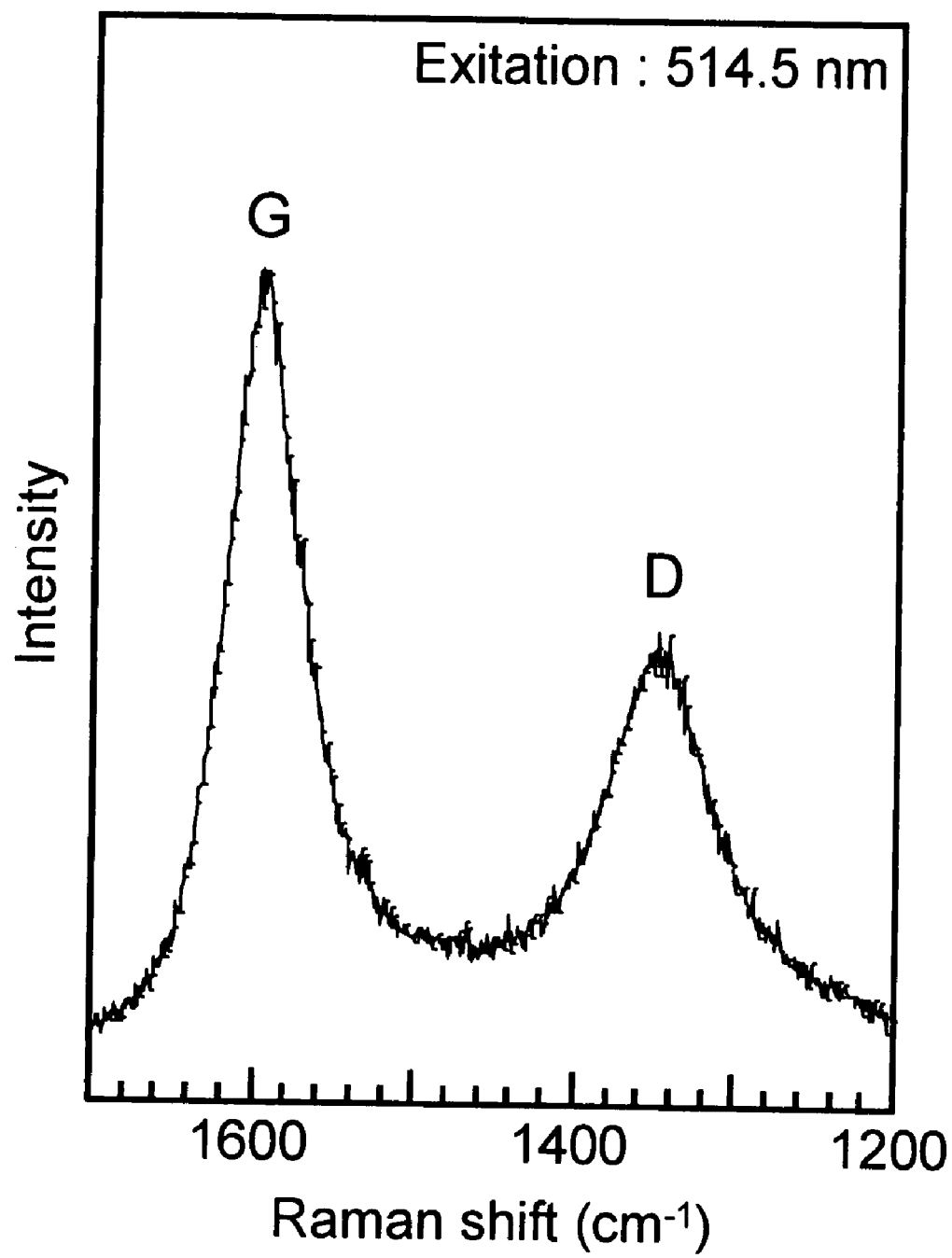
FIG. 51 is a graph showing a Raman spectrum of the carbon nanotubes manufactured in Example 7.

Furthermore, as a result of measuring Raman spectrum of the carbon nanotubes manufactured in this Example, it was recognized that position, shape and intensity ratio of each of observed G band and D band were those unique to MWCNTs of three layers or more as shown in FIG. 51. Additionally, an Ar+ ion laser (514.5 nm) was used as an excitation light source for Raman spectroscopy.

Example 8

In Example 8, a carbon nanotube assembly was manufactured on a substrate of silica glass using cobalt-molybdenum fine particles as a catalyst in the same way as Example 1 except using a solution having cobalt of 0.1 mass % and molybdenum of 0.1 mass % for forming the cobalt-molybdenum fine particles.

As a result of evaluating the number of graphene sheet layers of the carbon nanotubes manufactured in this Example, SWCNTs was 3.1%, DWCNTs was 4.2%, 3WCNTs was 76.0% and 4WCNTs was 16.7% among 100 carbon nanotubes extracted at random in total as illustrated in FIG. 18.

Example 9

In Example 9, a carbon nanotube assembly was manufactured on a substrate of silica glass using cobalt-molybdenum fine particles as a catalyst in the same way as Example 1 except using a solution having cobalt of 0.5 mass % and molybdenum of 0.5 mass % for forming the cobalt-molybdenum fine particles.

Moreover, by a high resolution SEM, observation was made of the metallic fine particles just before the growth of carbon nanotubes started in this Example, similar to Example 1. As a result, it was recognized that a particle diameter distribution (range of catalyst diameter: 11.1 to 21.0 nm, mean value: 16.2 nm, and standard deviation: 1.76) shown in FIG. 4 was given.

Figure 52:
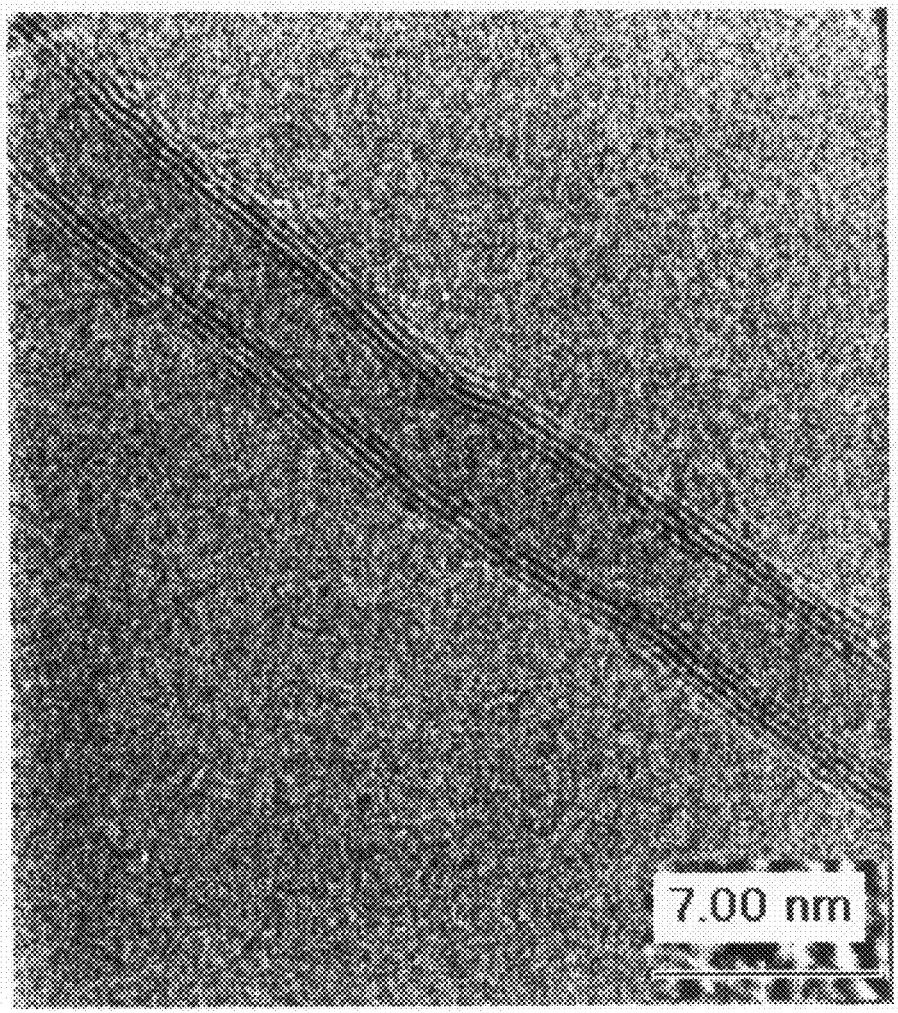
FIG. 52 is a TEM image of the carbon nanotubes manufactured in Example 9.

Next, in order to check the number of graphene sheet layers in connection with each of carbon nanotubes that form the carbon nanotube assembly, TEM observation was conducted, similar to Example 1. FIG. 52 is a TEM image of the carbon nanotube manufactured in this Example. Four graphene sheet layers are recognized on a wall surface in an image of the carbon nanotube observed in FIG. 52. Thus, this can be judged as a quad-walled carbon nanotube.

As a result of evaluating the number of graphene sheet layers of the carbon nanotubes manufactured in this Example based on the aforementioned observation, 3WCNTs was 22.9%, 4WCNTs was 61.9%, and 5WCNTs was 15.2% among 100 carbon nanotubes extracted at random in total as illustrated in FIG. 17 and FIG. 18. Furthermore, as shown in FIG. 19, the diameters of the carbon nanotubes manufactured in this Example were as follows.
Diameter range of 3WCNTs: 3.9 to 4.7 nm
Mean value of diameter of 3WCNTs: 4.3 nm
Diameter range of 4WCNTs: 4.2 to 5.5 nm
Mean value of diameter of 4WCNTs: 4.8 nm
Diameter range of 5WCNTs: 5.2 to 5.7 nm
Mean value of diameter of 5WCNTs: 5.5 nm.

Example 10

In Example 10, a carbon nanotube assembly was manufactured on a substrate of silica glass using cobalt-molybdenum fine particles as a catalyst in the same way as Example 1 except using a solution having cobalt of 1.0 mass % and molybdenum of 1.0 mass % for forming the cobalt-molybdenum fine particles.

Moreover, by a high resolution SEM, observation was made of the metallic fine particles just before the growth of carbon nanotubes started in this Example, similar to Example 1. As a result, it was recognized that a particle diameter distribution (range of catalyst diameter: 13.1 to 22.0 nm, mean value: 18.9 nm, and standard deviation: 1.98) shown in FIG. 4 was given.

Figure 53:
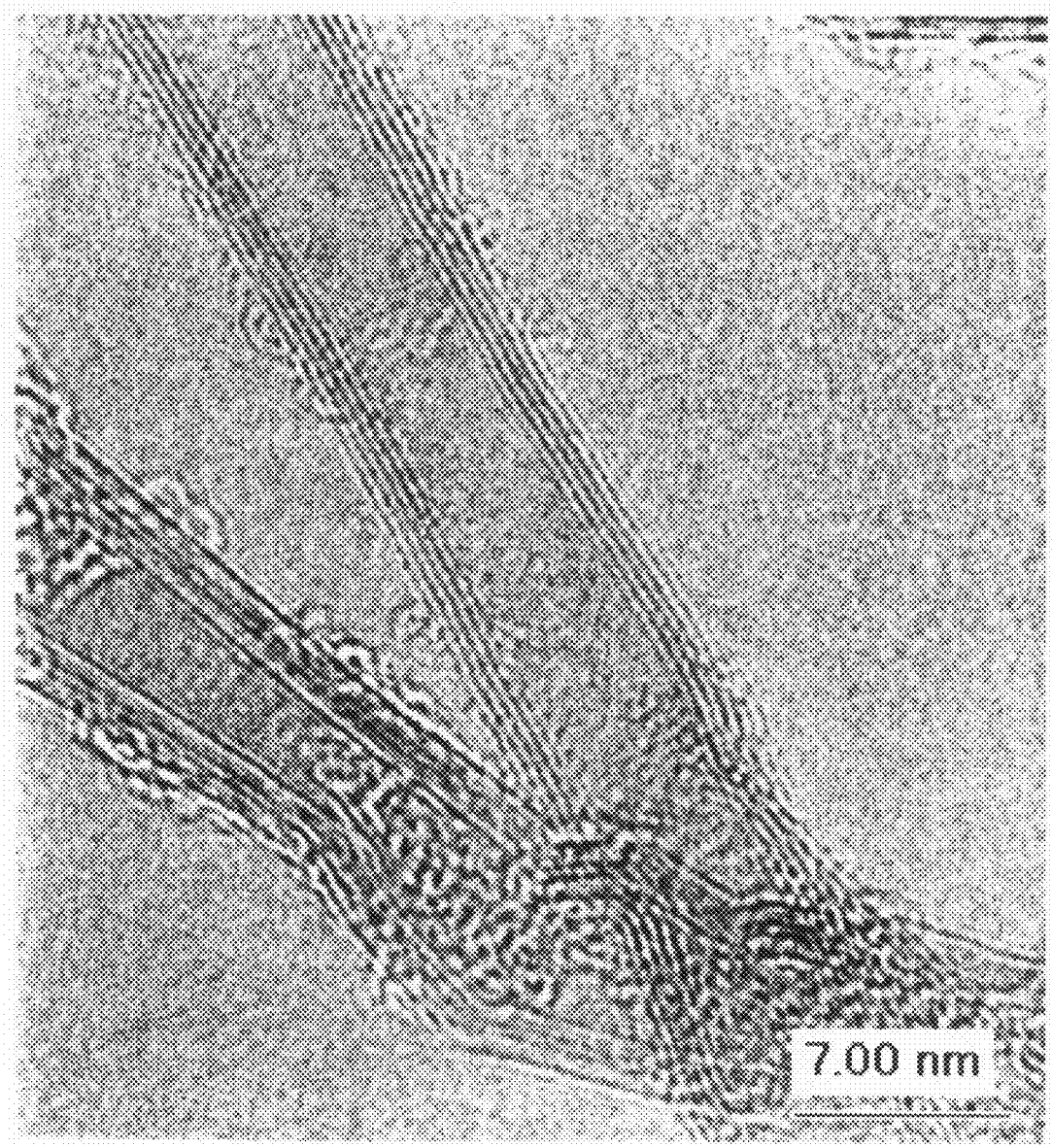
FIG. 53 is a TEM image of the carbon nanotubes manufactured in Example 10.

Next, in order to check the number of graphene sheet layers in connection with each of carbon nanotubes that form the carbon nanotube assembly, TEM observation was conducted, similar to Example 1. FIG. 53 is a TEM image of the carbon nanotubes manufactured in this Example. Five graphene sheet layers are recognized on a wall surface in an image of the carbon nanotube observed in FIG. 53. Thus, this can be judged as a quint-walled carbon nanotube.

As a result of evaluating the number of graphene sheet layers of the carbon nanotubes manufactured in this Example based on the aforementioned observation, 3WCNTs was 6.3%, 4WCNTs was 23.5%, 5WCNTs was 59.0%, and MWCNTs was 11.2% among 100 carbon nanotubes extracted at random in total as illustrated in FIG. 17 and FIG. 18. Furthermore, as shown in FIG. 19, the diameters of the carbon nanotubes manufactured in this Example were as follows.
Diameter range of 3WCNTs: 4.2 to 4.8 nm
Mean value of diameter of 3WCNTs: 4.5 nm
Diameter range of 4WCNTs: 4.6 to 5.3 nm
Mean value of diameter of 4WCNTs: 5.0 nm
Diameter range of 5WCNTs: 5.3 to 6.5 nm
Mean value of diameter of 5WCNTs: 5.8 nm
Diameter range of MWCNTs: 5.8 to 6.5 nm
Mean value of diameter of MWCNTs: 6.2 nm.

Examples 11 to 15

In Examples 11 to 15, a silica glass substrate was used to manufacture carbon nanotubes using iron as a catalyst.

First, two types of silica glass substrates with optically polished surfaces of 20 mm×20 mm×0.5 mm and φ 30 mm×3 mm were prepared. The substrates were stored in a film-forming chamber of a magnetron sputtering apparatus (made by KITANO SEIKI CO., LTD., type name: TWS) to evacuate up to a high vacuum. Next, an argon gas was introduced to the film-forming chamber, and the pressure was adjusted to about 2 Pa. A target made of tungsten was used in a first step, and one made of iron was used in a second step, and a negative high voltage was applied to the target, and sputtering was performed. Thus, a tungsten thin film with a thickness of 2 nm was deposited on the substrate in the first step by the sputtering method, and then an iron thin film was deposited thereon to have a thickness of 0.2 nm (Example 11), 0.4 nm (Example 12), 0.6 nm (Example 13), 0.7 nm (Example 14) and 0.8 nm (Example 15), respectively.

Next, a carbon nanotube assembly was manufactured on the substrate of silica glass using iron fine particles as a catalyst after reductive processing in the same way as Example 1 except using the substrate with the surface on which the iron thin film was formed by the aforementioned processes.

Moreover, by a high resolution SEM, observation was made of the metallic fine particles just before the growth of the carbon nanotubes started in these Examples, similar to Example 1. As a result, it was recognized that the particle diameter distributions shown below were given.
Example 11 Diameter range of catalyst: 2.0 to 7.0 nm
Example 12 Diameter range of catalyst: 6.0 to 12.0 nm
Example 13 Diameter range of catalyst: 8.0 to 16.0 nm
Example 14 Diameter range of catalyst: 10.0 to 19.0 nm
Example 15 Diameter range of catalyst: 16.0 to 22.0 nm Next, as a result of evaluating the number of graphene sheet layers of the carbon nanotubes manufactured in these Examples by TEM observation similar to Example 1, the result shown in Table 1 was obtained. As is obvious from the result shown in Table 1, it was recognized that even when iron was used as a catalyst, by changing the thickness of iron film, the particle diameter of the catalyst can be changed, thereby making it possible to control the number of graphene sheet layers of the carbon nanotubes.

Figure 54:
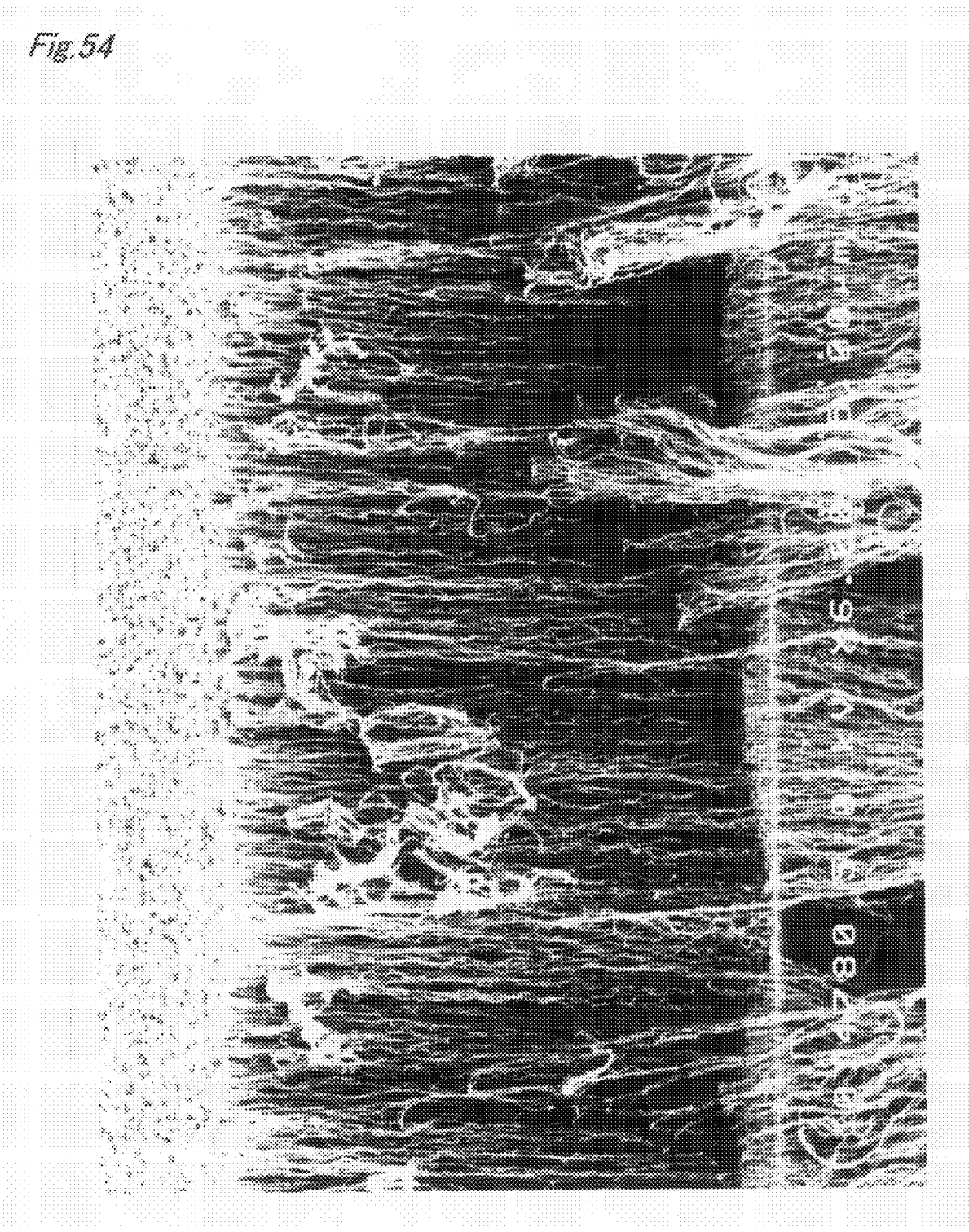
FIG. 54 is an SEM image of a carbon nanotube assembly manufactured in Example 12.

FIG. 54 is an SEM image taken in the vicinity of the substrate surface of the carbon nanotube assembly manufactured in Example 12. It was recognized from FIG. 54 that the carbon nanotubes were grown close together on the substrate surface in a vertical direction.

TABLE 1

| Fe film thickness | Proportion of SWCNTs (%) | Proportion of DWCNTs (%) | Proportion of 3WCNTs (%) | Proportion of 4WCNTs (%) | Proportion of 5WCNTs (%) | Proportion of MWCNTs (%) |
|---|---|---|---|---|---|---|
| 0.2 | 100 | 0 | 0 | 0 | 0 | 0 |
| 0.4 | 10 | 81 | 9 | 0 | 0 | 0 |
| 0.6 | 5 | 15 | 74 | 6 | 0 | 0 |
| 0.7 | 0 | 4 | 7 | 67 | 22 | 0 |
| 0.8 | 0 | 0 | 0 | 8 | 61 | 31 |

Example 16

Figure 55:
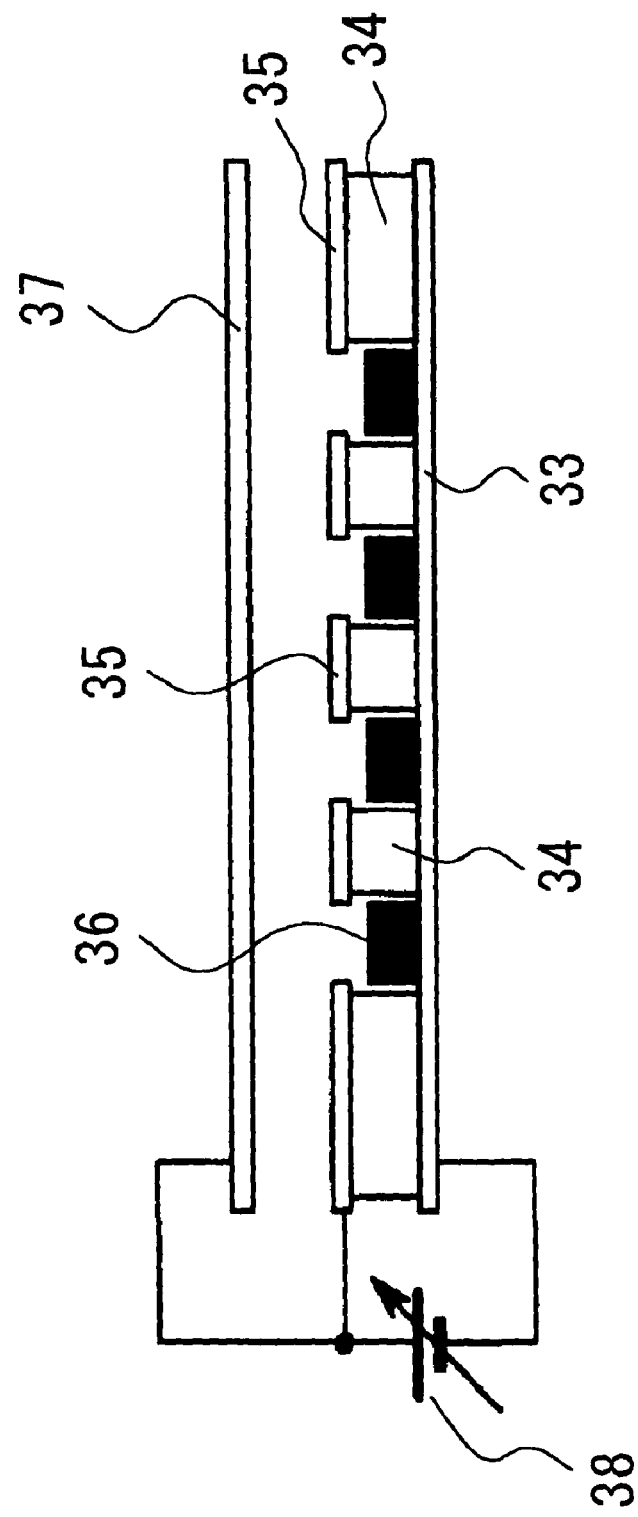
FIG. 55 is a schematic cross-sectional view of a field emission display according to the present invention.

Example 16 relates to a field emission display apparatus using the carbon nanotube assembly (carbon material) of the present invention as an electron source. FIG. 55 is a schematic cross-sectional view of the display, and 33 denotes an emitter electrode, 34 denotes an insulator, 35 denotes a gate electrode, 36 denotes an electron source, 37 denotes a fluorescent substance, and 38 denotes a direct-current (DC) power source.

In the field emission display apparatus of Example 16, the electron source 36 is formed of the carbon nanotube assembly of the present invention. From the electron source 36 on the emitter electrode 33 biased to a negative potential by the DC power source 38, an electron is emitted by a field emission phenomenon, and collides with the opposing fluorescent substance 37 to generate fluorescence. At this time, the gate electrode 35 has such a function that acts as an electron-extraction electrode to extract an electron from the electron source 36. Furthermore, the insulator 34 has such a function that acts as an insulation layer between multiple electron sources 36 to prevent discharge between the electron sources 36.

The field emission display according to the present invention uses carbon nanotubes with a high wall number purity as an electron source, and therefore is expected to reduce unevenness in luminance and variations in lifetime as compared with the display using a mixture of many kinds of carbon nanotubes with low wall number purities as an electron source.

INDUSTRIAL APPLICABILITY

According to the carbon nanotube assembly manufacturing method of the present invention, it is possible to selectively manufacture n-walled carbon nanotubes with high purity. Moreover, the carbon nanotube assembly of the present invention is a carbon material, which is formed of mainly carbon nanotubes, and is a carbon nanotube assembly in which a proportion of n-walled carbon nanotubes (any one of n=2 to 5) to carbon nanotubes to be contained is high, and in which a wall number purity is higher than ever before, and therefore, this can be used as various types of devices utilizing physical properties depending on the number of graphene sheet layers, for example, an electron source for a field emission display utilizing electron emission characteristics, an interlayer wiring material for an integrated circuit utilizing electroconductivity, and the like.

The invention claimed is:

1. A carbon nanotube assembly directly grown on a substrate, wherein a proportion of double-walled carbon nanotubes to carbon nanotubes contained in the assembly is 70% or more.

2. The carbon nanotube assembly according to claim 1, wherein the growth directions of the carbon nanotubes are oriented uniformly along a normal line direction with respect to a surface of the substrate.

3. The carbon nanotube assembly according to claim 1, wherein a diameter range of the double-walled carbon nanotubes is 2.5 nm to 3.7 nm.

4. A carbon nanotube assembly directly grown on a substrate, wherein a proportion of triple-walled carbon nanotubes to carbon nanotubes contained in the assembly is 50% or more.

5. The carbon nanotube assembly according to claim 4, wherein the growth directions of the carbon nanotubes are oriented uniformly along a normal line direction with respect to a surface of the substrate.

6. The carbon nanotube assembly according to claim 4, wherein a diameter range of the triple-walled carbon nanotubes is 3.5 nm to 4.9 nm.

7. A carbon nanotube assembly directly grown on a substrate, wherein a proportion of quad-walled carbon nanotubes to carbon nanotubes contained in the assembly is 50% or more.

8. The carbon nanotube assembly according to claim 7, wherein the growth directions of the carbon nanotubes are oriented uniformly along a normal line direction with respect to a surface of the substrate.

9. The carbon nanotube assembly according to claim 7, wherein a diameter range of the quad-walled carbon nanotubes is 4.2 nm to 5.5 nm.

10. A carbon nanotube assembly directly grown on a substrate, wherein a proportion of quint-walled carbon nanotubes to carbon nanotubes contained in the assembly is 50% or more.

11. The carbon nanotube assembly according to claim 10, wherein the growth directions of the carbon nanotubes are oriented uniformly along a normal line direction with respect to a surface of the substrate.

12. The carbon nanotube assembly according to claim 10, wherein a diameter range of the quint-walled carbon nanotubes is 5.3 nm to 6.5 nm.

13. A field emission display using the carbon nanotube assembly according to claim 1 as an electron source.

* * * * *